United States Patent
Misener et al.

(10) Patent No.: US 12,184,019 B2
(45) Date of Patent: Dec. 31, 2024

(54) METHODS AND DEVICES FOR INTELLIGENT RECONFIGURABLE ELECTRICAL DEVICES

(71) Applicant: SWIDGET CORP., Kingston (CA)

(72) Inventors: Lowell Misener, Kingston (CA); Christopher E. Adamson, Kingston (CA)

(73) Assignee: SWIDGET CORP., Kingston (CA)

( * ) Notice: Subject to any disclaimer, the term of this patent is extended or adjusted under 35 U.S.C. 154(b) by 357 days.

(21) Appl. No.: 17/761,463

(22) PCT Filed: Sep. 22, 2020

(86) PCT No.: PCT/CA2020/051264
§ 371 (c)(1),
(2) Date: Mar. 17, 2022

(87) PCT Pub. No.: WO2021/056100
PCT Pub. Date: Apr. 1, 2021

(65) Prior Publication Data
US 2022/0344883 A1 Oct. 27, 2022

Related U.S. Application Data

(60) Provisional application No. 62/904,004, filed on Sep. 23, 2019.

(51) Int. Cl.
*H01R 33/90* (2006.01)
*G06K 7/10* (2006.01)
(Continued)

(52) U.S. Cl.
CPC ......... *H01R 33/90* (2013.01); *G06K 7/10237* (2013.01); *H01R 33/88* (2013.01); *H04W 4/30* (2018.02)

(58) Field of Classification Search
CPC ........ G05B 2219/2614; G05B 23/0283; G06K 7/10237; H01R 13/6658; H01R 13/6691;
(Continued)

(56) References Cited

U.S. PATENT DOCUMENTS

| 7,312,752 | B2 | 12/2007 | Smith et al. | |
| 8,496,342 | B2* | 7/2013 | Misener | H02G 3/18 |
| | | | | 174/50 |

(Continued)

FOREIGN PATENT DOCUMENTS

| CA | 3005793 | * 12/2018 |
| CA | 3005793 A1 | 12/2018 |
| WO | 2018/094502 A1 | 5/2018 |

OTHER PUBLICATIONS

International Search Report and Written Opinion received for PCT/CA2020/051264, mailed Dec. 9, 2020.

*Primary Examiner* — Tan H Trinh
(74) *Attorney, Agent, or Firm* — Greer, Burns & Crain, Ltd

(57) ABSTRACT

Today, building automation and infrastructure provisioning are discrete deployments and systems such that electrical power distribution for consumption, electrical power and switching for lighting, environmental sensors, security sensors and the like are discrete and fixed. The present disclosure provides receptacles including electrical power outlets and light switches with configurable and reconfigurable additional functionality such that additional functions are distributed as necessary or required within the environment such as sensors, wireless interfaces, and data interfaces through the use of removable inserts. Further, these receptacles and inserts support artificial intelligence-based assisted living functionality through monitoring user activities with the artificial intelligence centralized or distributed locally or remotely accessed. These receptacles and inserts (Continued)

identify other electrical or electronic devices attached to them, allowing increased knowledge of the user's activities, as well as providing additional aspects of artificial intelligence-based assisted living such as power monitoring, and preventive maintenance.

19 Claims, 29 Drawing Sheets

(51) Int. Cl.
    *H01R 33/88*     (2006.01)
    *H04W 4/30*     (2018.01)

(58) Field of Classification Search
    CPC .... H01R 25/006; H01R 27/00; H01R 31/065; H01R 33/88; H01R 33/90; H02G 3/14; H04W 4/30
    USPC ........................................................ 455/66.1
    See application file for complete search history.

(56) References Cited

U.S. PATENT DOCUMENTS

| | | | |
|---|---|---|---|
| 8,965,411 | B1 | 2/2015 | Busch-Sorensen et al. |
| 9,408,036 | B2 | 8/2016 | Hart et al. |
| 10,129,697 | B2 | 11/2018 | Houri |
| 10,225,005 | B1* | 3/2019 | Elberbaum ............ H01R 27/02 |
| 11,563,876 | B1* | 1/2023 | Baldwin .................. H02G 3/14 |
| 2015/0156895 | A1* | 6/2015 | Misener .................... H02J 9/02 |
| | | | 361/810 |
| 2016/0111837 | A1* | 4/2016 | Misener ................. F21S 9/022 |
| | | | 439/345 |
| 2018/0375313 | A1* | 12/2018 | Misener ............... H01R 13/665 |
| 2020/0358275 | A1* | 11/2020 | Misener ................. F21S 9/022 |
| 2021/0313787 | A1* | 10/2021 | Misener ............... H01R 13/506 |
| 2023/0253772 | A1* | 8/2023 | Misener ............... H01R 13/665 |
| | | | 439/535 |
| 2023/0253773 | A1* | 8/2023 | Misener ............... H01R 13/665 |
| | | | 439/535 |

* cited by examiner

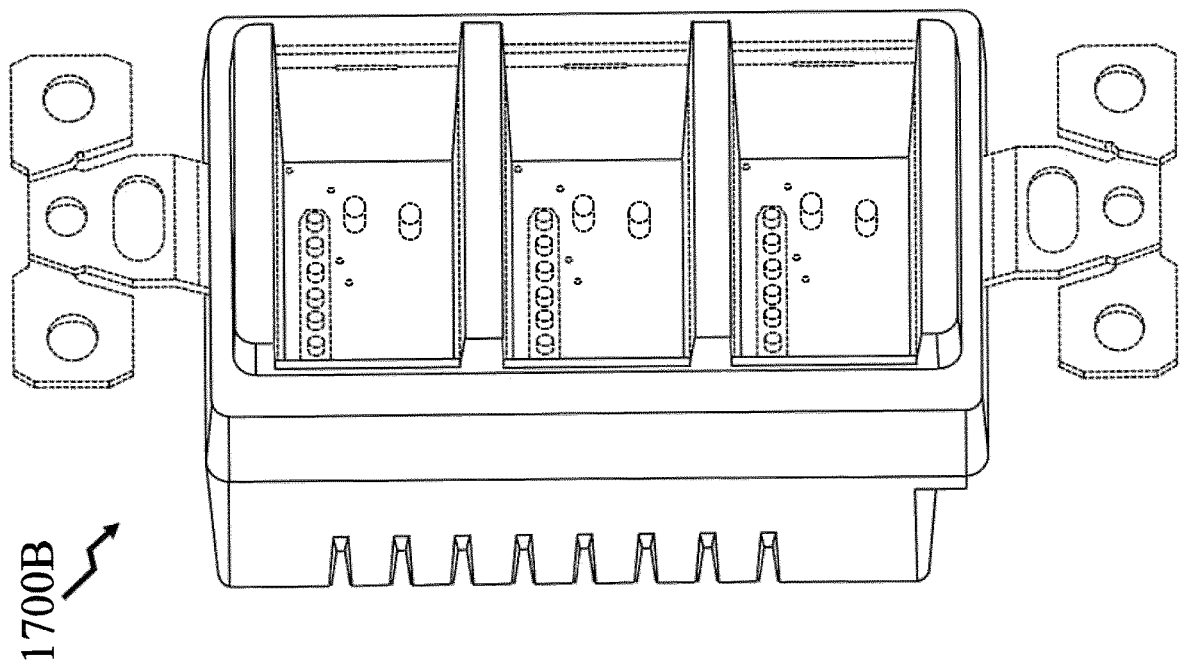
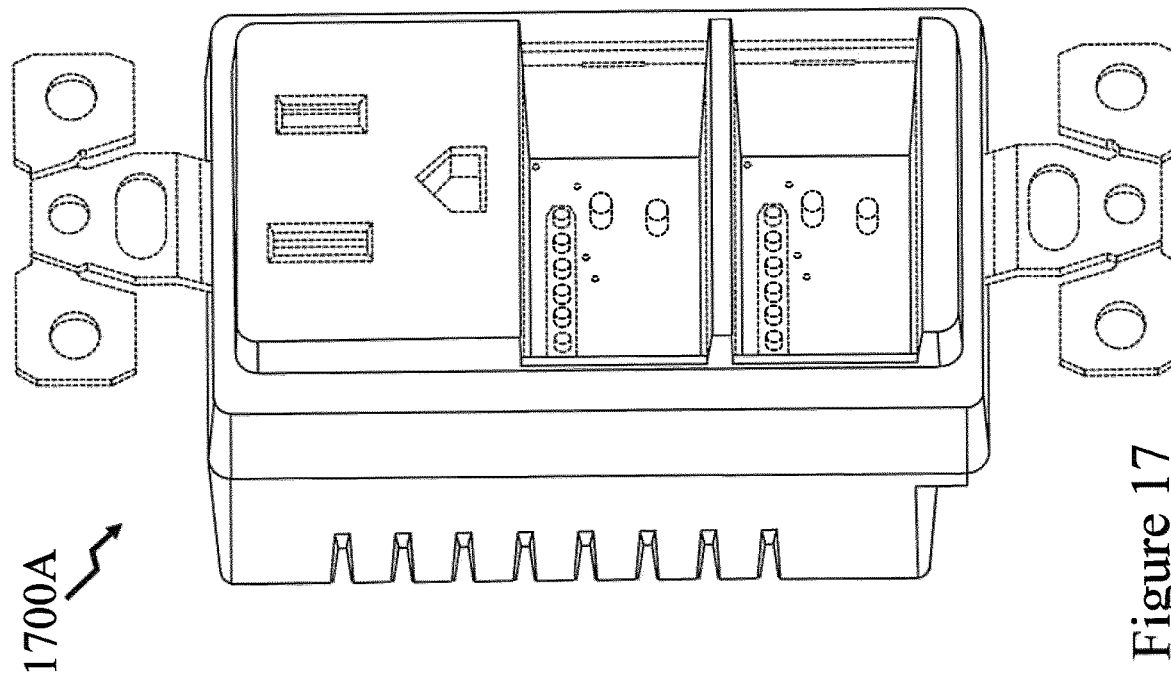
Figure 17

METHODS AND DEVICES FOR INTELLIGENT RECONFIGURABLE ELECTRICAL DEVICES

CROSS REFERENCE TO RELATED APPLICATIONS

This patent application claims the benefit of priority from U.S. Provisional Patent Application 62/904,004 filed Sep. 23, 2019 entitled "Methods and Devices for Intelligent Reconfigurable Electrical Devices," the entire contents of which are incorporated herein by reference.

BACKGROUND

This patent application relates to configurable electrical receptacles and more particularly to intelligent configurable electrical receptacles and intelligent electrical inserts for configurable electrical receptacles allowing increased functionality, connectivity, intelligence, decision making, and communications within distributed applications such as industrial automation, home automation, and business automation.

Home automation or smart homes (also known as domotics) refers to building automation for the home. It involves the control and automation of lighting, heating (such as smart thermostats), ventilation, air conditioning (HVAC), and security, as well as home appliances such as washer/dryers, ovens or refrigerators/freezers. Wi-Fi is often used for remote monitoring and control. Home devices, when remotely monitored and controlled via the Internet, are an important constituent of the Internet of Things. Modern systems generally consist of switches and sensors connected to a central hub sometimes called a "gateway" from which the system is controlled with a user interface that is interacted either with a wall-mounted terminal, mobile phone software, tablet computer or a web interface, often but not always via Internet cloud services.

Home automation represents part of the building automation environment as in addition to residential deployments there are markets for commercial environments, manufacturing environments, public buildings, and retail environments. Typically, each element within such automation deployments is undertaken as a discrete deployment such that electrical power distribution for consumption, electrical power and switching for lighting, environmental sensors, security sensors etc. are all discrete.

Accordingly, it would be beneficial to provide a range of receptacles including those providing conventional functions such as electrical power outlets, light switches etc. with configurable and importantly, reconfigurable additional functionality such that additional functions can be distributed as necessary or required within the environment such as sensors, wireless interfaces, data interfaces etc. through the use of removable inserts. Further, it would be beneficial for such receptacles to be configurable or reconfigurable such that an installed dual power outlet can be reconfigured to a single power outlet with a dimmer switch for example whilst maintaining support for these inserts to provide dynamic configuration of additional features.

Further, it would be beneficial for such receptacles and inserts to support artificial intelligence based assisted living functionality through monitoring user activities etc. via these receptacles and inserts with the artificial intelligence centralized or distributed locally or remotely accessed.

Further, it would be beneficial for such receptacles and inserts to identify other electrical or electronic devices attached to them allowing increased knowledge of the user's activities as well as providing additional aspects of artificial intelligence based assisted living such as power monitoring, preventative maintenance etc.

Other aspects and features of the present invention will become apparent to those ordinarily skilled in the art upon review of the following description of specific embodiments of the invention in conjunction with the accompanying figures.

SUMMARY

It is an object of the present invention to mitigate limitations within the prior art relating to configurable electrical receptacles and more particularly to intelligent configurable electrical receptacles and intelligent electrical inserts for configurable electrical receptacles allowing increased functionality, connectivity, intelligence, decision making, and communications within distributed applications such as industrial automation, home automation, and business automation.

In accordance with an embodiment of the invention there is provided a device comprising:
  a housing having at least a front face comprising;
    a first mounting means to affix the housing to an electrical utility work box;
    a second mounting means to affix a faceplate to the housing;
    a plurality of first electrical interfaces, each first electrical interface allowing connection to a predetermined electrical signal forming part of an electrical power distribution network;
    an electrical circuit coupled to the plurality of first electrical interfaces for generating at least one of one or more electrical power signals and one or more electrical data signals; and
    a plurality of first contacts, each first contact coupled to a predetermined one of the at least one of one or more electrical power signals and one or more electrical data signals; and
    a cavity disposed within the front face of the housing allowing the insertion and removal of a demountable insert into and from the front face when the housing is mounted within the electrical utility work box with the faceplate attached and comprising a first part of a retention means to retain the demountable insert within the cavity accessible through a first opening in the faceplate and comprising the plurality of first contacts; wherein
  the demountable insert is one of a plurality of demountable inserts each sized for insertion into the cavity within the front face of the housing and capable of insertion and removal when the faceplate is attached to the housing, the demountable insert comprising a second part of the retention means to retain the demountable insert when inserted into the cavity and a plurality of second contacts;
  each second contact of the plurality of second contacts electrically contacts a predetermined first contact of a predetermined subset of the plurality of first contacts; and
  the predetermined subset of the plurality of first contacts is established in dependence upon the demountable insert of the plurality of demountable inserts inserted into the cavity.

In accordance with an embodiment of the invention there is provided a device comprising:
a housing to fit within an electrical utility work box comprising at least a front face; the housing comprising;
  a first mounting means to affix the housing to the electrical utility work box;
  a second mounting means to affix the faceplate to the housing;
  a plurality of first electrical interfaces, each first electrical interface allowing connection to a predetermined electrical signal forming part of an electrical power distribution network;
  an electrical circuit coupled to the plurality of first electrical interfaces for generating at least one of one or more electrical power signals and one or more electrical data signals; and
  a plurality of first contacts, each first contact coupled to a predetermined one of the at least one of one or more electrical power signals and one or more electrical data signals; and
  a cavity disposed within the front face of the housing allowing the insertion and removal of a demountable insert into and from the front face of the housing when the housing is mounted within the electrical utility work box and comprising a first part of a retention means to retain the demountable insert when inserted into the cavity; wherein
the demountable insert is sized for insertion into the cavity within the front face of the housing and comprises a second part of the retention means to retain the demountable insert when inserted into the cavity and a plurality of second contacts;
the demountable insert is one of a plurality of demountable inserts;
each second contact of the plurality of second contacts electrically contacts a predetermined first contact of a predetermined subset of the plurality of first contacts; and
the predetermined subset of the plurality of first contacts is established in dependence upon the demountable insert of the plurality of demountable inserts inserted into the cavity.

In accordance with an embodiment of the invention there is provided a device comprising:
a housing having at least a front face comprising;
  a first mounting means to affix the housing to an electrical work box;
  a second mounting means to affix a faceplate to the housing;
  a plurality of first electrical interfaces, each first electrical interface allowing connection to a predetermined electrical signal forming part of an electrical power distribution network;
  an electrical circuit coupled to the plurality of first electrical interfaces for generating at least one of one or more electrical power signals and one or more electrical data signals; and
  a plurality of first contacts, each first contact coupled to a predetermined one of the at least one of one or more electrical power signals and one or more electrical data signals;
  a cavity disposed within the front face of the housing allowing the insertion and removal of a demountable insert into and from the front face when the housing is mounted within the electrical utility work box with the faceplate attached and comprising a first part of a retention means to retain the demountable insert within the cavity accessible through a first opening in the faceplate and comprising the plurality of first contacts; and
  a plurality of first features upon a surface of the cavity; and
the demountable insert, the demountable insert is one of a plurality of demountable inserts each sized for insertion into the cavity within the front face of the housing and capable of insertion and removal when the faceplate is attached to the housing, the demountable insert comprising a second part of the retention means to retain the demountable insert when inserted into the cavity, a plurality of second contacts to electrically contact a predetermined subset of the plurality of first contacts, and a plurality of second features; wherein
the plurality of first features when aligned with the plurality of second features allow full insertion of the demountable insert into the cavity such that the plurality of second contacts electrically contact the predetermined subset of the plurality of first contacts.

In accordance with an embodiment of the invention there is provided a device comprising:
a housing having at least a front face comprising;
  a mounting means to affix the housing to another device which is at least one of a portable electronic device, a fixed electronic device, a wearable electronic device, a portable electrical device, a fixed electrical design, and a wearable electrical device;
  a plurality of first electrical interfaces, each first electrical interface allowing connection to a predetermined electrical signal forming part of an electrical power distribution network;
  an electrical circuit coupled to the plurality of first electrical interfaces for generating at least one of one or more electrical power signals and one or more electrical data signals; and
  a plurality of first contacts, each first contact coupled to a predetermined one of the at least one of one or more electrical power signals and one or more electrical data signals;
  a cavity disposed within the front face of the housing allowing the insertion and removal of a demountable insert into and from the front face when the housing is mounted within the electrical utility work box with the faceplate attached and comprising a first part of a retention means to retain the demountable insert within the cavity accessible through a first opening in the faceplate and comprising the plurality of first contacts; and
  a plurality of first features upon a surface of the cavity; and
the demountable insert, the demountable insert is one of a plurality of demountable inserts each sized for insertion into the cavity within the front face of the housing and capable of insertion and removal, the demountable insert comprising a second part of the retention means to retain the demountable insert when inserted into the cavity, a plurality of second contacts to electrically contact a predetermined subset of the plurality of first contacts, and a plurality of second features; wherein
the plurality of first features when aligned with the plurality of second features allow full insertion of the demountable insert into the cavity such that the plurality of second contacts electrically contact the predetermined subset of the plurality of first contacts.

In accordance with an embodiment of the invention there is provided a device comprising:
- a housing having at least a front face comprising;
  - a mounting means to affix the housing to another device which is at least one of a portable electronic device, a fixed electronic device, a wearable electronic device, a portable electrical device, a fixed electrical design, and a wearable electrical device;
  - a plurality of first electrical interfaces, each first electrical interface allowing connection to a predetermined electrical signal forming part of an electrical power distribution network;
  - an electrical circuit coupled to the plurality of first electrical interfaces for generating at least one of one or more electrical power signals and one or more electrical data signals; and
  - a plurality of first contacts, each first contact coupled to a predetermined one of the at least one of one or more electrical power signals and one or more electrical data signals;
  - a cavity disposed within the front face of the housing allowing the insertion and removal of a demountable insert into and from the front face when the housing is mounted within the electrical utility work box with the faceplate attached and comprising a first part of a retention means to retain the demountable insert within the cavity accessible through a first opening in the faceplate and comprising the plurality of first contacts; and
  - a plurality of first features upon a surface of the cavity; and
- the demountable insert, the demountable insert is one of a plurality of demountable inserts each sized for insertion into the cavity within the front face of the housing and capable of insertion and removal, the demountable insert comprising a second part of the retention means to retain the demountable insert when inserted into the cavity.

In accordance with an embodiment of the invention there is provided a device comprising:
- a housing to fit within an electrical utility work box comprising at least a front face; the housing comprising;
  - a first mounting means to affix the housing to the electrical utility work box;
  - a second mounting means to affix the faceplate to the housing;
  - a plurality of first electrical interfaces, each first electrical interface allowing connection to a predetermined electrical signal forming part of an electrical power distribution network;
  - an electrical circuit coupled to the plurality of first electrical interfaces for generating at least one of one or more electrical power signals and one or more electrical data signals; and
  - a plurality of first contacts, each first contact coupled to a predetermined one of the at least one of one or more electrical power signals and one or more electrical data signals; and
  - a cavity disposed within the front face of the housing allowing the insertion and removal of a demountable insert into and from the front face of the housing when the housing is mounted within the electrical utility work box and comprising a first part of a retention means to retain the demountable insert when inserted into the cavity; wherein
  - the demountable insert is sized for insertion into the cavity within the front face of the housing and comprises a second part of the retention means to retain the demountable insert when inserted into the cavity and a plurality of second contacts;
  - each second contact of the plurality of second contacts electrically contacts a predetermined first contact of a predetermined subset of the plurality of first contacts;
  - the predetermined subset of the plurality of first contacts is established in dependence upon the demountable insert of the plurality of demountable inserts inserted into the cavity; and
  - the demountable insert comprises at least one of:
    - a body having the plurality of second contacts disposed upon a first rear surface and a plurality of third contacts disposed upon a second distal front surface for connection to an electrical plug of a predetermined electrical standard to be demountably attached to the body;
    - a body having the plurality of second contacts disposed upon a first rear surface and a plurality of third contacts disposed upon a second distal front surface for connection to an electrical socket of a predetermined electrical standard to be demountably attached to the body; and
    - a body having the plurality of second contacts disposed upon a first rear surface and comprises a plurality of sensors.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 17 depicts a configurable receptacles according to embodiments of the invention;

DETAILED DESCRIPTION

Figure 1:
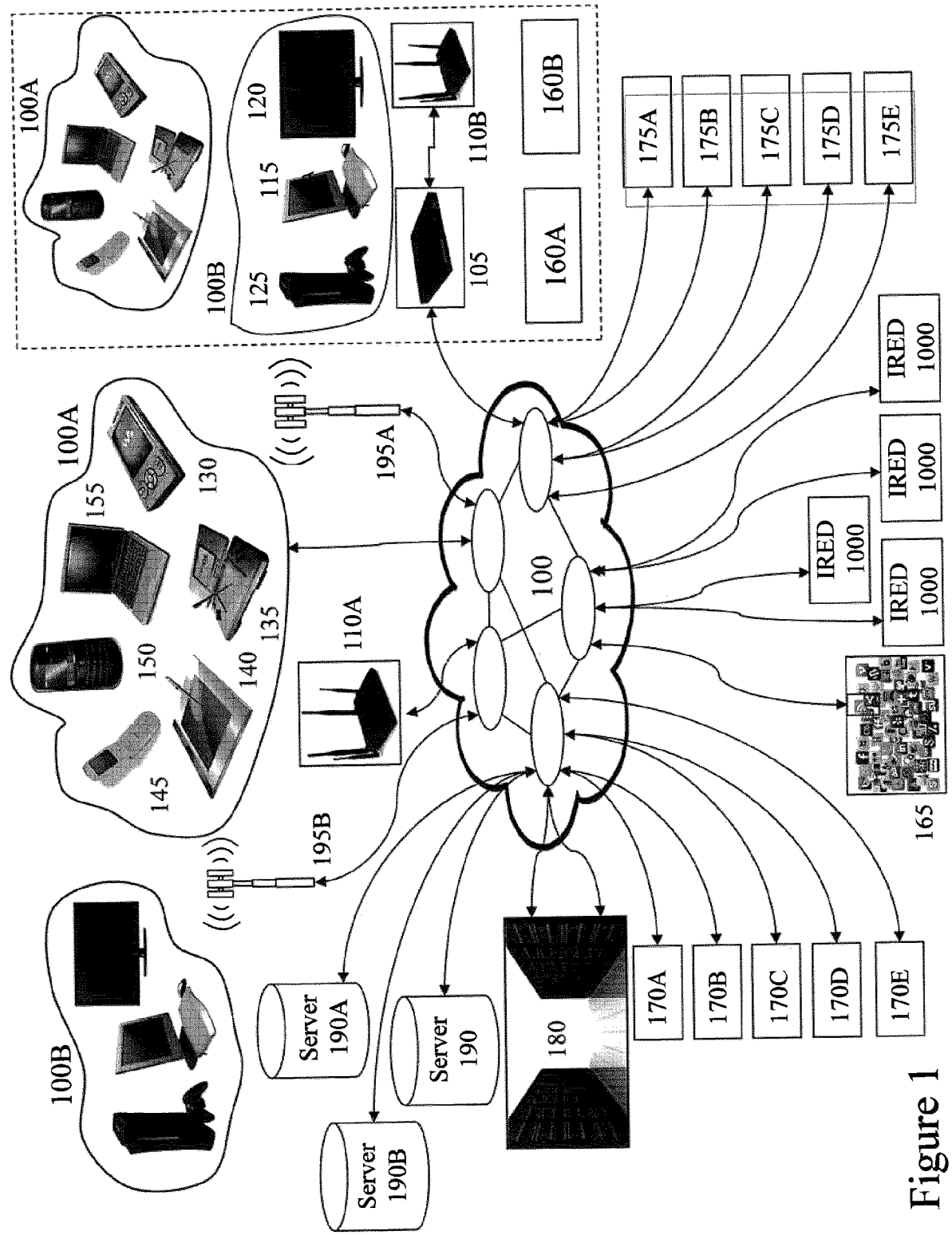
FIG. 1 depicts an exemplary network environment within which configurable electrical devices according to and supporting embodiments of the invention may be deployed and operate.

The present invention is directed to configurable electrical receptacles and more particularly to intelligent configurable electrical receptacles and intelligent electrical inserts for configurable electrical receptacles allowing increased functionality, connectivity, intelligence, decision making, and communications within distributed applications such as industrial automation, home automation, and business automation.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

An "electrical receptacle" or "receptacle" as used herein and throughout this disclosure, refers to, but is not limited to a housing design designed to be assembled with or inserted into another element, such as a work box, electrical utility work box, portable electrical device, portable electronic device, fixed electronic device, fixed electrical device, wearable device, etc., and connected to one or more electrical cables providing power distribution/signal distribution within the environment exploiting embodiments of the invention which may for example be residential, commercial, industrial, entertainment and retail. An electrical receptacle may be manufactured with or without a predetermined function, e.g. an electrical outlet or a lighting switch, or it may be configurable as described below in respect of embodiments of the invention.

An electrical receptacle may include, but not be limited to, simplex, duplex, commercial grade, residential (decorator) grade, hospital grade, ground fault circuit interrupter (GFCI), surge protective, arc fault circuit interrupter (AFCI), and tamper resistant. Electrical receptacles may be 110V/120V, 220V/230V/240V, 50 Hz, 60 Hz, 5 A, 6 A, 10 A, 13 A, 15 A, 20 A, polarized, unpolarised, earthed, fused, ground fault interrupted, and arc circuit interrupted. Typically, the electrical receptacle will include a retention means for fastening a faceplate onto the electrical receptacle covering the exposed portions of the electrical receptacle/electrical utility work box.

A "work box" or "electrical utility work box" as used herein and throughout this disclosure, refer to, but is not limited to, the housing that an electrical receptacle is assembled into. As such a work box can include so-called handy box, junction box, new work boxes, old work boxes, outdoor boxes, standard rectangular boxes, square boxes, circular or octagonal boxes, and ceiling boxes. A work box may be formed from metal, plastic or PVC. Some electrical utility work boxes are defined as being 1-gang/2-gang/3-gang/4-gang etc. which defines the width such that they may contain multiple electrical receptacles as a typical electrical power outlet or electrical switch is 1-gang wide (i.e. they can be ganged together within the work box).

An "electrical outlet" as used herein and throughout this disclosure, refer to, but is not limited to, an electrical receptacle that is configured for providing electrical power, typically at so-called "mains" voltage being that supplied to the environment the outlet is deployed within by the electrical distribution network. As such the "mains" voltage is defined by region/country globally. Electrical receptacles may be 110V/120V, 220V/230V/240V, 50 Hz, 60 Hz, 5 A, 6 A, 10 A, 13 A, 15 A, 20 A, polarized, unpolarised, earthed, fused, employ insulated pins, have an even number of pins, and have an odd or even number of pins etc. and employ ground fault and/or arc fault interrupter circuits that trigger under predetermined conditions to disable the outlet until the fault is corrected and the circuit reset. However, electrical outlets may provide DC power or AC power at a different current and/or voltage than that to which they are connected depending upon their configuration.

A "switch receptacle" as used herein and throughout this disclosure, refer to, but is not limited to, an electrical receptacle that is configured for providing switching functionality, e.g. turning on/off a light or lights or an electrical device/system for which the switching functionality controls power. A switch receptacle may provide control of an electrical distribution circuit, e.g. be a circuit breaker, or distribution panel comprising other switch receptacles, e.g. circuit breakers. Accordingly, a switch receptacle may vary, for example, in the number of switches and their wired interconnection(s) such that the switch may be single pole, double pole, etc. The switch may control the same voltage and/or current as that which powers the switch receptacle to provide the inserts with functionality or alternatively, the switch may control connection and/or disconnection of a system at a different voltage either derived from the power supply that powers the receptacle or coupled to the switch receptacle via a separate connection. Accordingly, a switch may be powered from and/or controlling an electrical circuit at 110V/120V, 220V/230V/240V, 50 Hz, 60 Hz, 5 A, 6 A, 10 A, 13 A, 15 A, 20 A alternating current (AC), direct current (DC), 12V, 24V, and 48V.

A "plug" as used herein and throughout this disclosure, refer to, but is not limited to, one half of an electrical connector with the other half being the socket. The plug is usually considered the male portion of an electrical connector and comprises one or more pins or jacks that are designed to mate with their corresponding socket.

A "socket" as used herein and throughout this disclosure, refer to, but is not limited to, one half of an electrical connector with the other half being the plug. The socket is usually considered the female portion of an electrical connector and comprises one or more openings that are designed to mate with their corresponding plug pins or jack.

An "electrical connector", is an electro-mechanical device used to join electrical terminations and create an electrical circuit. Electrical connectors typically consist of plugs (male-ended) and jacks (female-ended). The connection may be made/unmade manually or may require a tool for assembly and removal.

A "faceplate" (also referred to as wall plate, outlet cover, or socket cover) as used herein and throughout this disclosure, refer to, but is not limited to, a typically plastic cover designed to fit around and/or over an electrical receptacle or switch receptacle and enclose said receptacle within the work box whilst overlapping the surrounding wall/ceiling etc. to provide an aesthetically and/or functional cover.

Some faceplates may include a cover to protect the socket when not in use such as in wet outdoor environments for example.

An "electrical contact" as used herein and throughout this disclosure, refer to, but is not limited to, an electrical connection between a first element (e.g. a pin of a plug) with a second element (e.g. a receptacle within a socket). Such electrical contacts may be around the periphery of the pin, on a particular surface of the pin, or particular surface of the pin. Some electrical contacts may be sprung to maintain connection over a range of relative positions of the two elements.

A "demountable insert" or "insert" as used herein and throughout this disclosure, refer to, but is not limited to, an assembly designed to be inserted within an opening/recess within an electrical and/or switch receptacle. Accordingly, a demountable insert may be inserted/removed through the faceplate without requiring the removal of the face plate.

A "retention means" as used herein and throughout this disclosure, refer to, but is not limited to, a means of attaching one element to another element. As such a retention means may include, but not be limited, a screw, a bolt, a nut and bolt, a latch, and a clip.

An "electrical supply" as used herein and throughout this disclosure, refer to, but is not limited to, an electrical power supply to which an electrical receptacle or switch receptacle is connected in order to provide electrical power for the receptacle, its user accessible features such as a socket, switch, etc. and provides power to the demountable insert(s) supported by the electrical receptacle. In most instances the electrical supply is the general-purpose alternating-current (AC) electric power supply received at the residence, retail building, office, commercial building etc. However, in other instances it may be a different AC electrical power supply derived from the general-purpose AC or another power supply such as a generator. In other instances, the electrical supply may be a direct-current (DC) electrical supply. General-purpose AC is typically 110V/120V or 220V/230V/240V at either 50 Hz or 60 Hz. However, in other instances it may be at other frequencies such as 400 Hz for example in avionics applications.

A "wireless standard" as used herein and throughout this disclosure, refer to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "user" as used herein may refer to, but is not limited to, an individual or group of individuals. This includes, private individuals, employees of organizations and/or enterprises, members of community organizations, members of charity organizations, men, women and children. In its broadest sense the user may further include, but not be limited to, mechanical systems, robotic systems, android systems, etc. that may be characterised by an ability to exploit one or more embodiments of the invention.

A "sensor" as used herein may refer to, but is not limited to, a transducer providing an electrical output generated in dependence upon a magnitude of a measure and selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

A "portable electronic device" or "portable electrical device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, an electronic reader, a lamp, a heater, and a portable beverage machine.

A "fixed electronic device" or "fixed electrical device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, a multimedia player, a television, a heater, a light, a beverage machine, a food dispenser, a microwave, an oven, and a refrigerator.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

"Metadata" as used herein, and throughout this disclosure, refers to information stored as data that provides information about other data. Many distinct types of metadata exist, including but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

An "artificial intelligence system" (referred to hereafter as artificial intelligence, AI) as used herein, and throughout disclosure, refers to machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

1: Network Environment and Device Associations

Referring to FIG. 1 there is depicted a Network 100 within which embodiments of the invention may be employed supporting Artificial Intelligence Assisted Living (AIAL) Systems, Applications and Platforms (AIAL-SAPs) according to embodiments of the invention. Such AIAL-SAPs, for example, supporting multiple communication channels, dynamic filtering, etc. As shown first and second user groups 100A and 100B respectively interface to a telecommunications Network 100. Within the representative telecommunication architecture, a remote central exchange 180 communicates with the remainder of a telecommunication service providers network via the Network 100 which may include for example long-haul OC-48/ OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B respectively. Also connected to the Network 100 are first and second Wi-Fi nodes 110A and 110B, the latter of which being coupled to Network 100 via router 105. Second Wi-Fi node 110B is associated with commercial service provider 160, e.g. Gillette Stadium™, comprising other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the Network 100 are Social Networks (SOCNETS) 165, first and second service providers 170A and 170B respectively, first and second third party service providers 170C and 170D respectively, and a user 170E. Also connected to the Network 100 are first and second enterprises 175A and 175B respectively, first and second organizations 175C and 175D respectively, and a government entity 175E. Also depicted are first and second servers 190A and 190B may according to embodiments of the inventions multiple services associated with a provider of contact management systems and contact management applications/platforms (AIAL-SAPs); a provider of a SOCNET or Social Media (SOME) exploiting AIAL-SAP features; a provider of a SOCNET and/or SOME not exploiting AIAL-SAP features; a provider of services to PEDS and/or FEDS; a provider of one or more aspects of wired and/or wireless communications; an Enterprise 160 such as Multiple Listing Service (MLS) exploiting AIAL-SAP features; license databases; content databases; image databases; content libraries; customer databases; websites; and software applications for download to or access by FEDs and/or PEDs exploiting and/or hosting AIAL-SAP features. First and second primary content servers 190A and 190B may also host for example other Internet services such as a search engine, financial services, third party applications and other Internet based services.

Also depicted in FIG. 1 are Intelligent Reconfigurable Electronic Devices (IREDs) 100 according to embodiments of the invention such as described and depicted below in respect of FIGS. 3A to 4b. As depicted in FIG. 1 the IREDs 100 communicate directly to the Network 100. The IREDs 100 may communicate to the Network 100 through one or more wireless or wired interfaces included those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides AIAL-SAP features according to embodiments of the invention; execute an application already installed providing AIAL-SAP features; execute a web based application providing AIAL-SAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A. It would also be evident that a CONCUS may, via exploiting Network 100 communicate via telephone, fax, email, SMS, social media, etc.

Figure 2:
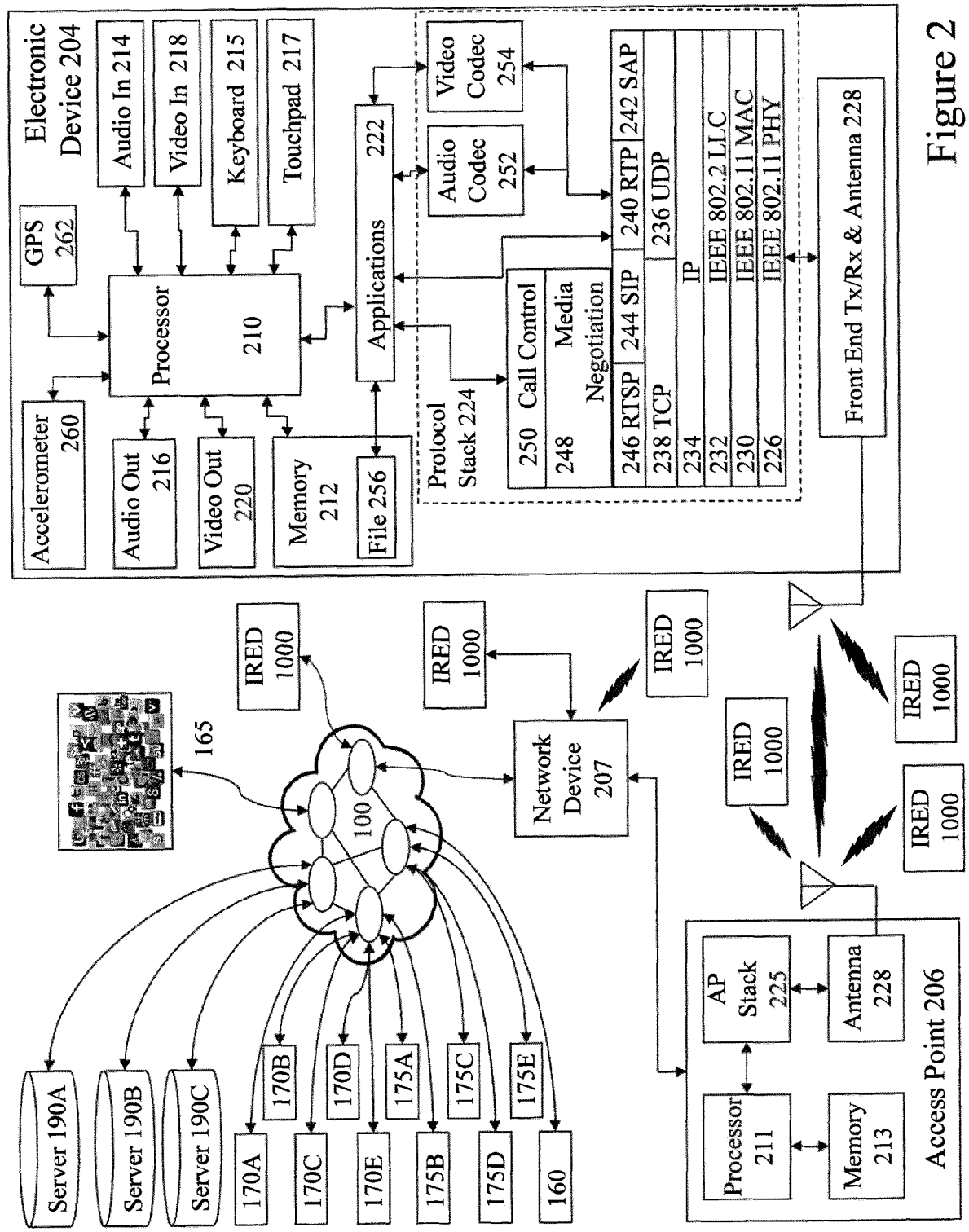
FIG. 2 depicts an exemplary wireless portable electronic device supporting communications to a network such as depicted in FIG. 1 and configurable electrical devices according to and supporting embodiments of the invention.

Now referring to FIG. 2 there is depicted an Electronic Device 204 and network access point 207 supporting AIAL-SAP features according to embodiments of the invention. Electronic Device 204 may, for example, be a PED and/or FED and may include additional elements above and beyond those described and depicted. Also depicted within the Electronic Device 204 is the protocol architecture as part of a simplified functional diagram of a system 200 that includes an Electronic Device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to Network 100 and therein Social Networks (SOCNETS) 165, first and second service providers 170A and 170B respectively, first and second third party service providers 170C and 170D respectively, a user 170E, first and second enterprises 175A and 175B respectively, first and second organizations 175C and 175D respectively, and a government entity 175E.

The Electronic Device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 204 may include an audio input element 214, for example a microphone, and an audio output element 216, for example, a speaker, coupled to any of processors 210. Electronic Device 204 may include a video input element 218, for example, a video camera or camera, and a video output element 220, for example an LCD display, coupled to any of processors 210. Electronic Device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the Electronic Device 204. The one or more applications 222 that are typically stored in memory 212 and are executable by any combination of processors 210. Electronic Device 204 also includes accelerometer 260 providing three-dimensional motion input to the process 210 and GPS 262 which provides geographical location information to processor 210.

Electronic Device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PITY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the Electronic Device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by Electronic Device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R R 5.150, ITU-R 5.280, IMT-1000, DSL, Dial-Up, DOCSIS, Ethernet, G.hn, ISDN, MoCA, PON, and Power line communication (PLC).

Also depicted in FIG. 2 are Intelligent Reconfigurable Electronic Devices (IREDs) 100 according to embodiments of the invention such as described and depicted below in respect of FIGS. 3A to XXX. As depicted in FIG. 2 an IREDs 100 may communicate directly to the Network 100. Other IREDs 100 may communicate to the Network Device 207, Access Point 206, and Electronic Device 204. Some IREDs 100 may communicate to other IREDs 100 directly. Within FIG. 2 the IREDs 100 coupled to the Network 100 and Network Device 207 communicate via wired interfaces. The IREDs 100 coupled to the Access Point 206 and Electronic Device 204 communicate via wireless interfaces. Each IRED 100 may communicate to another electronic device, e.g. Access Point 206, Electronic Device 204 and Network Device 207, or a network, e.g. Network 100. Each IRED 100 may support one or more wireless or wired interfaces including those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, FIG. 2 depicts an Electronic Device 204, e.g. a PED, wherein one or more parties including, but not limited to, a user, users, an enterprise, enterprises, third party provider, third party providers, wares provider, wares providers, financial registry, financial registries, financial provider, and financial providers may engage in one or more financial transactions relating to an activity including, but not limited to, e-business, P2P, C2B, B2B, C2C, B2G, C2G, P2D, and D2D via the Network 100 using the electronic device or within either the access point 206 or network device 207 wherein details of the transaction are then coupled to the Network 100 and stored within remote servers.

Optionally, rather than wired and./or wireless communication interfaces devices may exploit other communication interfaces such as optical communication interfaces and/or satellite communications interfaces. Optical communications interfaces may support Ethernet, Gigabit Ethernet, SONET, Synchronous Digital Hierarchy (SDH) etc.

2: Reconfigurable Receptacles Via Insert

Figure 3B:
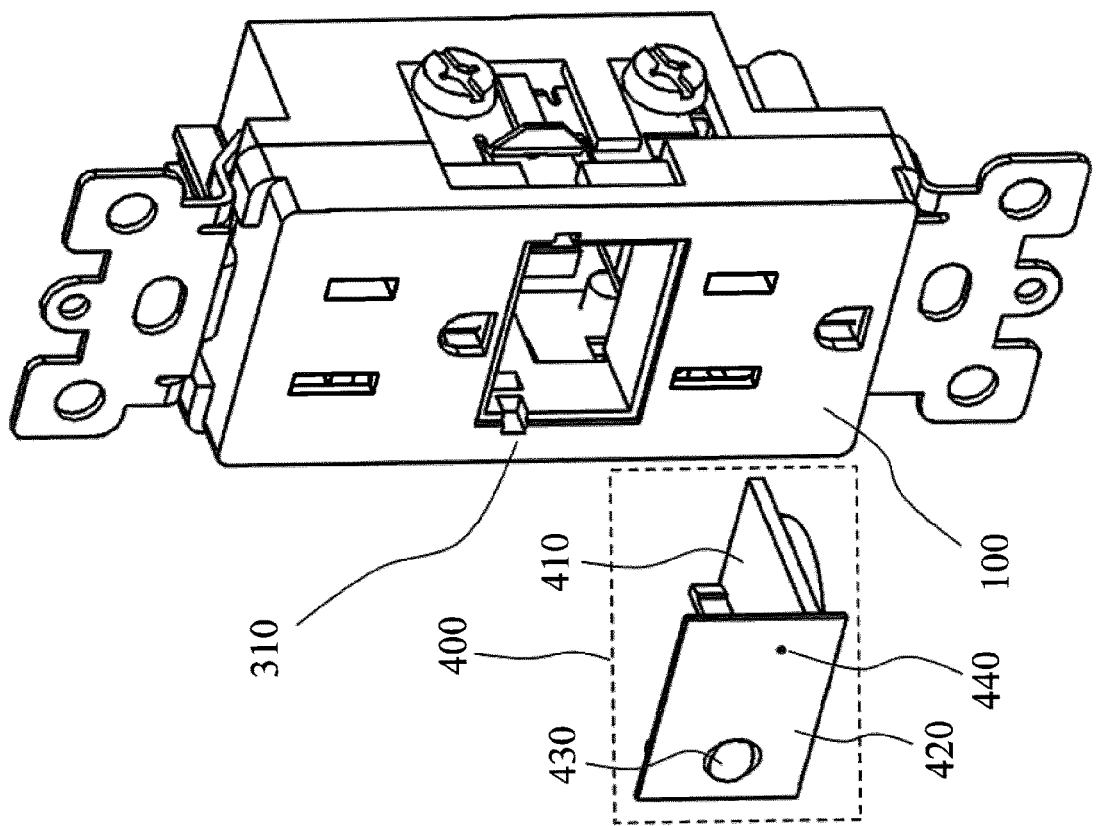
FIG. 3B shows the insert of FIG. 3A removed from the interface cavity of the exemplary wall receptacle according to an embodiment of the invention.
Figure 3A:
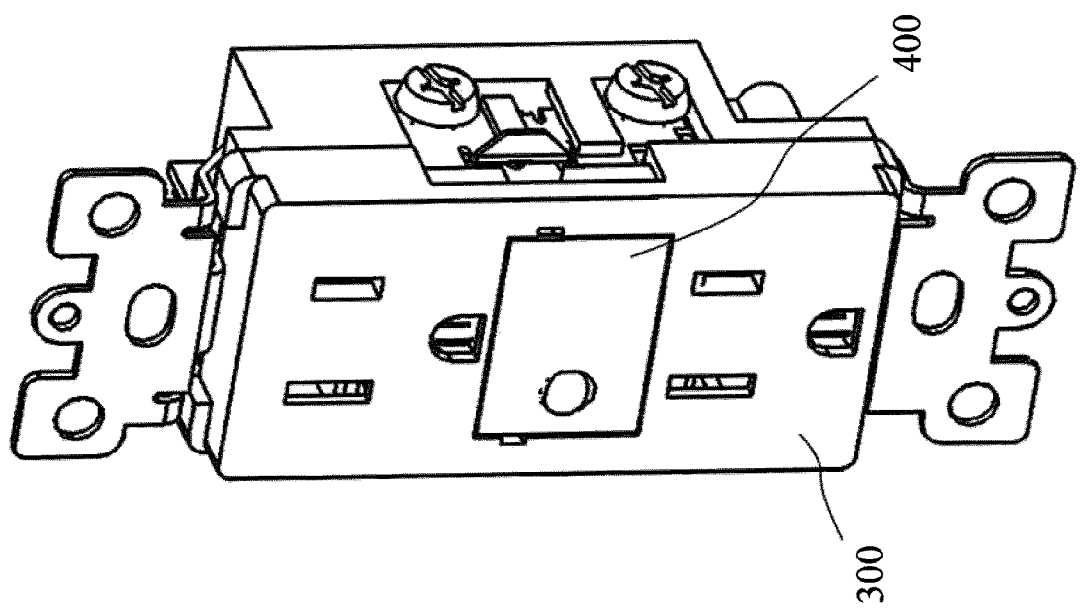
FIG. 3A depicts an exemplary assembled wall receptacle and insert according to an embodiment of the invention.

Now referring to FIG. 3A there is depicted an exemplary assembled wall receptacle and insert according to an embodiment of the invention comprising a Receptacle 300 which has been modified to accept Insert 400. The Receptacle 300 provides two outlets in what is referred to as a decora-style configuration. In this configuration, the outlets are vertically spaced from each other, and a faceplate serves to surround the central structure that houses the outlets. In such a configuration, Insert 400 is placed into a cavity between the two outlets. A decora-style faceplate can be attached to the receptacle without any modification. This allows for compatibility with a large number of existing elements, and allows for easy retrofitting. Existing infrastructure within a building can be retrofitted to these receptacles, such as Receptacle 300, with no tools other than a standard screwdriver.

FIG. 3B provides an exploded view of the Receptacle 300 and Insert 400. Insert 400 is inserted into Cavity 110 in Receptacle 300. As noted above, Receptacle 300 can be accommodated into a standard decora-style faceplate. Insert 400 provides a physical electrical interface for various insert configurations, each of which can provide alternate functionality. In the illustrated embodiment, Insert 400 provides illumination via Light 430, although alternate inserts can provide other functions such as chargers for different connection, additional outlets, smoke detectors, wireless nodes, microphones, loudspeakers, sensors and other functions that will be apparent to those skilled in the art. Insert 400 includes a printed circuit board (PCB) 410 that houses the control circuitry and elements for the intended functionality. Faceplate 420 provides a cover that matches with surface of the receptacle although within other embodiments of the invention it may be different, textured differently, coloured differently, prominent or recessed. On the Faceplate 420 is provided the Light 430, for example a light emitting diode (LED), and a Test Switch 440 which can be used to determine if the insert is functional.

Figure 3C:
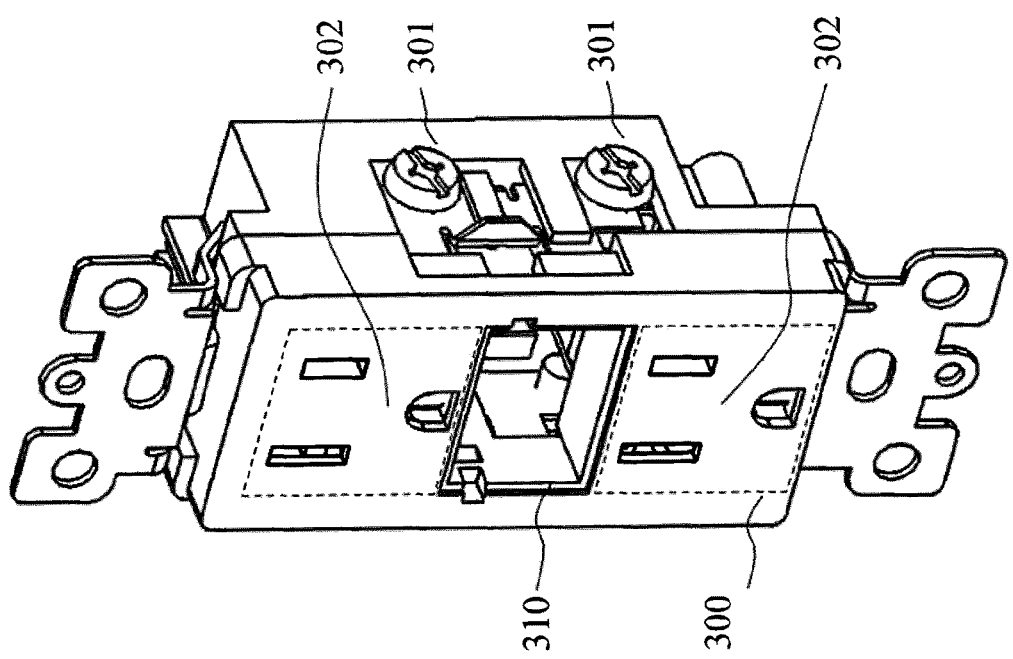
FIG. 3C depicts an exemplary wall receptacle according to an embodiment of the present invention with the insert removed.

Now referring to FIG. 3C there is depicted an exemplary wall Receptacle 300 according to an embodiment of the present invention with the insert removed. As shown, the body of the Receptacle 300 provides a Cavity 310 within which the insert can be inserted or removed from when the Receptacle 300 is mounted within an electrical work box and a wall plate attached such that only the front face of the Receptacle 300 is accessible to the user. The Receptacle 300 providing typical electrical connection means to main power, e.g. 120V AC, 240V AC, 100V AC etc. through the Receptacle Plugs 302 on the front face for the user to access and installation Screw Terminals 301 on the sides and/or rear of the Receptacle 300 to connect to the mains supply. Whilst the Receptacle 300 is depicted with 3-pin North American Receptacle Plugs 302 in FIG. 3C it would be evident that other Receptacle Plugs 302 may be provided to meet the electrical standards of one or more jurisdictions within which the Receptacle 300 will be employed. Further, whilst the mains power has been described above as being 120V AC, 240V AC, 100V AC for residential mains within North America, Europe and Japan respectively it would be evident that other voltages may be employed for which the Receptacle 300 and/or the insert (not shown for clarity), e.g. Insert 400 in FIGS. 3A and 3B respectively, as well as DC operation. Within embodiments of the invention:

the Receptacle 300 may receive AC power at a first voltage and provide AC power at a second voltage to the insert through electrical connections within the Cavity 310 such as described below;

the Receptacle 300 may receive AC power at a first voltage and provide DC power at a second voltage to the insert through electrical connections within the Cavity 310 such as described below;

the Receptacle 300 may receive DC power at a first voltage and provide AC power at a second voltage to the insert through electrical connections within the Cavity 310 such as described below; and the Receptacle 300 may receive DC power at a first voltage and provide DC power at a second voltage to the insert through electrical connections within the Cavity 310 such as described below.

Within other embodiments of the invention the Receptacle 300 may receive electrical power at a first frequency and provide electrical power at a second frequency. The first frequency may, for example, be 50 Hz, 60 Hz, 400 Hz etc. The Receptacle 300 may receive DC power at predetermined voltages including, but not limited to, 48V and 60V. Whilst in most embodiments of the invention the electrical power received by a Receptacle 300 may be according to a standard, e.g. national standard, international standard, application standard (e.g. telecommunications, aircraft etc.), etc. in other embodiments of the invention the electrical power received may be at a standard set by a manufacturer. Whilst in most embodiments of the invention the electrical power provided by a Receptacle 300 to an insert may be according to a standard, e.g. national standard, international standard, application standard (e.g. telecommunications, aircraft, etc.), etc. in other embodiments of the invention the electrical power received may be at a standard set by a manufacturer of either the inserts and/or the Receptacles 300.

Figure 4A:
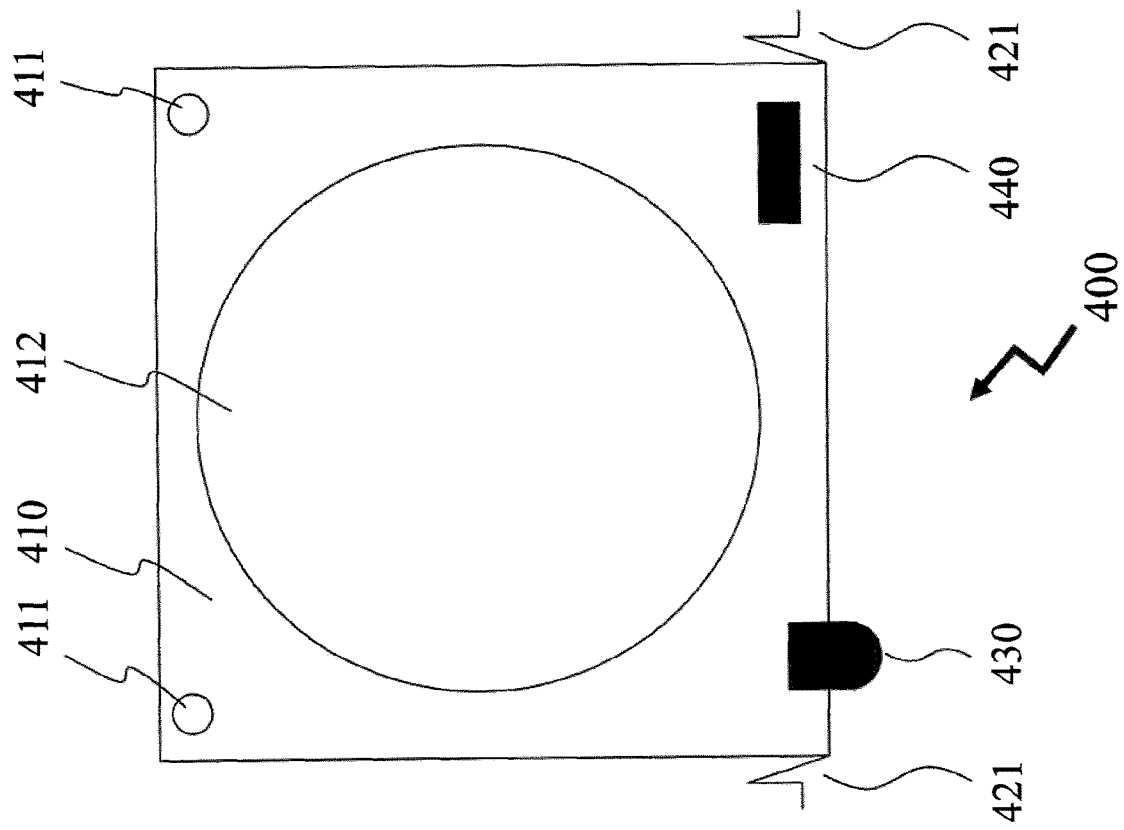
FIG. 4A depicts an exemplary representation of a component layout of an insert according to an embodiment of the invention.

Now referring to FIG. 4A there is depicted an exemplary representation of a component layout of an Insert 400 according to an embodiment of the invention. As depicted the PCB 410 of the Insert 400 includes Contacts 411 which connect to other contacts within the cavity of the receptacle such that power from the receptacle can be provided to the Insert 400. As depicted in FIG. 4A a Battery 412 is provided upon the PCB 410 which is used to provide power to the Light 430 (e.g. an LED or LEDs) such as during a power outage to the receptacle within which the Insert 400 fits (e.g. emergency lighting). illustrated in FIG. 3, embodiments of the present invention can provide a battery 212 on the PCB 210. As described below the Contacts 411 provide a mechanism for connection to power once the Insert 400 is fully inserted into the cavity of the receptacle, e.g. Cavity 310 in Receptacle 300 as depicted in FIG. 3C. Further, as described below the design of the rear of the PCB 410 and/or Contacts 411 may provide for orientated keying of the Insert 400 or prevent certain inserts being used within certain receptacles etc.

The assembled Insert 400 within some embodiments of the invention is retained within the Receptacle 300 by a mounting mechanisms such as Latches 421, e.g. plastic latches, on the insert. These latches can provide protection from accidental removal and child protection as the removal of such embodiments of the invention with latches require a small screwdriver or specialized tool on both the left and right side of the insert to unlock the Latches 421 for removal. The Latches 421 engaging mating Latch Receptacles 320 as depicted in FIG. 3C. Within other embodiments of the invention the mounting mechanism may be a screw in retention means for example, a sliding retainer engagement, etc. In some embodiments of the invention no retention means is provided except, potentially, that of a rear connector on the insert engaging a connector within the cavity of the receptacle.

Figure 4B:
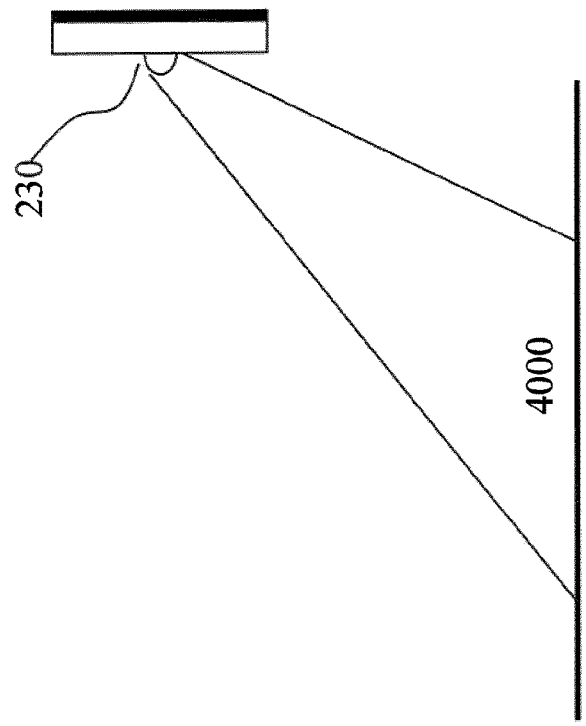
FIG. 4B depicts floor illumination from an insert within an exemplary assembled wall receptacle according to an embodiment of the invention.

For illumination-based inserts, a Light 230, e.g. a high intensity LED, provides floor illumination 4000 as indicated in FIG. 4B. Optionally, the insert may have a series of LEDs and/or have a visual LED based indicator such that an image is projected as the floor illumination 4000. Whilst, this this may not provide the same degree of illumination as a dedicated emergency light the employment of LED based lighting within the Receptacles 300 allows for a number of distributed emergency lights to be employed. Accordingly, this can provide a distributed emergency lighting within an area as opposed to a large centralized point source of light. If Light 430 exploits LEDs, as illustrated in the embodiments, the power-on time provided by the battery can exceed the time provided by a conventional battery backup light that makes use of halogen or standard incandescent lighting.

As will become evident from the following descriptions in respect of FIGS. 5A to 28 a variety of functions can be implemented within the inserts, e.g. Insert 400. It would be evident to one of skill in the art that some inserts, e.g. Insert 400, may provide multiple functionality. It would also be evident to one of skill in the art that the functionality, number of functions, etc. within an insert, e.g. Insert 400, may depend upon a variety of factors including, but not limited to, cost, format of insert, size of insert, technology employed in implementing the function(s) of the insert, available power, legal requirements, jurisdictional constraints, and function specifications.

Figure 5A:
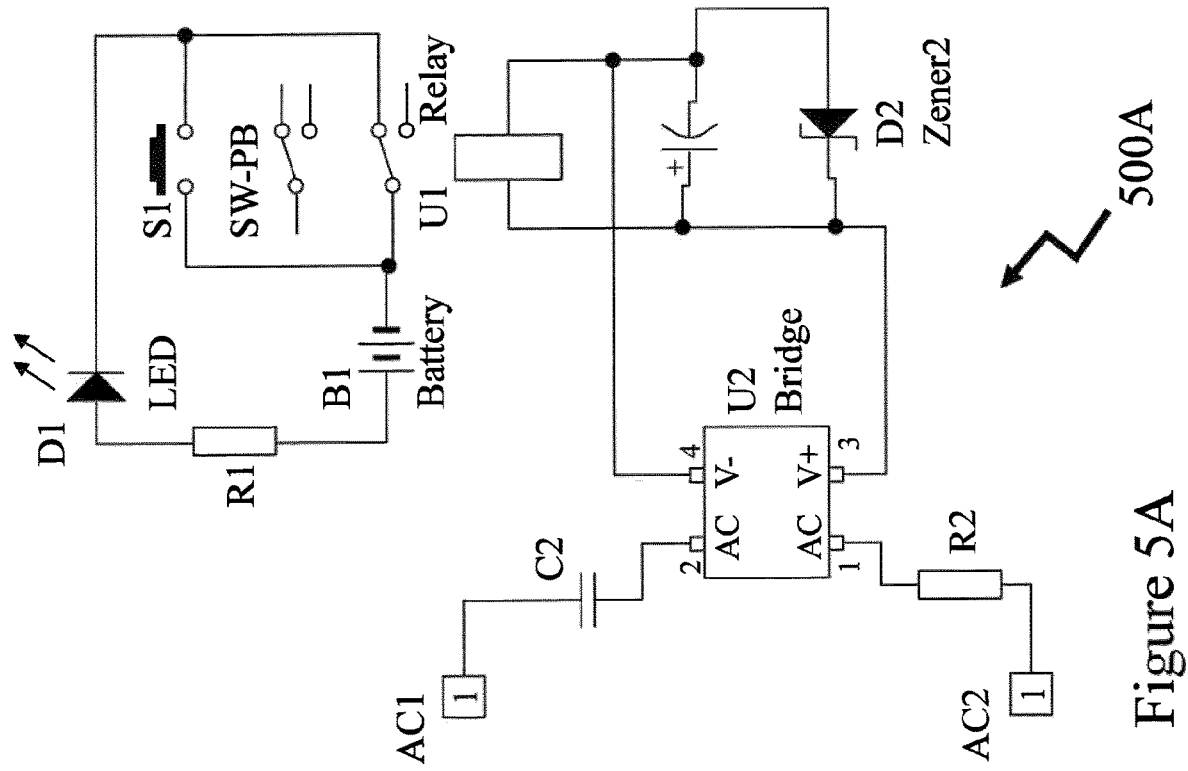
FIG. 5A depicts an exemplary electrical circuit schematic for use within a power out lighting insert according to an embodiment of the invention.

Referring to FIG. 5A there is depicted an exemplary schematic of an electrical circuit (Circuit) 500A for use within a power out lighting insert according to an embodiment of the invention. During operation the Circuit 500A presented obtains a low power rectified signal from the 120 VAC main voltage coupled to the circuit via the contacts AC1 and AC2. For operation from 220-240 AC the value of C2 is halved. The rectified voltage generated by the Bridge U2 powers a relay such that the NO contact is engaged which disconnects the battery from the LED D1. When power is removed (i.e. a power black-out) the relay triggers the NC contact and the LED D1 illuminates for as long as power is off or until the battery is drained (which can be greater than 60 hours with appropriate battery, Battery B1. At any time, the LED D1 and Battery B1 can be tested via an external push button S1. Higher illumination intensity can be achieved by reducing R1 albeit at the expense of total illumination time. In an alternate embodiment, a rechargeable battery can be employed and can be charged during non-blackout periods. Optionally, within another embodiment of the invention the insert may receive only the rectified DC voltage such that the Bridge U2, capacitor C2, and second Resistor R2 are disposed within the receptacle, e.g. Receptacle 300 in FIGS. 3A to 3C respectively. Accordingly, the contacts AC1 and Ac2 would be disposed after the Bridge U2.

Figure 5C:
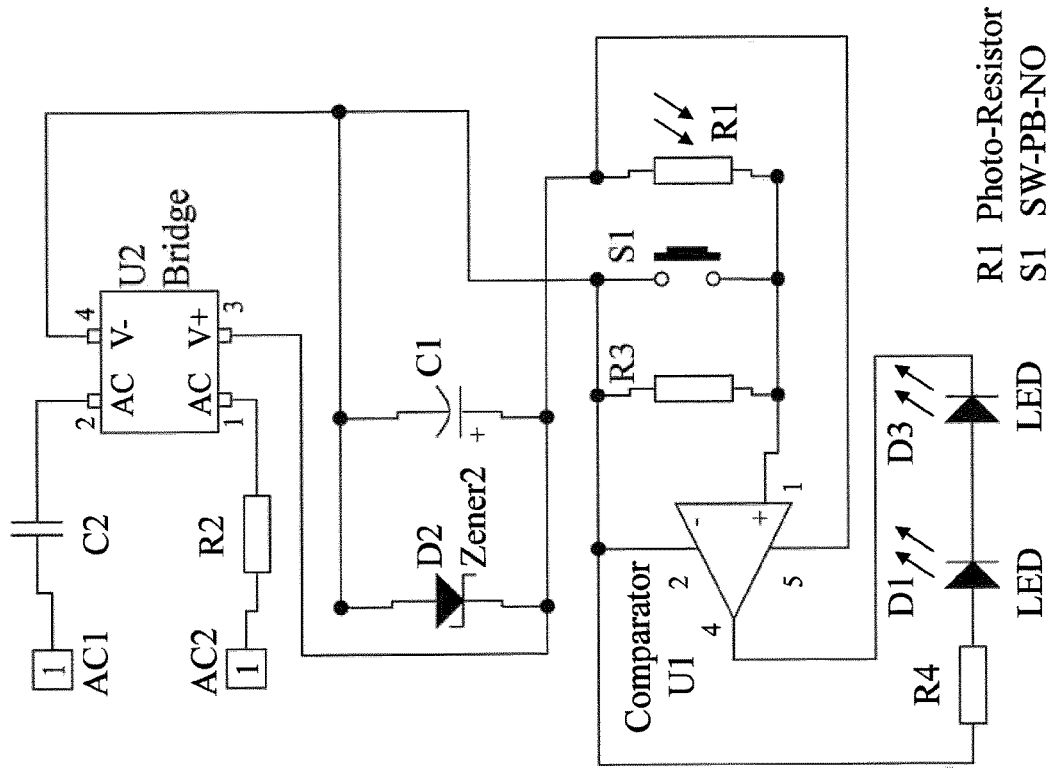
FIG. 5C depicts an exemplary electrical circuit schematic for a "night light" lighting insert according to an embodiment of the invention.
Figure 5B:
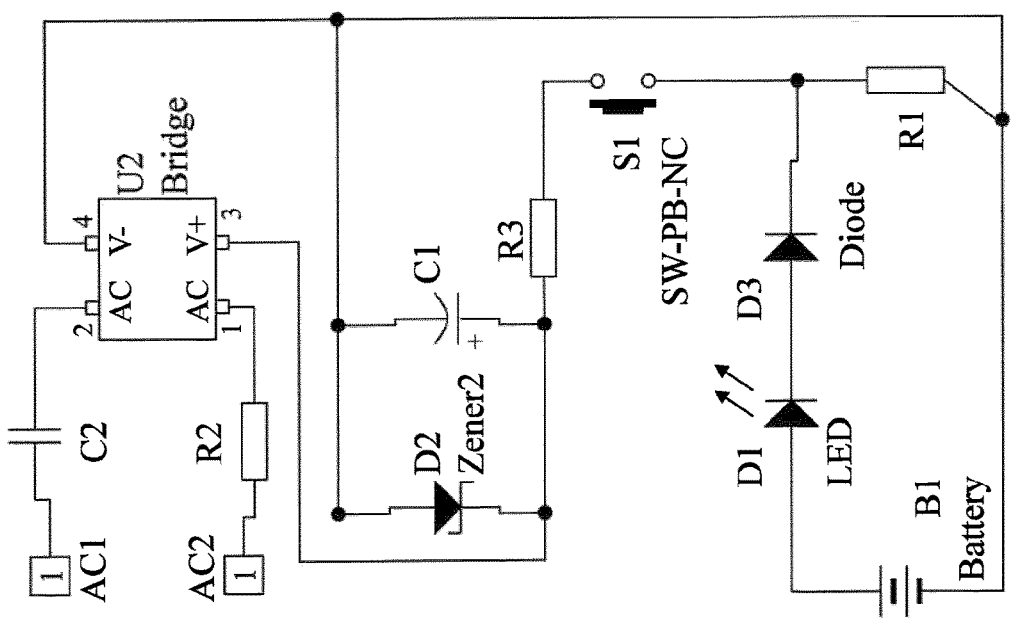
FIG. 5B depicts an exemplary electrical circuit schematic for a diode-based power out lighting insert according to an embodiment of the invention.

Now referring to FIG. 5B there is depicted an exemplary electrical circuit schematic (Circuit) 500B for a diode-based power out lighting insert according to an embodiment of the invention. Whilst performing the same emergency lighting function as Circuit 500A in FIG. 5A, the relay has been removed and a passive voltage difference is used to enable or disable the LED light. In common with Circuit 500A in FIG. 5A then Circuit 500B receives power via contacts A1 and A2 and initially generates a low power rectified signal via Bridge U2. As with Circuit 500A then the design depicted is targeted at 120V AC operation and accordingly the value of C2 would be reduced for 220-240V AC operation. The rectified voltage from the Bridge U2 is employed to a potential between R3 and R1 that is higher than the battery voltage (3V). This creates a reverse bias state in diodes D3 and D1. In this reverse bias state, current cannot flow from the battery to the LED. When power is removed (i.e. power black-out) this higher voltage potential is removed, power can flow from the battery, and the LED illuminates for as long as power is off or until the battery is drained. At any time, the LED and battery can be tested via an external push button S1. Higher illumination intensity can be achieved by reducing R1, although this would reduce the total illumination time.

Referring to FIG. 5C there is depicted an exemplary electrical circuit schematic (Circuit 500C) for a "night light" lighting insert according to an embodiment of the invention. In operation in common with Circuits 500A and 500B in FIGS. 5A and 5B respectively then the Circuit 500C generates an initial rectified low voltage signal via Bridge U2 from AC power applied to the contacts AC1 and AC2. For example, the Bridge U2 generates a 6.3V rectified voltage which is used to power the remaining circuitry and drive the LED's D1 and D3 respectively. The R1/R3 voltage divider generates an input to the Voltage Comparator U1. The photoconductive cell (photoconductor) R1 has an impedance of 1 MΩ in the dark and 45 kΩ in the light. Internal to the voltage comparator is a 1.24V reference such that during the day (i.e. under natural or artificial lighted conditions) the input voltage to the comparator would be between 3.0 and 2.0V. Once the light is sufficiently reduced, the impedance of R1 is decreased, the voltage input drops below 1.24V and the LED's D1 and D3 are powered. One skilled in the art will appreciate that the photoconductive cell acts as a photosensor to determine ambient light levels. When a threshold is crossed, the photosensor activates or deactivates the light as required. Other implementations of the Circuits 500A to 500C respectively in FIGS. 5A to 5C respectively would be understood by those skilled in the art.

Within other embodiments of the invention other functionalities may be provided without departing from the scope of the invention. In some embodiments of the invention the insert within the receptacle receives mains power (e.g. 120V AC), reduced AC power, DC power, regulated DC power or a combination thereof Amongst alternate inserts would be those providing for the powering/charging of other electronic devices without the requirement to consume an electrical output (receptacle plug) of the insert or provide an AC-DC adapter. For example, many PEDs, wearable devices etc. are designed to draw power for operation or charging from a Universal Serial Bus (USB) connection, e.g. USB-A, USB-B, USB-C. Accordingly, an insert may receive an AC or DC signal and contain a current converter that transforms the AC or DC current to an appropriate DC current/voltage and provides a USB connector allowing for the charging of devices, e.g. PEDs, wearable devices etc. It would be evident that the current converter can be implemented using any of a number of standard devices including transformers, rectifiers and other devices that will be well known to those skilled in the art.

Within other embodiments of the invention other functionalities may be provided without departing from the scope of the invention. In some embodiments of the invention computer network connections can be provided in inserts. Additional contacts can be provided so that computer networking cabling can be connected to the receptacle and accessed through the insert. Alternatively, power-line networking connections can be provided using industry standard interfaces. Such a design provides network connectivity to any location where a PED, FED, or wearable device is to be plugged in to an outlet of the receptacle for power. In some embodiments of the invention the insert may provide storage for a cable and connector or it may provide a network jack connection.

Within other embodiments of the invention other functionalities may be provided without departing from the scope of the invention. In some embodiments of the invention a wireless transceiver can be employed, and powered from the contacts connecting to the electrical main. The wireless transceiver can be, for example, an industry standard such as IEEE802.11, Bluetooth or a wide area networking standard such as WiMax. Optionally, an insert may support multiple wireless standards concurrently. Alternatively, a proprietary networking standard can be provided.

Although reference within FIGS. 4A, 5A, 5B and 5C has been made with respect to only two contacts it would be evident that designs may employ multiple contacts such as described and depicted below in respect of FIGS. 6A to 28 which provide multiple contacts. Such contacts may relate to power, ground, and data or a combination thereof.

Within other embodiments of the invention other functionalities may be provided without departing from the scope of the invention. In some embodiments of the invention one or more sensors may be implemented within the insert. Such sensors may include, but not be limited to, motion detectors, security system sensors, smoke detectors, radon detectors, noxious gas detectors such as carbon dioxide detectors, carbon monoxide detectors and natural gas detectors, which can be implemented by those skilled in the art by placing standard designs for these system on an insert and drawing electrical power from the power main. It would be evident to one of skill in the art that such sensors may further include, but not be limited to, environmental sensors, medical sensors, biological sensors, chemical sensors, ambient environment sensors, position sensors, motion sensors, thermal sensors, infrared sensors, visible sensors, RFID sensors, medical testing and diagnosis devices, and neurological sensors. Within other embodiments of the invention the insert may comprise control and timing functionality allowing the insert to control one or more other external devices such as irrigation systems, lighting, drug delivery systems, alarms, etc. As will be described below such control and timing functionality may include the provisioning of embedded or remotely accessed artificial intelligence (AI) in the decision making.

Figure 6A:
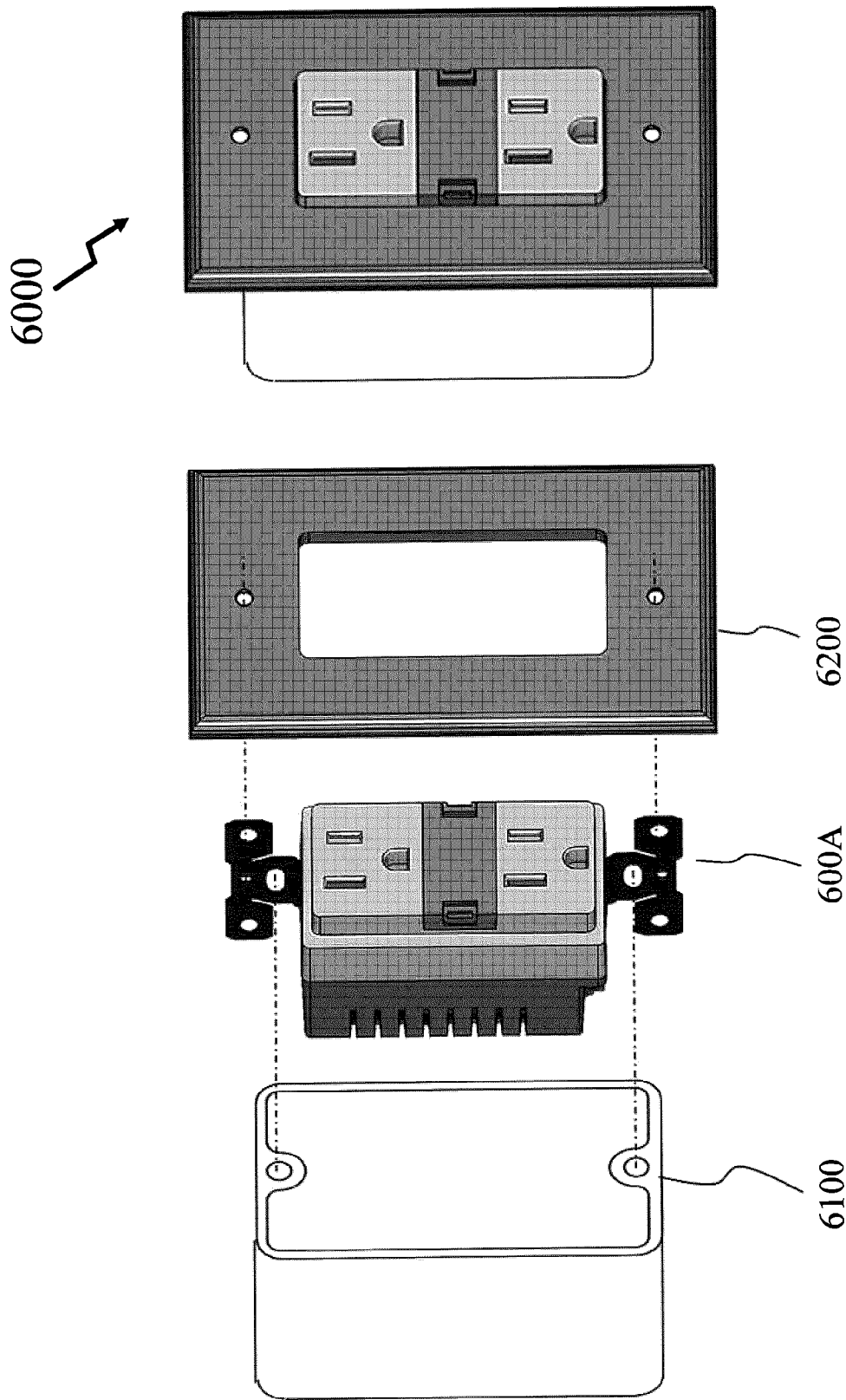
FIG. 6A depicts a work box, receptacle and faceplate according to an embodiment of the invention.

Referring to FIG. 6A there is depicted a work box, receptacle and faceplate according to an embodiment of the invention which provides a mechanism for making use of standard building wiring to provide additional functionality. As depicted in FIG. 6A an electrical receptacle 600A is provided which allows for an insert to be inserted into a cavity within the receptacle body. As depicted the standard electrical receptacle provides two outlets and is installed into an electrical utility work box 6100 once the electrical supply is coupled to the electrical receptacle 600A via an electrical cable that is fed through an opening within the electrical utility work box 6100 which may be defined or established through an installing user selecting one "push-out" of a plurality of "push-outs" provided within the body of the electrical utility work box 6100. Once the electrical receptacle 600A is inserted into the electrical utility work box 6100 and retained in position, e.g. via bolts at upper and lower locations then a faceplate 6200 is typically applied.

Figure 6B:
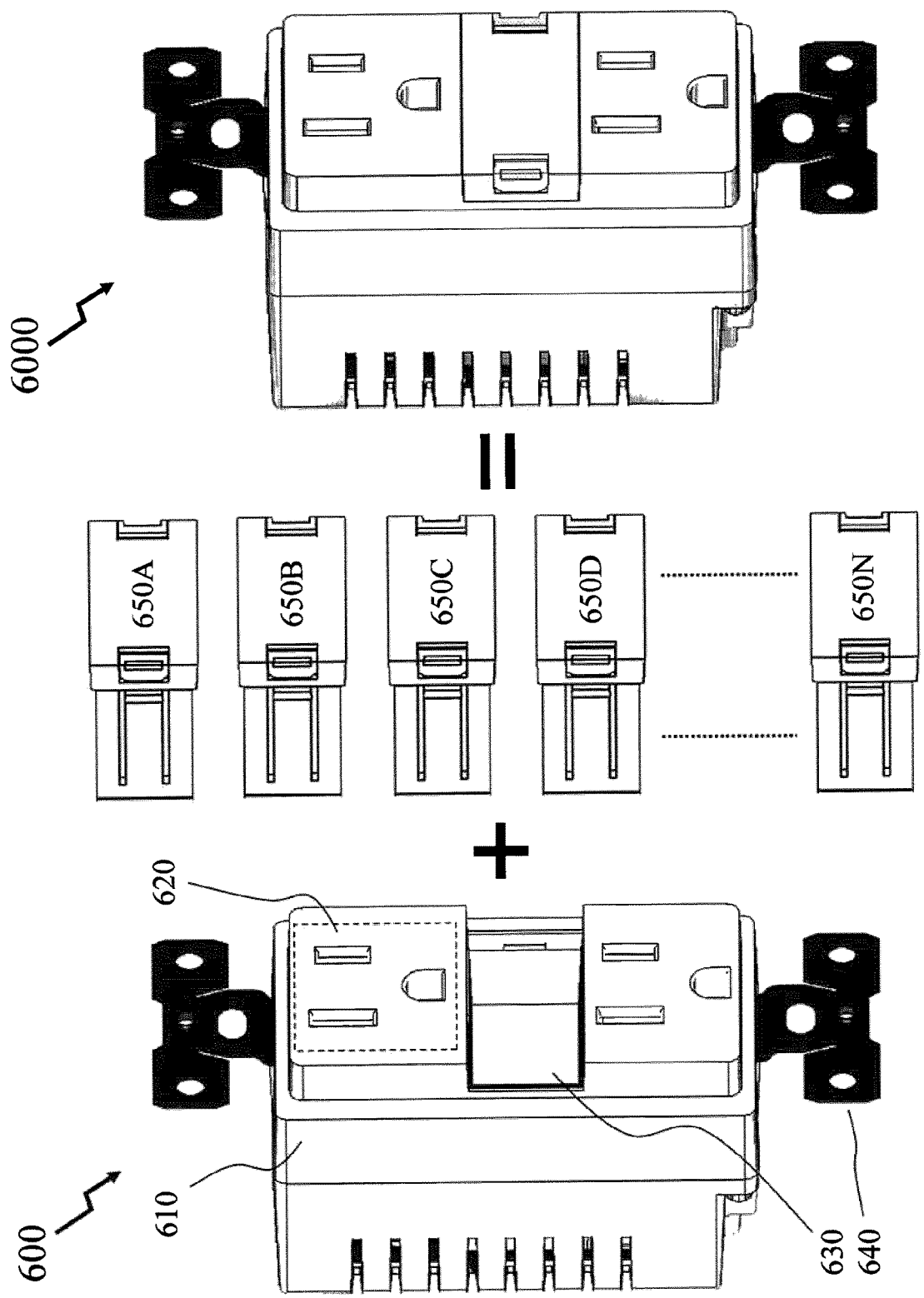
FIG. 6B depicts a configurable electrical receptacle according to an embodiment of the invention.

Once the electrical receptacle 600A has been connected to the electrical supply and inserted into the electrical utility work box 6100 and the faceplate 6200 at then an initial blank cover for the cavity can be replaced with a replaceable insert such as depicted in FIG. 6B. Referring to FIG. 6B there is depicted a configurable electrical receptacle 6000 comprising an electrical receptacle 600 which features a Receptacle 610 within which are disposed a pair of electrical sockets 620 and a Cavity 630. The configurable electrical receptacle 6000 being attached to the electrical utility work box, not shown for clarity, via the ground strap 640. A replaceable insert may be disposed within the Cavity 630 such as inserts 650A to 650N respectively which may comprise a blank insert 650A, Wi-Fi node 650B, nightlight 650C, motion detector 650D and smoke detector 650N. Accordingly, electrical receptacle 6000 provides dual electrical sockets and a user selectable function with the one of the plurality of inserts 650A to 650N respectively.

In common with this approach embodiments of the invention may be designed with dimensions and retaining feature positions etc. to function with industry standard receptacle boxes and faceplates. Due to the position of the electrical receptacle cavity between the pair of electrical outlets the faceplate is similarly attached via upper and lower retaining features, e.g. bolts to threaded portions of the electrical receptacle. As will become evident in respect of FIGS. 7 to 17 other designs may support faceplates with alternate mounting positions and "cut-out" design such as a single central retaining means for example.

Figure 7:
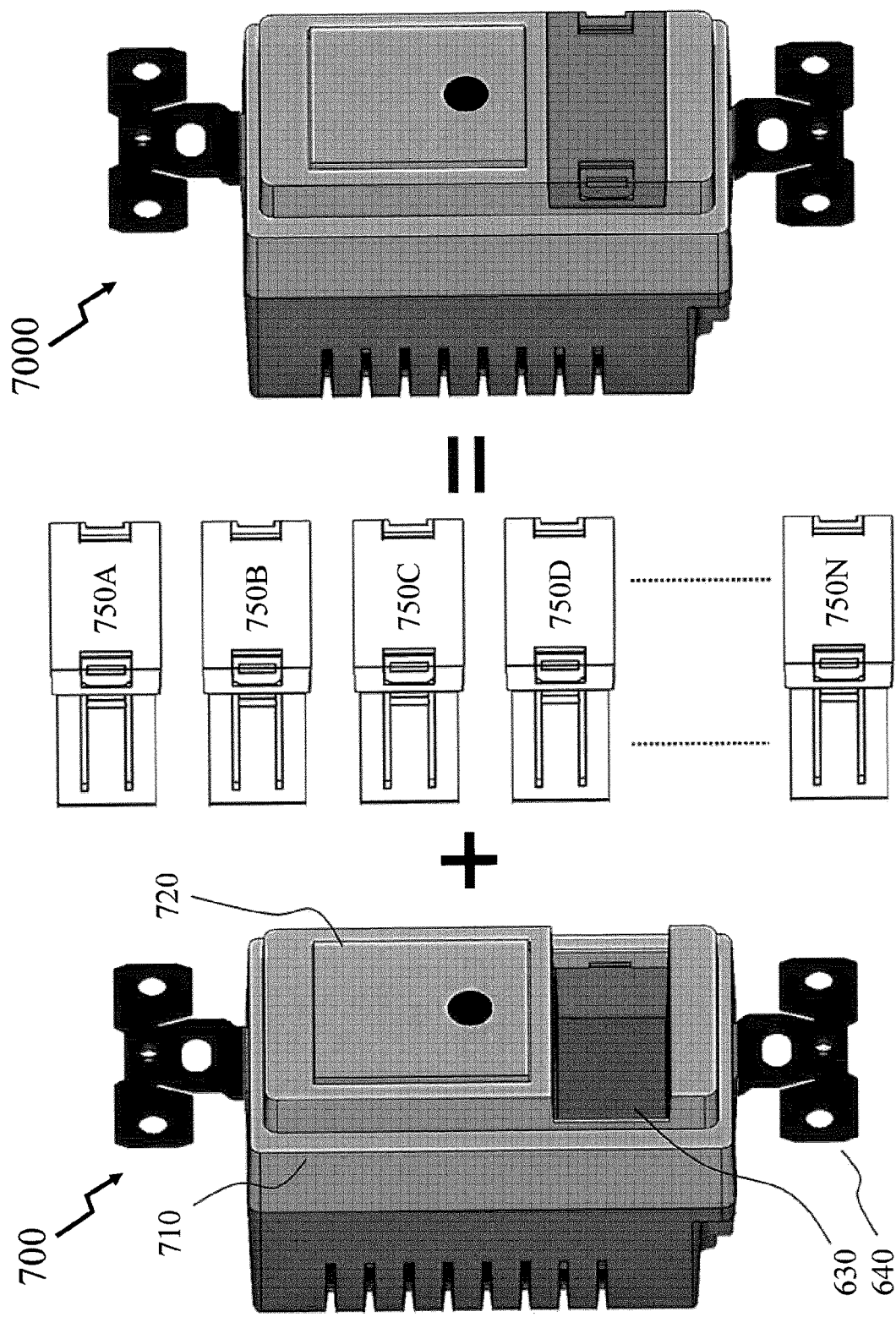
FIG. 7 depicts a configurable electrical switch receptacle according to an embodiment of the invention.

Referring to FIG. 7 there is depicted a configurable switch receptacle 7000 according to an embodiment of the invention which comprises a switch receptacle 700 which features a Receptacle 710 within which is an electrical switch 720 and a Cavity 630. The configurable switch receptacle 7000 being attached to the electrical utility work box, not shown for clarity, via the ground strap 140. A replaceable insert may be disposed within the Cavity 630 such as Inserts 750A to 750N respectively which may comprise a blank insert 750A, motion detector 750B, light 750C, Bluetooth 750D and USB charger 750N. Accordingly, switch receptacle 7000 as depicted provides a push type electrical switch 720 with an illuminated element to indicate status and a user selectable function with the one of the plurality of inserts, Inserts 750A to 750N, respectively.

3: Blocked and Enabled Insert Subsets for Receptacles

Figure 8:
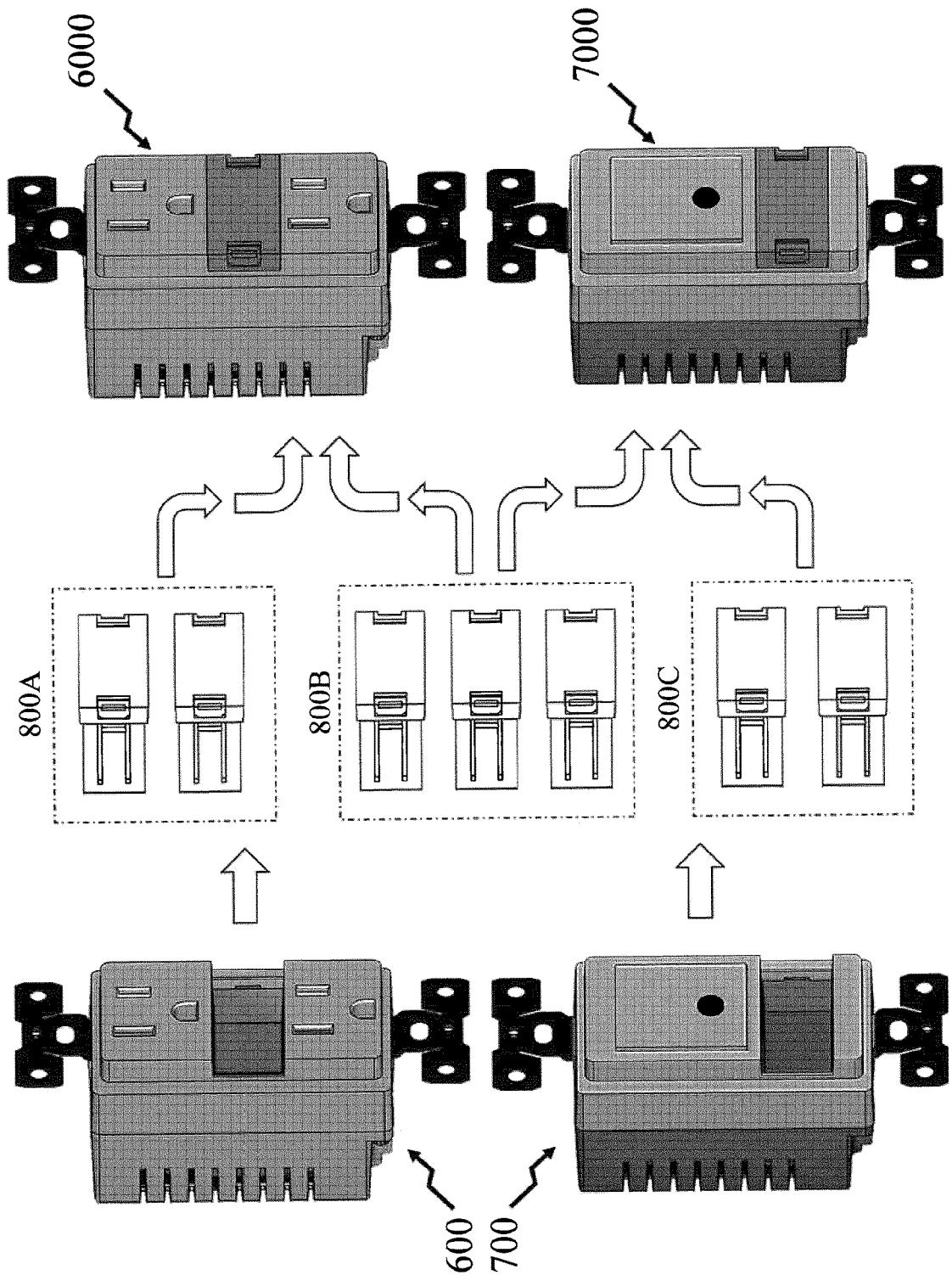
FIG. 8 depicts restriction of inserts to electrical receptacles only, electrical switches only, and both electrical receptacles and switches according to an embodiment of the invention.

Now referring to FIG. 8 there are depicted applications of insert restrictions to electrical receptacles only, electrical switches only, and both electrical receptacles and switches according to an embodiment of the invention. Accordingly, an electrical receptacle 600 is depicted wherein inserts from first insert group 800A and second insert group 800B can be inserted into its cavity and make the appropriate electrical and mechanical connections to power the insert and form configurable electrical receptacle 6000. Similarly, switch receptacle 700 may be employed in combination with an insert selected from the second insert group 800B and third insert group 800C which when inserted into the cavity makes the appropriate electrical and mechanical connections to power the insert and form and provide configurable switch receptacle 7000. Accordingly, three classes of insert are defined:

First class 800A which fit the electrical receptacle 600 only;

Second class 800B which fit either the electrical receptacle 600 or switch receptacle 700; and Third class 800C which fit the switch receptacle 700 only.

Figure 9A:
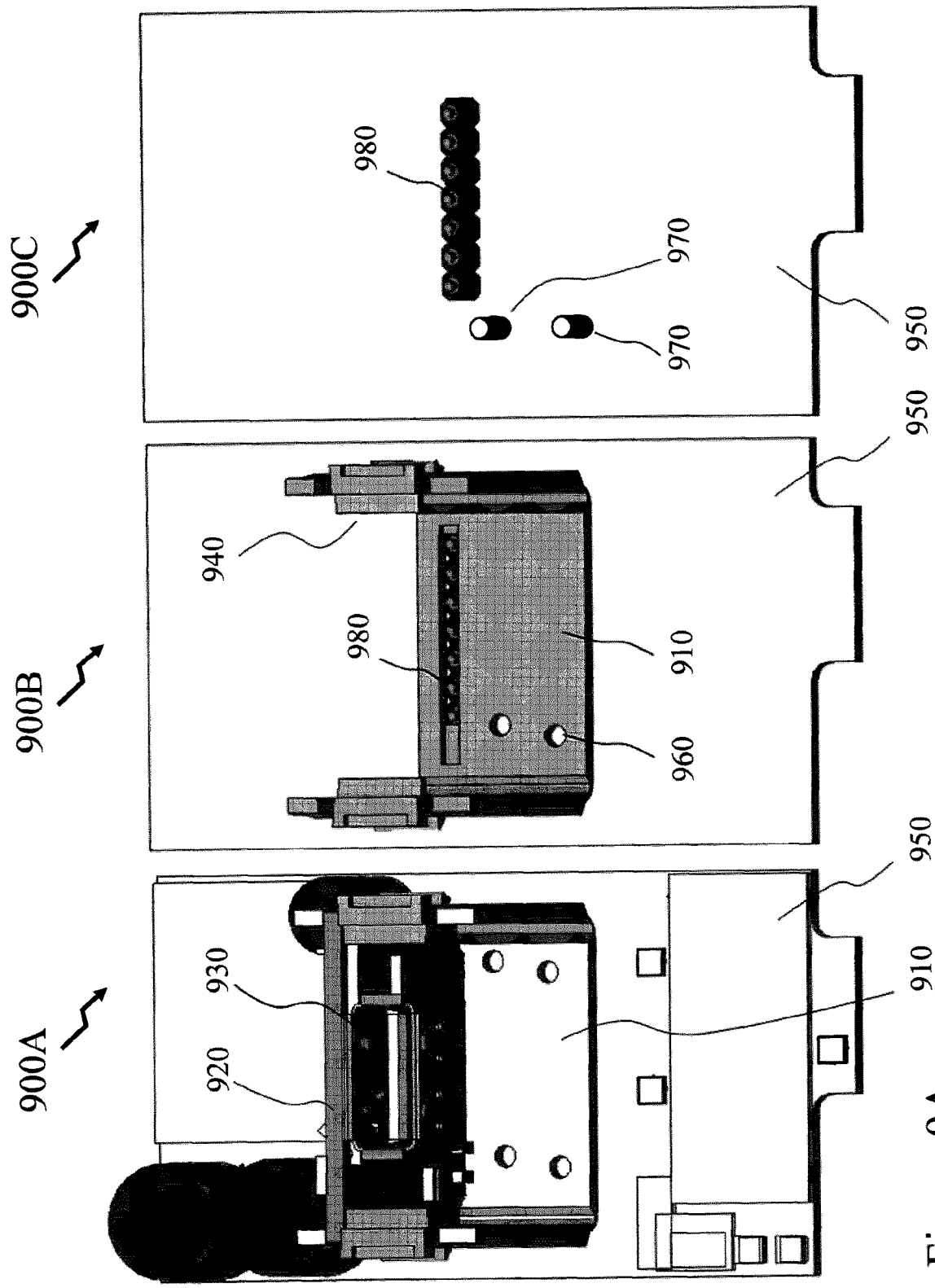
FIG. 9A depicts a configuration of insert and receptacle circuit board supporting restriction of receptacles such as depicted in FIG. 3 according to an embodiment of the invention.

Referring to FIG. 9A there is depicted a configuration of insert and receptacle circuit board supporting restriction of receptacles such as depicted in FIG. 8 according to an embodiment of the invention. Referring to first image 900A there is depicted a perspective view of parts of the receptacle, e.g. electrical receptacle 600 and insert 650A-650N/750A-750N. The electrical receptacle portion depicted being the main PCB 950. As depicted the insert portion comprises insert shell 910, insert PCB 920, and USB socket 930 as the insert 650A-650N/750A-750N provides a USB charger wherein the insert PCB 920 provides a stabilized USB interface supporting power and data. Optionally, a USB insert may be solely for charging an electrical device or it may support data communications through the USB to a device connected to it by a user which are then transmitted to/from the USB insert either via a wireless interface (forming part of the USB insert) or through power line communications (PLC) via the electrical supply to/from the insert.

Next in second image 900B the PCB 950 is depicted absent any components for simplicity except electrical connector 980 visible through opening within the back wall of the insert shell 910 whilst the insert 650A-650N/750A-750N now depicts only insert shell 910 and its keyed openings 960. Finally, third image 900C depicts only the PCB 950 with electrical connector 980 and keyed posts 970.

Figure 9B:
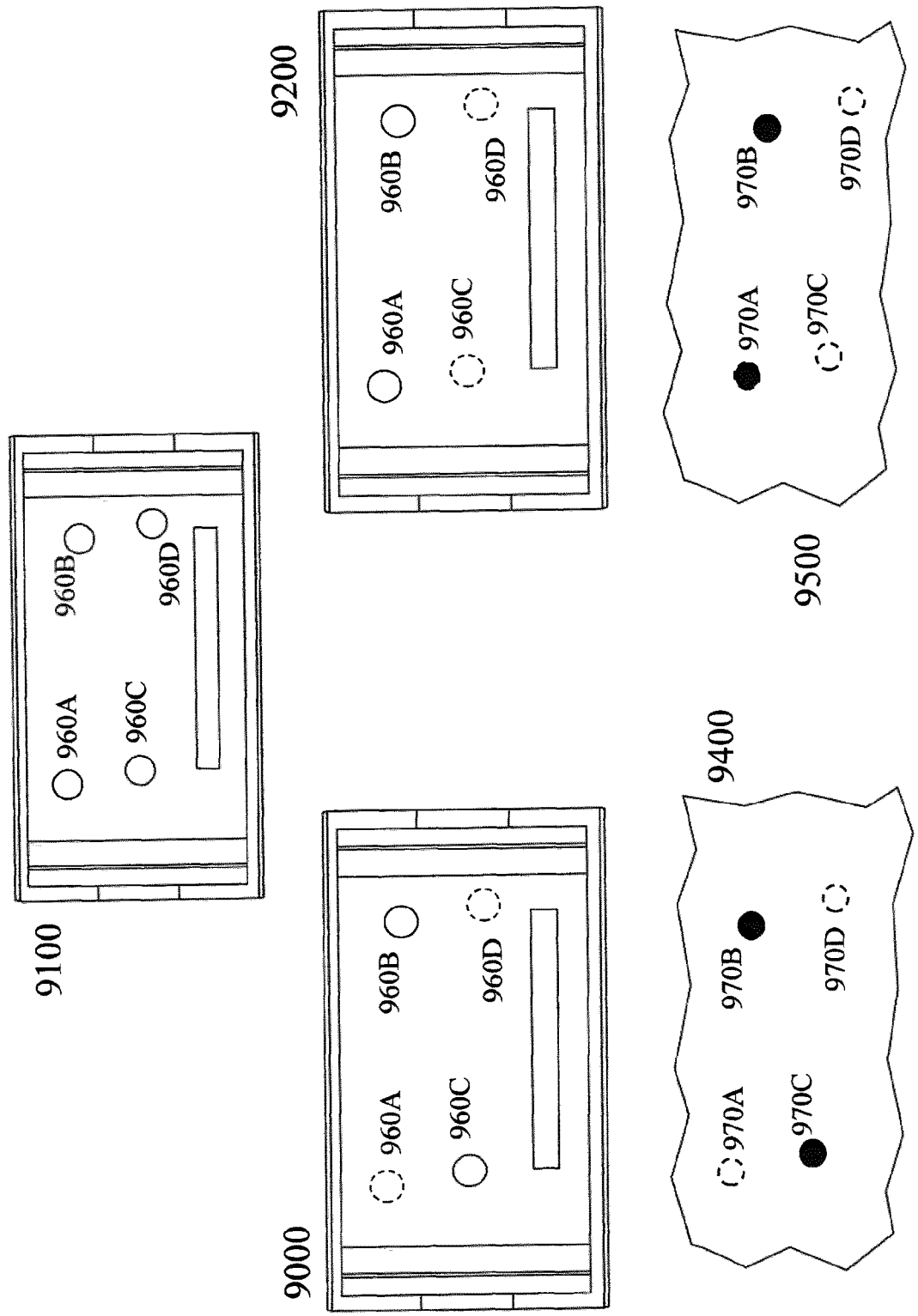
FIG. 9B depicts an exemplary pin—hole configuration for achieving the insert restrictions according to FIG. 3 according to an embodiment of the invention.

Accordingly, referring to FIG. 9B there is depicted an exemplary post 970—opening 960 configuration for achieving the insert restrictions according to FIG. 8 according to an embodiment of the invention wherein a first class 800A which fit the electrical receptacle 600 only, a second class 800B which fit either the electrical receptacle 600 or switch receptacle 700, and a third class 800C which fit the switch receptacle 700 only. As depicted first to third rear views 9000 to 9200 depict the rear wall of the insert shell for the first, second, and third classes respectively.

First rear view 9000 depicts the openings 960B and 960C which are presented from the four potential opening positions 960A to 960D respectively. Now referring to first PCB configuration 9400 there are depicted the occupied posts 970B and 970C of the four potential post positions 970A to 970D respectively. Accordingly, when the openings 960B and 960C correspond to the posts 970B and 970C such that when the insert with first rear view is inserted into a receptacle with first configuration 9400 with posts 970B and 970C the combination allows the insert to be inserted fully engaging the electrical connector 980 on the PCB 950 to the electrical connections within the insert (not shown for clarity) and a latching mechanism within the receptacle to engage with that of the insert. However, if the insert is instead inserted into a receptacle with second configuration 9500 the posts configured as depicted in positions 970A and 970B the insert cannot be inserted fully preventing the electrical connection being made and the engagement of the latching mechanism.

However, an insert with third rear view 9200 with openings 960A and 960B would align and be fully insertable with second configuration 9500. It would be evident that the third rear view 9200 does not align with the posts of first configuration 9400 thereby preventing an insert with third rear view 9200 being inserted into a receptacle with posts in first configuration 9400. However, second rear view 9100 has openings 960A to 960D and will accordingly accept posts in either of the first and second configurations 9400 and 9500 respectively.

It would be evident to one of skill in the art that in each instance the insertion of the insert into a receptacle in an inverted position will not match any post configuration and accordingly an insert cannot be inserted upside down. Hence, in this manner a configuration of openings and posts as depicted in FIG. 9B provides the three classes of inserts. It would be evident that other configurations of "posts" and "openings" may be employed to achieve the same result. It would also be evident that the configuration may be adjusted according to whether two, three, four or more classes of insert are intended for use in different subsets of two, three, four or more receptacles.

4: Grounding First/Last Connectivity on Insert Insertion/Removal

Figure 10:
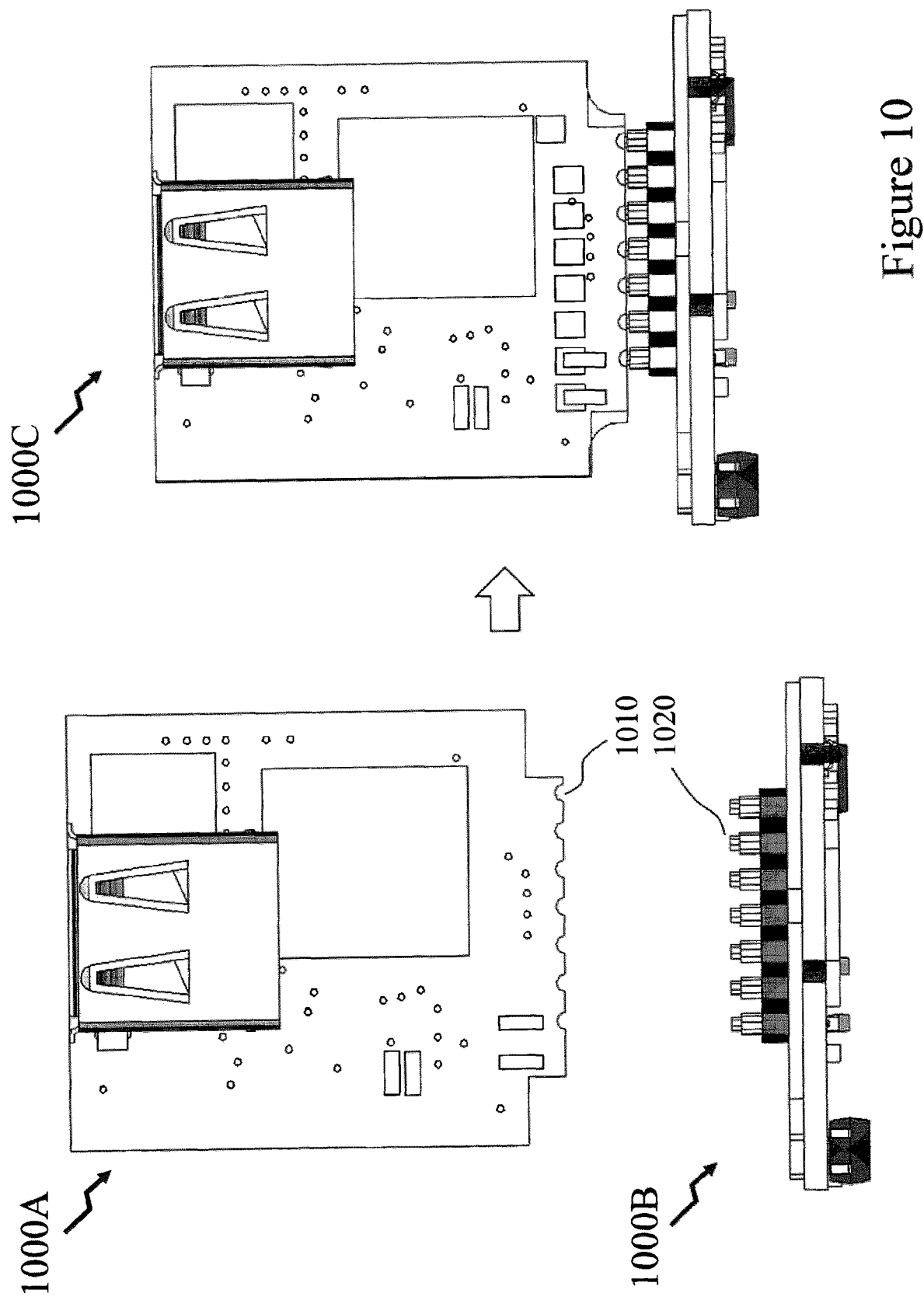
FIG. 10 depicts an edge connection between the insert and receptacle circuit board according to an embodiment of the invention.

Now referring to FIG. 10 there is depicted an edge connection between the insert and receptacle circuit board according to an embodiment of the invention for low complexity and low cost. Accordingly, there is depicted an insert PCB 1000A together with receptacle PCB 1000B as discrete elements and as assembled when the insert is inserted into a receptacle cavity keyed to access that insert. As depicted with insert PCB 1000A the edge of the PCB where it will abut the electrical connector contacts 1020 is castellated and the inner edge of each recess is metallized to form an electrical contact with its respective electrical connector contact 1020 when the insert is fully inserted as depicted in assembly 1000C. In this manner, the mechanical positioning/retention of the insert relative to the receptacle cavity is managed by the latching/alignment mechanism together with the posts/openings that define an allowable insertion. The electrical connection is a mechanical contact without additional complexity. It would be evident that within other embodiments of the invention the insert PCB 1000A may be configured with an electrical connector or electrical connectors in socket and/or plug whilst the receptacle PCB is configured with the matching plug and/or socket electrical connector or connectors. For example, these may include, but are not limited to single in-line (SIL) headers, dual in-line headers (DIL), card edge connectors, backplane connectors, micro-USB, and mini-USB.

Figure 11:
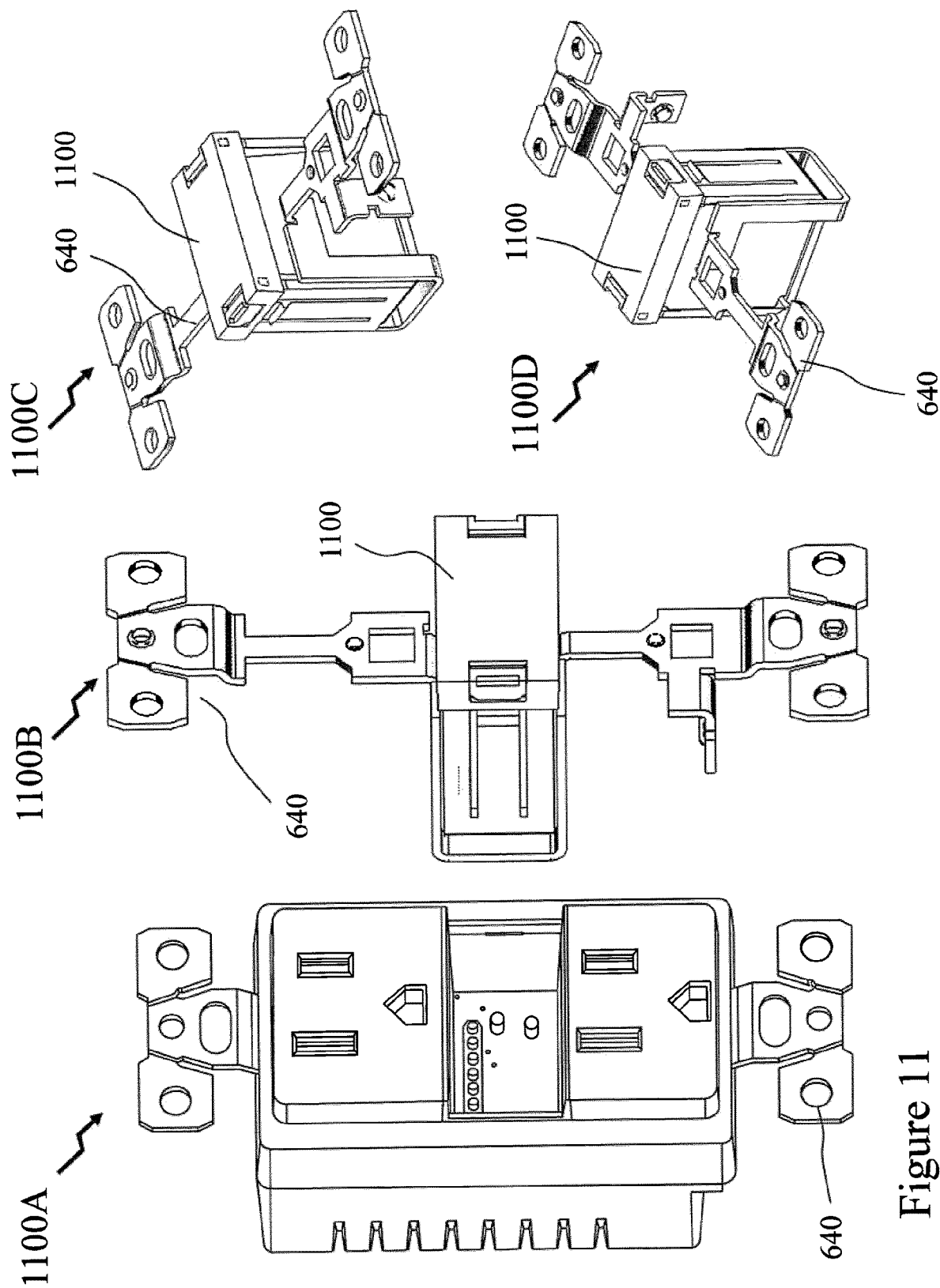
FIG. 11 depicts an internal ground bar configuration according to an embodiment of the invention providing grounding of the insert prior to electrical connectivity with the receptacle circuit board.

Referring to FIG. 11 there is depicted an internal ground bar configuration according to an embodiment of the invention providing grounding of the insert prior to electrical connectivity with the receptacle circuit board with low complexity and low cost. In first image 1100A a receptacle is depicted with ground strap 640 which provides the mounting points for the receptacle 1100A to its electrical utility work box (not shown for clarity) and the faceplate (not shown for clarity) to the receptacle 1100A such that ground connections can be made to protect the user. Accordingly, the ground strap 640 may be grounded to the electrical utility work box directly when it is metal or conductive plastic or via a grounding connection made to both the receptacle 1100A and the work box (not depicted for clarity).

However, it is not evident whether the insert is grounded prior to full insertion and the electrical connections being made between the Insert 1100, for example an insert according to an appropriate group of first to third classes 800A to 800C respectively in FIG. 8, and the receptacle 1100A. Accordingly first to third assembly images 1100B to 1100D respectively depict the ground strap 640 absent all other elements of the receptacle 1100A wherein it is evident that the ground strap is formed such that it is around the cavity over at least part of the cavity width such that as the insert is inserted it makes electrical contact to the ground plane. Accordingly, either through a conductive plastic shell for the insert or metal contacts on the upper and/or lower surfaces of the insert a ground contact is made as the insert is partially inserted and maintained through to the electrical connection such that in the event of a fault the insert is always grounded even though the accessible contacts within the cavity may be limited to an acceptable DC or AC voltage, e.g. 12V such that a user contacting them does not suffer harm. Optionally, the electrical construction may be reversed to that shown in FIG. 10 such that the "plug" portion of the electrical connector(s) on the insert—receptacle PCB connection are on the insert and the "socket" portion is on the receptacle PCB so that an errant finger cannot touch the electrical contacts.

Figure 12:
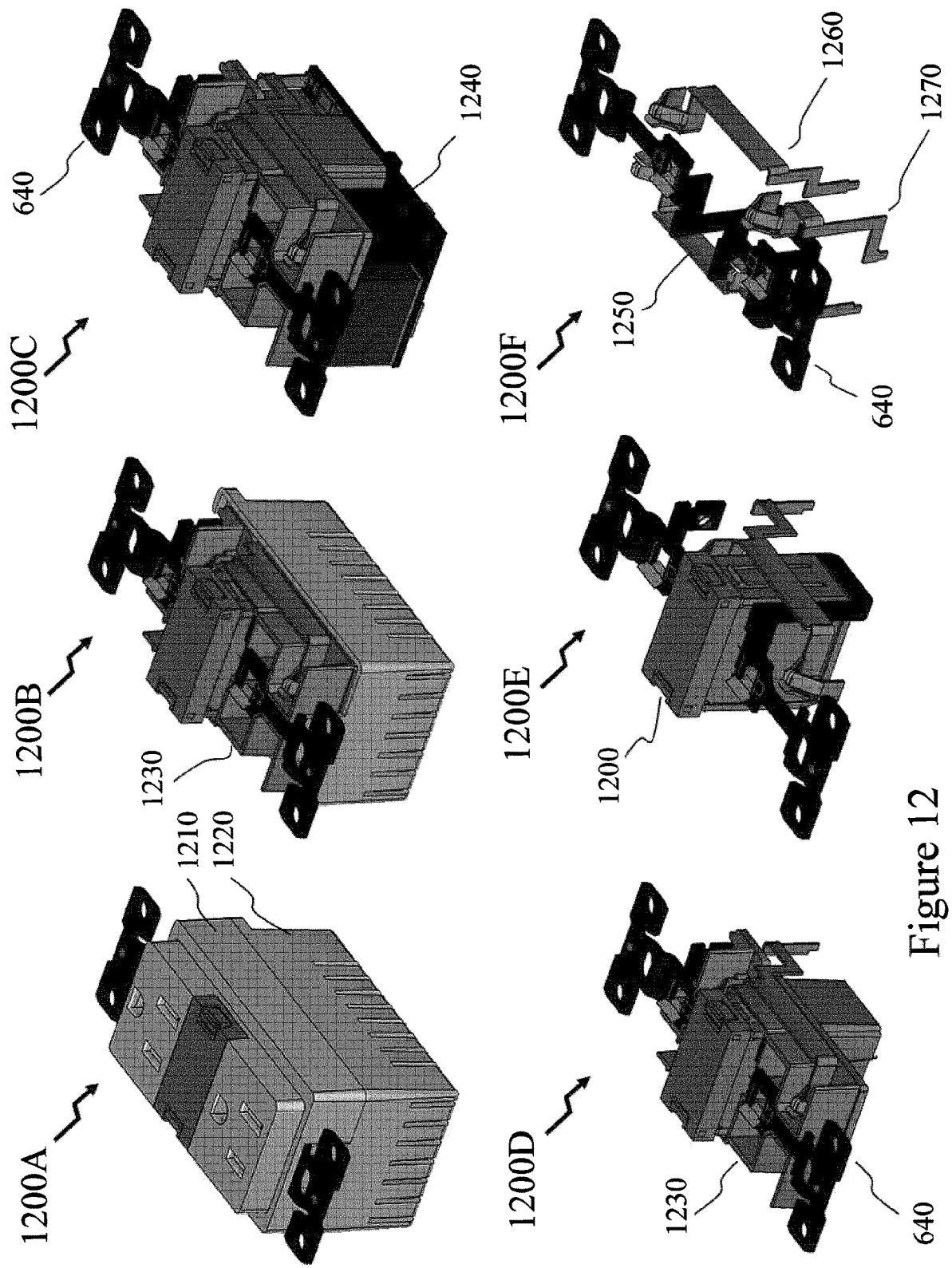
FIG. 12 depicts a sequential break down of an electrical receptacle according to an embodiment of the invention.

FIG. 12 depicts a sequential break down of a receptacle according to an embodiment of the invention such that:

First image 1200A depicts the full receptacle with front casing 1210 and rear casing 1220;
Second image 1200B with the front casing 1210 removed showing the internal frame 1230;
Third image 1200C with the rear casing 1220 removed showing the receptacle PCB 1240;
Fourth image 1200D wherein the receptacle PCB 1240 has been removed showing more of the internal frame 1230;
Fifth image 1200E with the internal frame 1230 removed showing the Insert 1200 with the grounding strap 640; and
Sixth image 1200F with the Insert 1200 removed showing the ground strap 640 and first to third electrical straps 1250 to 1270 respectively which provide the connections to the live and neutral pins of the electrical sockets.

5: Reconfigurable Functions of Receptacles Accepting Inserts

Figure 13A:
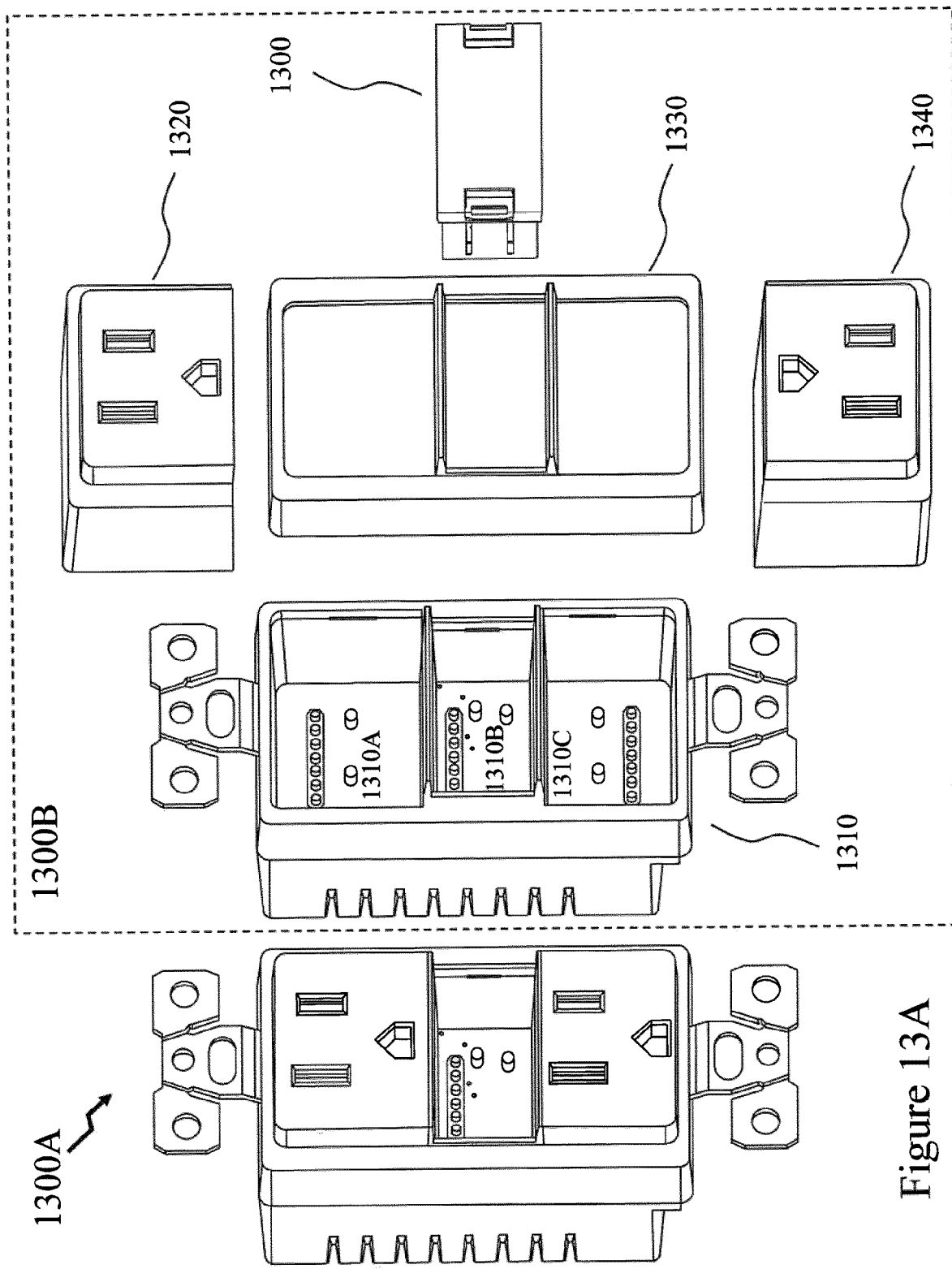
FIG. 13A depicts a configurable electrical receptacle according to an embodiment of the invention wherein the installed functionality can be set at installation leaving the post-installation receptacle configuration.

Within FIG. 12 Insert 1200 may for example be an insert according to an appropriate group of first to third classes 800A to 800C respectively in FIG. 8. Referring to FIG. 13A there is depicted a configurable electrical receptacle according to an embodiment of the invention wherein the installed electrical functionality is set in two stages:

Stage 1: configuration of mains supply electrical elements; and
Stage 2: configuration of insert.

Accordingly, as depicted in second image 1300B a series of elements are depicted which when assembled provide the receptacle depicted in first image 1300A. There is therefore a Receptacle 1310, an upper electrical element 1320, a lower electrical element 1340 and a cover 1330 together with Insert 1300, for example an insert according to an appropriate group of first to third classes 800A to 800C respectively in FIG. 8. At installation the first and second electrical elements 1320 and 1340 are inserted into first and third cavities 1310A and 1310C respectively whilst the Insert 1300 would be inserted into second cavity 1310B. Once the first and second electrical elements 1320 and 1340 are inserted into first and third cavities 1310A and 1310C respectively the cover 1330 is attached and retained, for example, via one or more bolts through the rear of the receptacle body to the rear of the cover 1330.

Figure 13B:
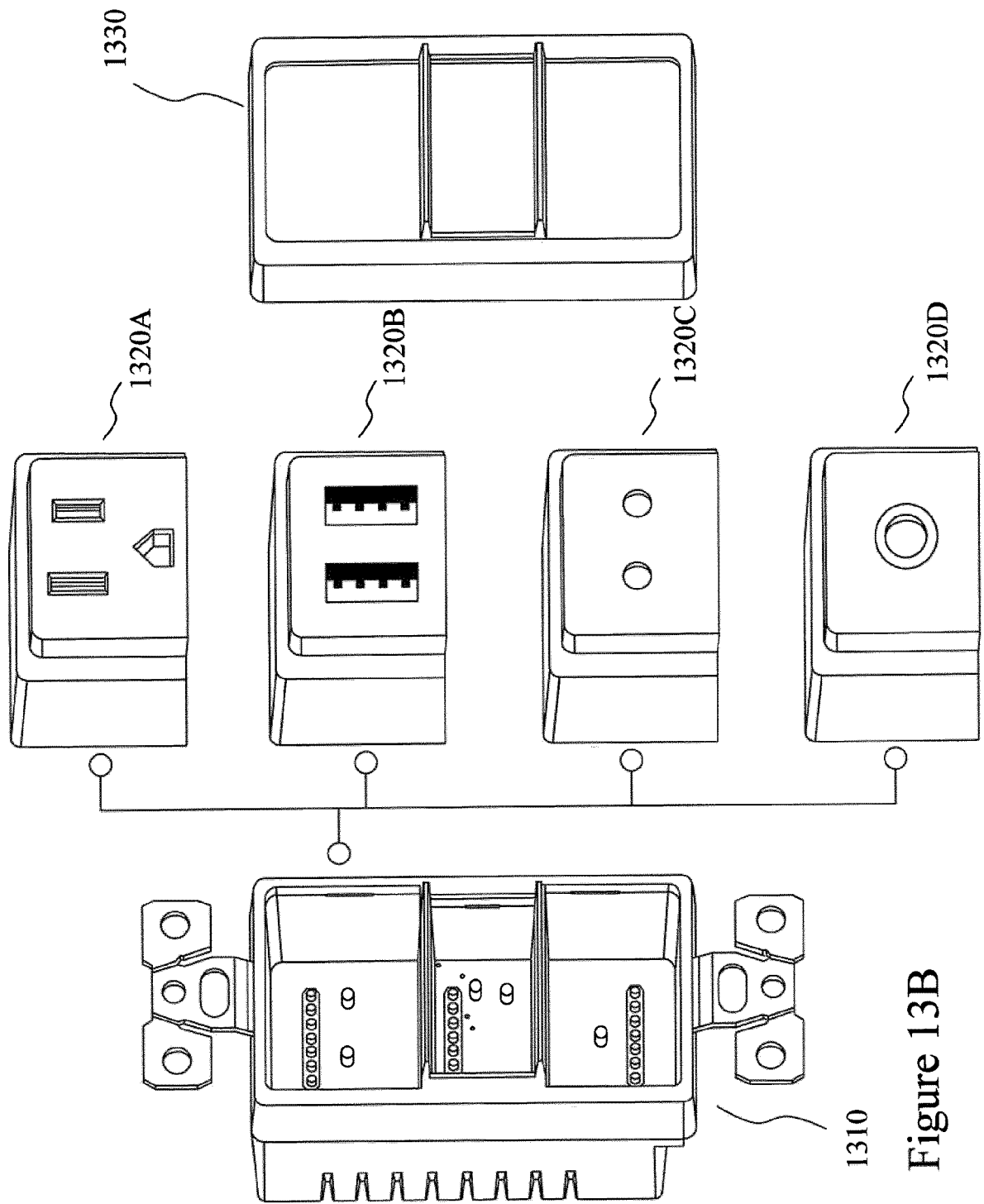
FIG. 13B depicts a configurable electrical receptacle according to an embodiment of the invention wherein the installed functionality can be set at installation leaving the post-installation receptacle configuration.

Now referring to FIG. 13B there is depicted a configurable receptacle according to the configuration depicted in FIG. 13A wherein the installed functionality set at installation can be varied by changing the electrical element. Alternate electrical elements 1320A to 1320D are depicted comprising electrical socket, dual USB interface, UK shaver plug socket, and 2.1 mm DC socket. As depicted the second element cavity is configured as a 180° rotation of the first element cavity such that, for example, first electrical element 1320A can be used in both cavities. Optionally, within other embodiments of the invention such a configuration may be limited such that different upper and lower elements are required. Further, the concept discussed supra in respect of configuring inserts to fit only certain receptacles can be applied such that only certain electrical elements can be inserted into one or other cavity or both cavities etc.

Figure 14:
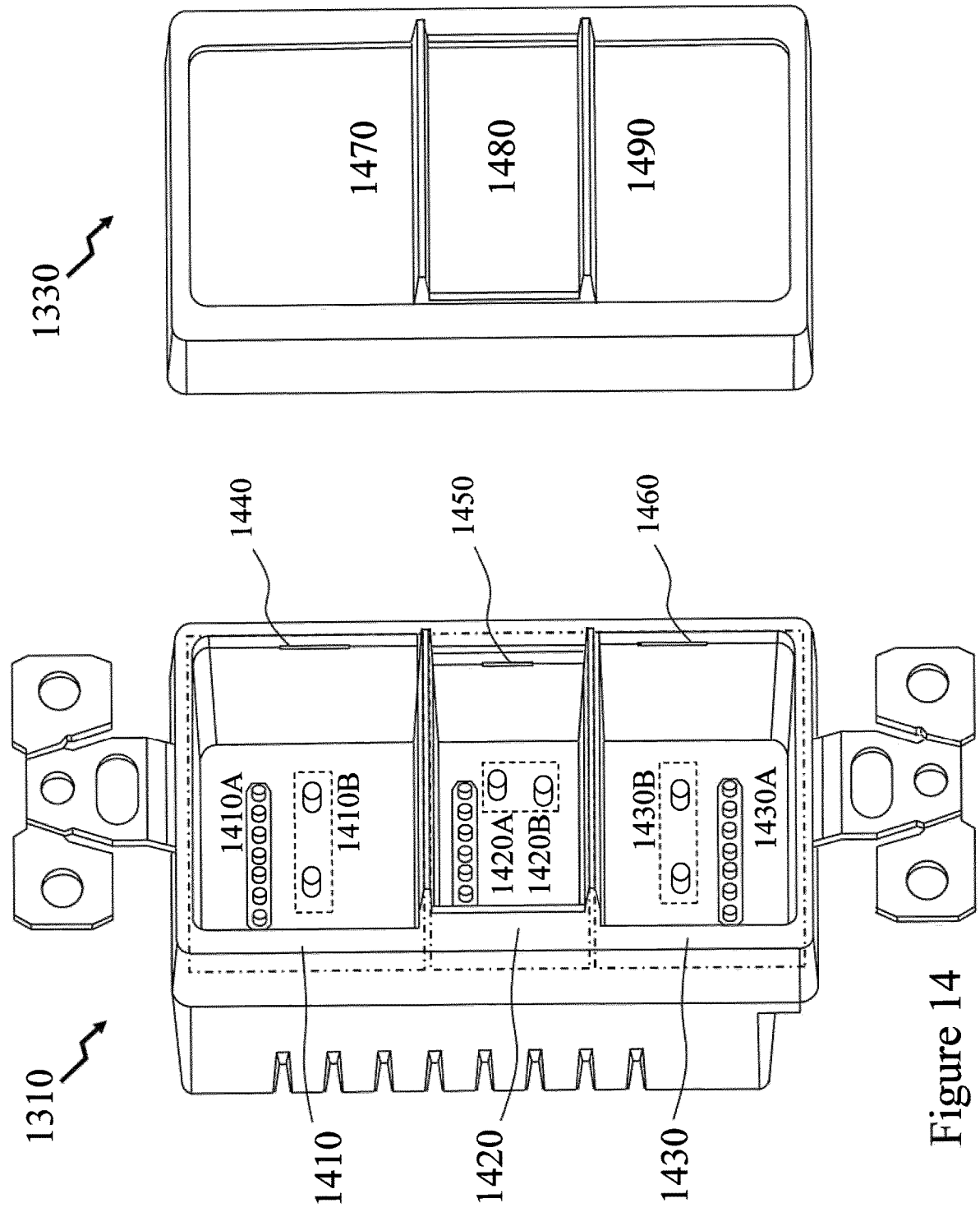
FIG. 14 depicts the configurable electrical receptacle and cover of the embodiment of the invention depicted in FIG. 13A.

The multiple cavities within a Receptacle 1310 and cover 1330 are further depicted in FIG. 14 according to the embodiment of the invention depicted in FIG. 13A. Accordingly, the receptacle 1310 has first to third cavities 1410 to 1430 respectively within each being backplane connectors 1410A to 1430A respectively and keying posts 1410B to 1430B respectively. As depicted the cover 1330 has three openings 1470 to 1490 that align with the first to third cavities 1410 to 1430 respectively. The design of the cover is such that when attached electrical elements cannot be inserted into the first and third cavities 1410 and 1430 through the cover openings 1470 and 1490 but an Insert 1300 (not depicted for clarity) can be inserted through opening 1480 into second cavity 1410B. Within embodiments of the invention the sequence of which cavities permit use of inserts versus may change.

Optionally, within an embodiment of the invention using an example of three cavities all three cavities may be identical but the sequence of which accept elements prior to installation and which accept inserts after installation is defined by the cover applied. Accordingly, the cover may restrict the cavity by projecting within the cavity such that the dimensions of an insert are smaller than that of an electrical element. In this manner the insert may be in the first, second, or third cavity based upon the cover applied.

Figure 15:
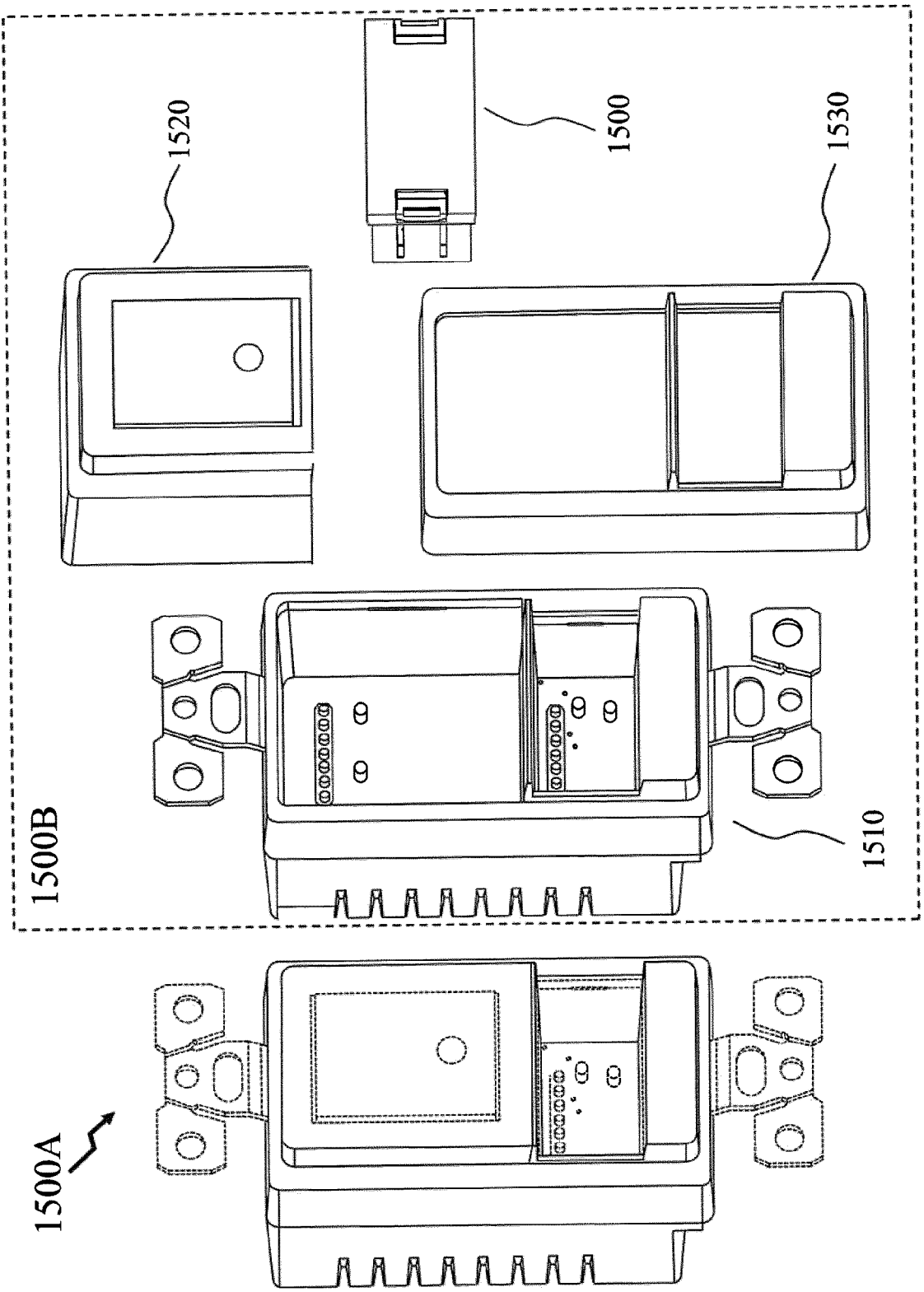
FIG. 15 depicts a configurable switch receptacle according to an embodiment of the invention wherein the installed functionality can be set at installation leaving the post-installation receptacle configuration.
Figure 16:
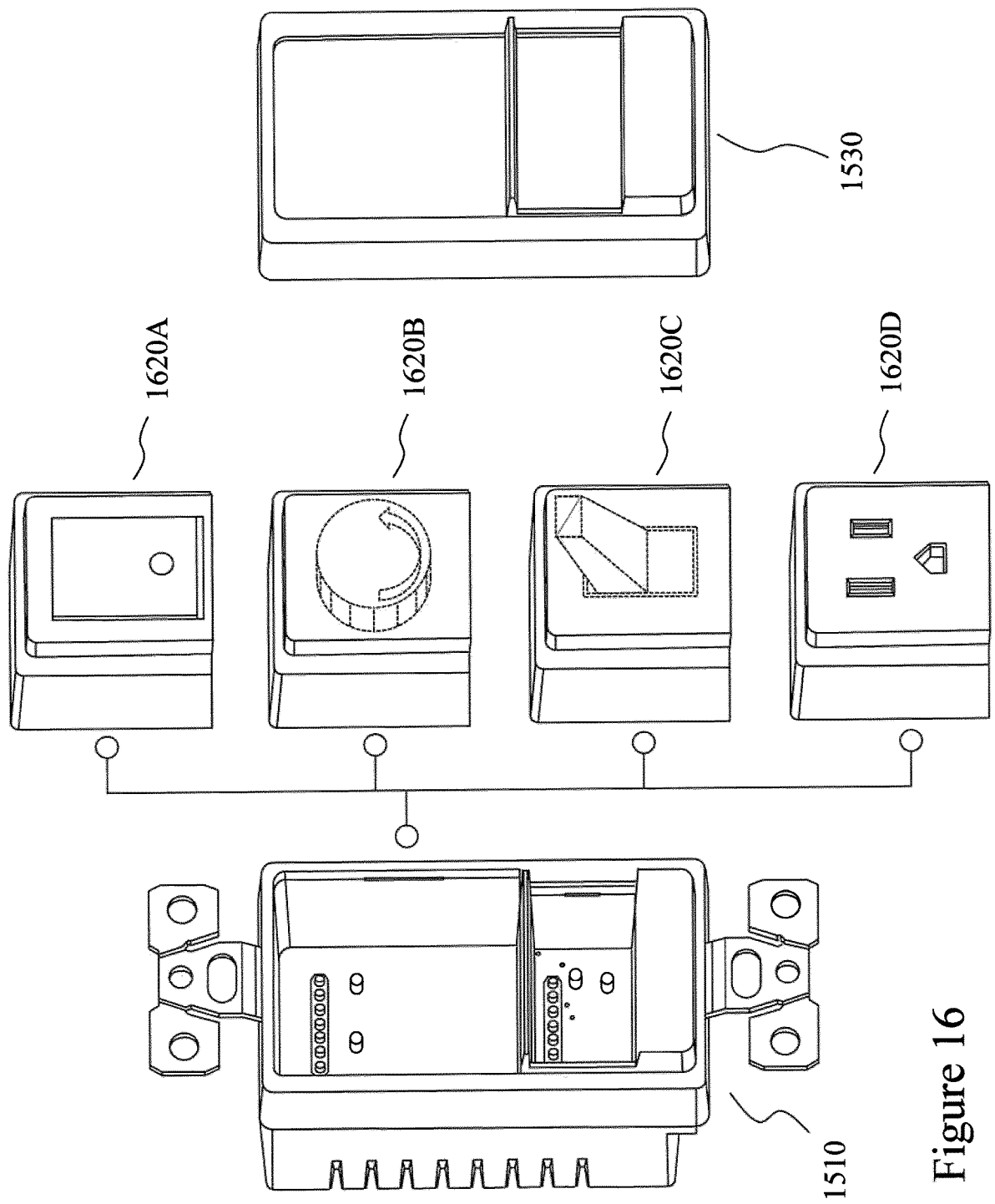
FIG. 16 depicts a configurable receptacle and cover according to an embodiment of the invention.

Accordingly, it would be evident to one of skill in the art that this concept may be extended as depicted in FIG. 15 for a configurable switch receptacle according to an embodiment of the invention wherein the installed switch functionality can be set at installation leaving the post-installation receptacle configuration via the insert(s). Accordingly, as depicted in second image 1500B a series of elements are depicted which when assembled provide the receptacle depicted in first image 1500A. There is therefore a Receptacle 1510, an electrical element 1520 and a cover 1530 together with Insert 1500, for example an insert according to an appropriate group of first to third classes 800A to 800C respectively in FIG. 8. In this manner as depicted in FIG. 16 the receptacle 1510 may be configured with first to fourth switch elements 1620A to 1620D which depict push toggle switch 1620A, rotary dimmer 1620B, rocker switch 1620C, and electrical socket 1620D.

Further, as depicted in FIG. 17 configurable receptacles according to embodiments of the invention may employ two or three (or potentially more) inserts. For example, first image 1700A depicts a receptacle providing a single electrical outlet, via a plug socket, and two cavities for the insertion of inserts. Second image 1700B depicts a receptable providing three cavities for the insertion of inserts. Optionally, within embodiments of the invention the cavities within either first and second images 1700A and 1700B may be keyed such as described above such that different cavities may be keyed for different insert classes, such as for example as described above in respect of FIG. 8 with the first to third classes 800A to 800C.

It would be evident that the concepts described and depicted within FIGS. 3A-3C and 6A-17 may be exploited in 2-gang, 3-gang, 4-gang etc. configurations as well as the 1-gang design depicted. Accordingly, this would reduce the number of electrical wiring connections to be made by providing a single receptacle which then supports a grid of configurable elements and/inserts. Within embodiments of the invention depicted in respect of FIGS. 3A-3C and 6A-17 the presumption has been that the removable inserts are removed manually without special tooling. However, within other embodiments of the invention a tool may be required to insert and/or remove the insert. Similarly, a tool may also be required to insert and/or remove electrical elements such as sockets, switches, dimmers, etc.

Optionally, within embodiments of the invention the electrical elements may be inserted and retained without an overlaying cover but are "latched" into position and then covered with the faceplate wherein this then covers the required access to remove the electrical elements with a tool, for example. In this manner, removal of the faceplate and use of the appropriate extraction tool allows the electrical elements to be reconfigured and then re-covered with the faceplate. Optionally, the electrical elements may be retained through screw/bolt fixtures through the rear of the receptacle or the front wherein these are then obscured/hidden via a cover and faceplate or just a faceplate. In each instance the removable inserts are inserted/removed from the receptacle when the cover and faceplate or just faceplate are in position.

Amongst the inserts, the inventors have considered a USB plug and associated cable wherein the cable is wound in combination with a spring mechanism or other mechanism that allows for the cable to rewind automatically. Optionally, the cable may be pulled to the required length and ratcheted to lock and then if pulled to full extension the ratcheting disengaged and the cable rewinds. Alternatively, a button or other mechanism on the front of the insert removes the locking ratchet and allows rewinding.

6: Reconfigurable Functionality to Portable, Fixed and Wearable Electronic Devices Now referring to FIG. 18 there is depicted a Receptacle 1810 according to an embodiment of the invention within which an Insert 1820 such as described and depicted in respect of FIGS. 3A-3C and 5A-17 respectively can be inserted. The resulting combination being depicted in first image 1800A as an isolated assembly and in second image 1800B where the Receptacle 1810 is mounted behind a Panel 1830 as part of an item of equipment and the Insert 1820 inserted. In third image 1800C the Receptacle 1810 is depicted assembled with the Panel 1830 but without the insert thereby showing the Cavity 1840 within which the insert, e.g. Insert 1820, fits. Accordingly, it would evident that the Receptacle 1810 can be fitted to a variety of items of equipment thereby providing a reconfigurable interface allowing any compatible insert to be employed. For example, referring to FIG. 19 there are depicted examples of other forms of electrical equipment within which a Receptacle 1810 may be employed. These include, but are not limited to, a baseboard heater 1905, a PED 1910, a lamp 1915, a wall light 1920, an electrical panel 1925, a vehicle console 1930, a FED 1935, a wearable device 1940, an electronics module 1945 (e.g. modem, router, docking station, etc.), and a white good 1950 (e.g. refrigerator, freezer, washing machine, tumble drier, oven, microwave, radio, etc.).

Figure 18:
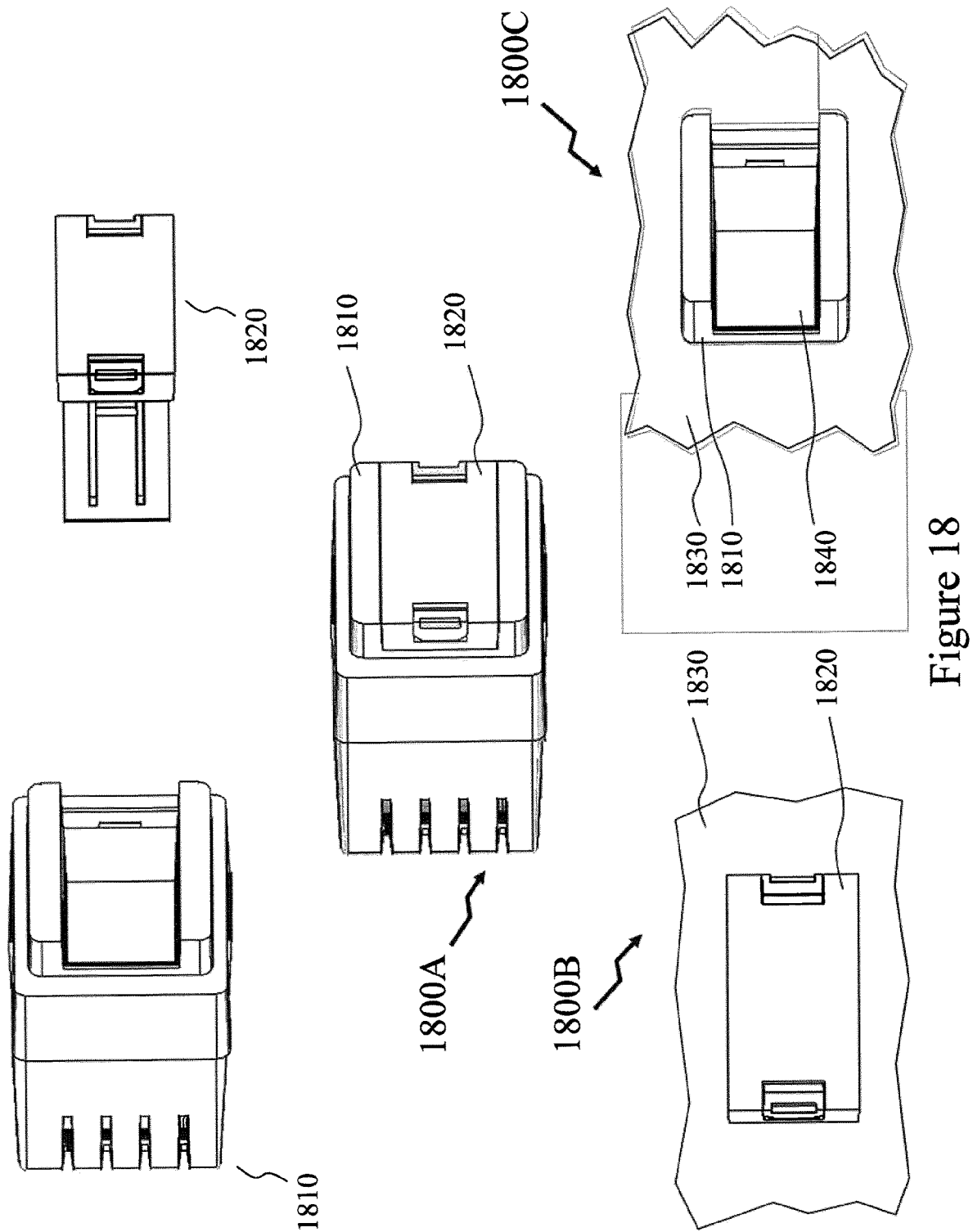
FIG. 18 depicts a configurable receptacle according to an embodiment of the invention.
Figure 19:
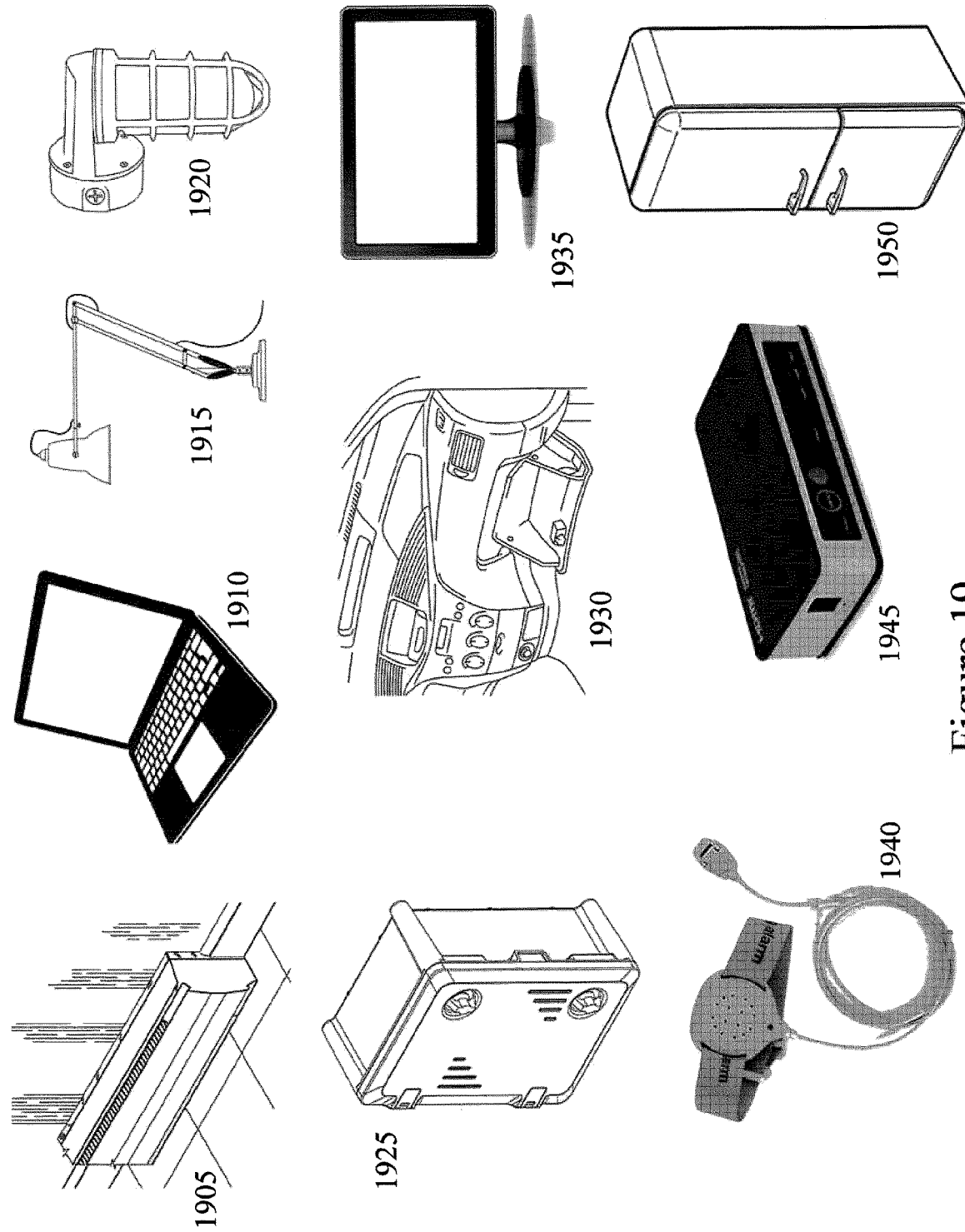
FIG. 19 depicts exemplary products within which a configurable receptacle according to an embodiment of the invention such as depicted in FIG. 18 can be fitted.
Figure 20:
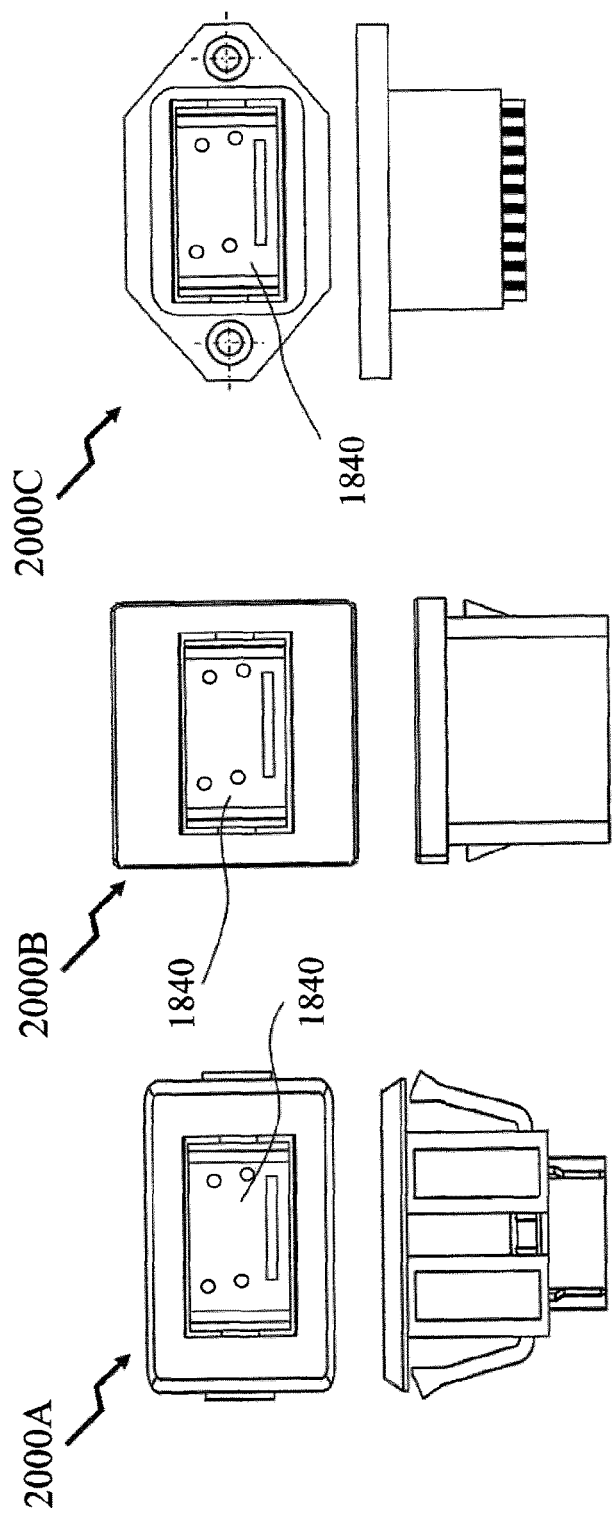
FIG. 20 depicts exemplary formats for a configurable receptacle according to an embodiment of the invention such as depicted in FIG. 18.

Referring to FIG. 20 there are depicted exemplary geometries for a receptacle such as Receptacle 1810 in FIG. 18 in front elevation (upper image) and plan elevation (lower image) respectively. Accordingly, first and second geometries 2000A and 2000B depict panel mounting configurations wherein the receptacle would snap fit upon insertion though an opening within a panel forming a portion of the device within which the receptacle is to be fitted. Third geometry 2000C depicts a screw mounting configuration wherein the receptacle fits within or behind an opening within a panel forming a portion of the device within which the receptacle is to be fitted and is screwed to the panel or another element of the device. Within each a Cavity 1840 for the retention, keying, and electrical connection etc. of an Insert 1820, not depicted for clarity, is depicted.

7: Embedded Modular Repeater/Mesh Networks

Electromagnetic signal penetration into physical structures such as residences, retail establishments, factories, offices, tunnels etc. is a significant technical issue for many wireless communications standards including, but not limited to, fifth generation cellular networks (commonly referred to as 5G), millimeter wave wireless communications, and sub-millimeter wave wireless communications. Accordingly, it would be beneficial to exploit the existing physical and electrical infrastructure of these physical structures in order to deploy low power embedded repeaters or mesh modular devices to provide continuous wireless connectivity. Accordingly, for example, an insert providing a 5G repeater—mesh node may be distributed within a physical structure by incorporating it into receptacles configured for the insert wherein the inserts derive electrical power from the physical wiring within the physical structure such as described above in respect of embodiments of the invention. Accordingly, as the inserts are implemented within the physical structure, they may self-associate through one or more wireless protocols so that they associate into an ad-hoc network allowing the network to dynamically adapt as inserts are added, removed or fail (e.g. intrinsic failure or localized power failure). It would be evident that intrinsic failures of inserts can be rapidly and simply overcome by removal of the insert(s) at issue and insertion of new insert(s).

Optionally, nodes at the edge of the physical structure establishing connectivity to networks external to the physical structure may indicate this to other nodes such that communications routing through the ad-hoc network or mesh network seek these "edge" nodes when seeking to establish communications externally. Alternatively, an initial series of inserts may be established at the periphery of the physical structure which receive, for example, 5G signals, and re-broadcast them upon another wireless protocol, e.g. 4G, WiMAX, etc. internally to the physical structure or distribute them upon a wired infrastructure of the physical structure to other inserts within other elements of the physical structure. Accordingly, these initial inserts at the periphery of the physical structure provide a demarcation region between the external wireless environment with a protocol having limited wireless penetration into the physical structure and an internal wireless environment where wireless penetration within the physical structure is improved by one or more of the alternate protocol relative to the initial protocol, a distributed mesh network provided by inserts throughout the physical structure, and an internal wired-wireless network with wired interfaces between insets where physical barriers or distances limit wireless signal penetration coupled to wireless connectivity of other devices and/or inserts to these inserts with wired interfaces.

As evident in respect of FIGS. 3A-3C and 5A-20 such inserts can be implemented within a wide range of receptacles such as electrical outlets, switches, and other PEDs-FEDs etc. Optionally, dedicated receptacles may also be employed to accept a variety of inserts to provide functionality as required within the physical structure such as emergency lighting, security sensors, environmental sensors, security cameras, entry systems etc.

8: Artificial Intelligence Assisted Living—Monitoring and Support

With the essentially ubiquitous availability of wireless connectivity within physical structures such as offices and residences so-called "smart" devices are currently commercially available for a variety of functions. For example, Wi-Fi enabled light switches and dimmers allowing a user to control lights by speaking to a "smart" hub which then wirelessly controls the light switch. Such "smart" hubs include Google Home, Google Nest Hub, Amazon Echo, Apple HomePod etc. but they simply respond to user inputs. Similarly, "smart" thermostats require the user control of the thermostat for a period of time before their "learning" algorithm takes over. Apart from tracking whether a user's smartphone is within wireless range to decide they have left the house and being remotely controlled through a wireless connection the thermostat is otherwise not smart in that it requires user input to learn and/or adjust with factors such as additional or reduced occupants, season etc. Accordingly, if a user leaves their home, for example, but leaves their smartphone behind, or the user returns home without their smartphone then the "smart" thermostat does not respond to these changes.

Accordingly, what is actually required is what the inventors refer to as artificial intelligence assisted living (AIAL) systems, applications and platforms (AIAL-SAPs) where the devices controlling the user's environment are provided with data from a range of sensors allowing for more complex patterns of behaviour to be established together with deviations determined etc. and actions to be taken in respect of these patterns and deviations. However, today a smart home requires that either all existing infrastructure in the environment, e.g. home, office, retail store, etc., be replaced or augmented or that it be configured into the initial build of the environment. Even here issues arise as requirements change over time and the owner of the environment is forced to re-wire, add, remove etc. over time. However, it would be evident that the concepts described and depicted in respect of FIGS. 3A-3C and 5A-20 respectively provide a flexible, low cost, reconfigurable solution allowing the functionality to be established at a point in time, not necessarily immediately at the initial build of the physical structure, and reconfigured as required at subsequent points in time. As described in respect of FIGS. 3A-3C and 5A-20 respectively within some embodiments of the invention these inserts may be implemented within elements of the physical infrastructure providing predetermined fixed functions such as an electrical outlet, light switch etc. However, within other embodiments of the invention as described in respect of FIGS. 3A-3C and 5A-20 respectively improved flexibility can be provided in that the associated function(s) of each element of physical infrastructure to which inserts can be added are not defined initially such an element of physical infrastructure may be configured, for example, as double electrical outlet, a light switch, an electrical outlet with light switch, etc. which is provisioned into the receptacles and changed by removing face plates etc. whilst inserts can be changed on an ad-hoc basis without removing face plates etc.

Figure 21:
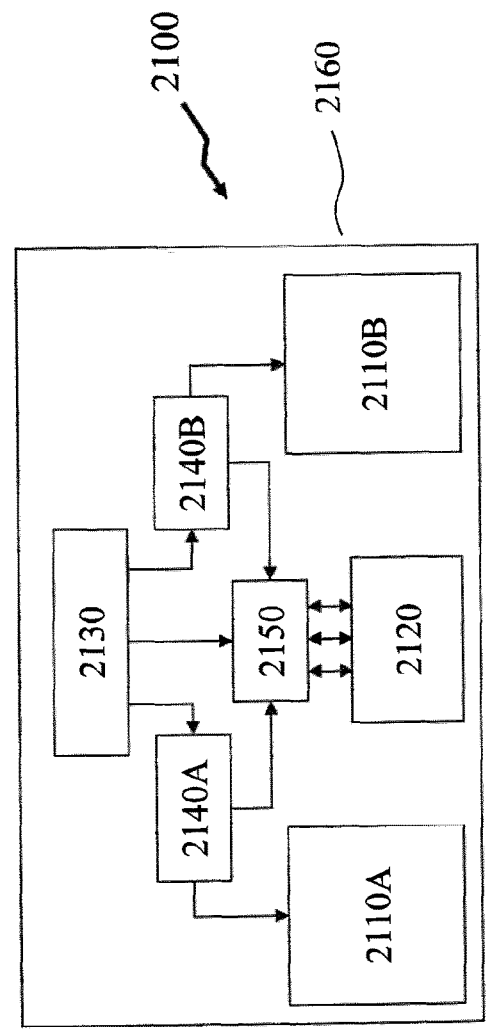
FIG. 21 depicts a schematic of a receptacle according to an embodiment of the invention wherein power consumption of functions within the receptacle are established and communicated to an insert installed within the receptacle.

Referring to FIG. 21 there is depicted a schematic 2100 of a Receptacle 2160 providing a first function 2110A, e.g. an electrical socket or light switch for example, a second function 2110B, e.g. an electrical socket or light switch for example, and a third function 2120 wherein the third function is determined by an insert (not depicted) wherein the insert may, for example, either provide wireless connectivity as the third function 2120 or provide wireless connectivity in conjunction with another functionality, e.g. a sensor, camera, LED, etc., as the third function 2120. The Receptacle 2160 receives electrical power via an Interface 2130 which is coupled to the first function 2110A via a first monitoring circuit 2140A, to the second function 2110B via a second monitoring circuit 2140B, and to the third function via a power and data circuit (PDC) 2150. Additionally, each of the first and second monitoring circuits 2140A and 2140B respectively are coupled to the PDC 2150. Accordingly, the insert associated with the third function 2120 receives appropriate power from the Receptacle 2160 via the PDC 2150. For example, the interface 130 receives 120V AC whilst the PDC provides 12V DC to the third function 2120. The PDC 2150 also receives monitoring signals, or data generated in dependence upon monitoring signals, of the current flowing from Interface 2130 to each of the first and second functions 2110A and 2110B respectively which it provides to the insert associated with the third function 2120. This monitoring data is communicated to a remote device via the wireless interface within the insert associated with the third function 2120 together with any data related to the insert itself.

Accordingly, a plurality of inserts within receptacles, such as Receptacle 1810 in FIG. 18 or Receptacle 2160 in FIG. 21 for example, may provide data to one or more central hubs supporting AIAL-SAPs according to embodiments of the invention, hereinafter referred to as AIAL-SAP hubs. An AIAL-SAP hub may be associated with an environment physically, e.g. an AIAL-SAP hub with an office, residence, factory, home, etc. and therein to one or more electronic devices/systems etc. the AIAL-SAP hub controls. Alternatively, an AIAL-SAP hub may be associated with an environment remotely as it is connected via a network, such as Network 100 in FIGS. 1 and 2, to the plurality of inserts within receptacles and therein to one or more electronic devices/systems via the network. Accordingly, an AIAL-SAP hub may acquire a variety of information from a plurality of inserts within an environment, process it with one or more artificial intelligence (AI)/machine learning (ML) algorithms.

Figure 22:
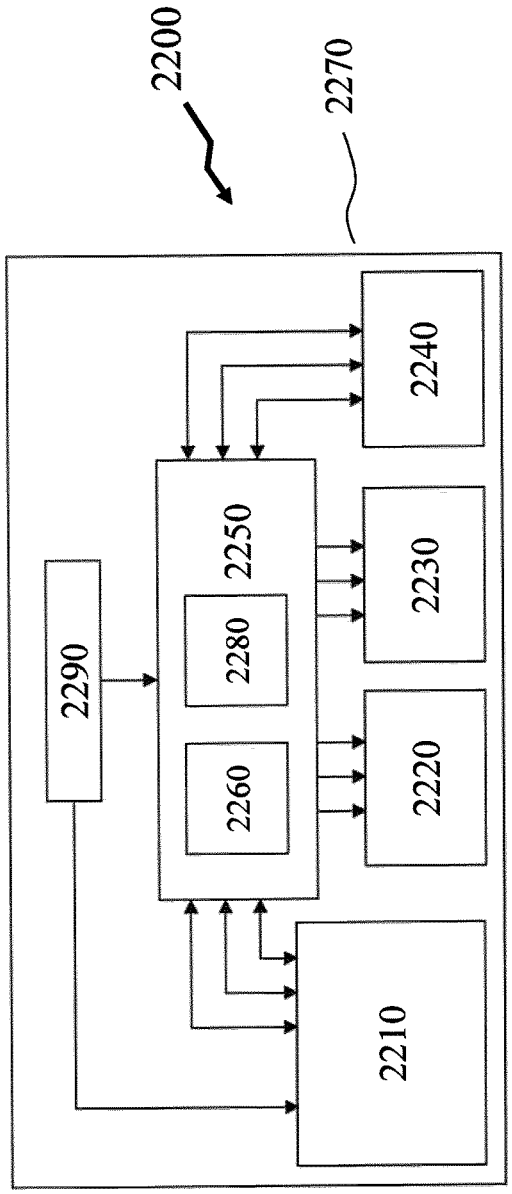
FIG. 22 depicts a schematic of a receptacle incorporating an artificial intelligence assisted living Nano-Hub supporting artificial intelligence based decision making according to an embodiment of the invention.

Optionally, an AIAL hub according to an embodiment of the invention may be within a receptacle or distributed across a plurality of receptacles distributed within an environment. Such a receptacle may include, for example, Receptacle 1810 in FIG. 18 or Receptacle 2160 in FIG. 21 or Receptacle 2270 in FIG. 22. Referring to FIG. 22 there is depicted a schematic 2200 of a Receptacle 2270 according to an embodiment of the invention supporting an AIAL hub 2260 within Electronics 2250 associated with the Receptacle 2270. Disposed within the Receptacle 2270 are a Function 2210, e.g. an electrical power outlet or electrical switch for example, and first to third Inserts 2220, 2230, and 2240 respectively. An Electrical Interface 2290 couples electrical power to the Receptacle 2270 from an external power distribution network. Accordingly, each of the Function 2210 and first to third Inserts 2220, 2230, and 2240 respectively communicate to the AIAL Hub 2260 via the Electronics 2250, although they may communicate directly to the AIAL Hub 2260 within other embodiments of the invention. Accordingly, the AIAL Hub 2260 may determine an action or actions with respect to one or more of the Function 2210 and first to third Inserts 2220, 2230, and 2240 respectively from data received by the AIAL Hub 2260 from all or a subset of the Function 2210 and first to third Inserts 2220, 2230, and 2240 respectively either in isolation or in conjunction with data received from functions and/or inserts of one or more other Receptacles 2270 or other PEDs, FEDs, wearable devices, sensors etc. linked to the AIAL Hub 2260. Optionally, the AIAL Hub 2260 may communicate via an Interface 2280 forming part of the Electronics 2250. Such a communications interface may, for example, be a wired interface and/or a wireless interface such as described above in respect of FIG. 2.

Figure 23:
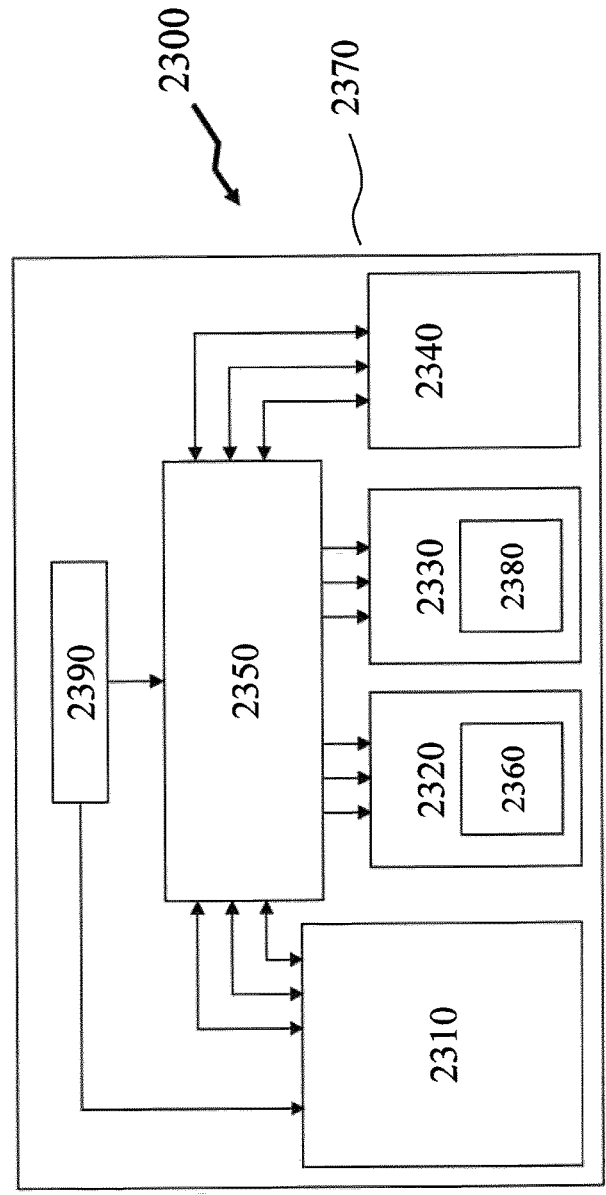
FIG. 23 depicts a schematic of a receptacle for incorporating an insert comprising an artificial intelligence assisted living Nano-Hub supporting artificial intelligence based decision making according to an embodiment of the invention.

Optionally, an AIAL hub according to an embodiment of the invention may be within an insert or distributed across a plurality of inserts distributed within an environment. Such a receptacle may include, for example, Insert 1820 in FIG. 18 or Receptacle 2370 in FIG. 23. Referring to FIG. 23 there is depicted a schematic 2300 of a Receptacle 2370 according to an embodiment of the invention supporting an AIAL hub 2260 within a first insert 2320. Disposed within the Receptacle 2370 are a Function 2310, e.g. an electrical power outlet or electrical switch for example, and first to third Inserts 2320, 2330, and 2340 respectively. An Electrical Interface 2390 couples electrical power to the Receptacle 2370 from an external power distribution network. Accordingly, each of the Function 2310 and second to third Inserts 2330 and 2340 respectively communicate to an AIAL Hub 2360 within the first Insert 2320 via the Electronics 2350, although they may communicate directly within other embodiments of the invention. Accordingly, the AIAL Hub 2360 may determine an action or actions with respect to one or more of the Function 2310 and first to third Inserts 2320, 2330, and 2340 from data received by the AIAL Hub 2360 from all or a subset of the Function 2310 and first to third Inserts 2320, 2330, and 2340 either in isolation or in conjunction with data received from functions and/or inserts of one or more other Receptacles 2370 or other PEDs, FEDs, wearable devices, sensors etc. linked to the AIAL Hub 2360. Optionally, the AIAL Hub 2360 may communicate via an Interface 2380 forming part of the second Insert 2330 although within other embodiments of the invention the Interface 2380 may form part of the first Insert 2320, part of the third Insert 2340, part of the Function 2310, part of the Electronics 2350 or be discrete from all of these within the Receptacle 2370. Such a communications interface may, for example, be a wired interface and/or a wireless interface such as described above in respect of FIG. 2.

Optionally, the AIAL hub may be implemented within an insert such as Insert 1820 in FIG. 18 for example such that absent a plurality of receptacles determining the presence of an AIAL hub within their environment, either through direct access such as via wireless interface, through a network to an AIAL hub within a predetermined geographical region around the receptacle(s), or within a number of hops within an ad-hoc network from the receptacle(s) then the receptacles may establish communications with a remote AIAL hub either associated with a geographically associated physical infrastructure or remotely. For example, receptacles within a first environment of the building, e.g. an apartment within an apartment building, may determine that an AIAL hub does not exist within their immediate environment but that there is one associated with the apartment building and accordingly communicate with it. Other receptacles within a second environment of a building, e.g. another apartment within an apartment building, may determine that an AIAL hub does exist, via an insert or being integrated within a receptable for example, within their immediate environment and accordingly communicate with it. Other receptacles within a third environment of the building, e.g. another apartment within an apartment building, may determine that no AIAL hub exists and accordingly communicate with a remote server.

Optionally, a graphical user interface of an application associated with one or more of receptacle(s), insert(s) and/or AIAL hub(s) may allow a user to configure aspects of one of more of an insert, a receptacle, and an AIAL hub. For example, at initial installation an insert may be configured so that it is associated with an AIAL hub through one or more techniques such as AIAL hub identification through network scanning, entry of AIAL hub IP address by user, communication with another insert, AIAL hub associated with a predetermined service provider or third party provider etc. This application may be a software application installed upon a PED associated with the user, a software application installed within a PED associated with an installation technician or engineer (e.g. electrician) or a software application installed within a tester (e.g. an item test equipment) associated with an installation technician or engineer (e.g. a service provider technician etc.).

Accordingly, an AIAL hub according to an embodiment of the invention receives data from a plurality of sensors, e.g. those relating to motion, humidity levels, temperature, sound, vibration, light levels, door position, window position, power consumption, light settings, etc. From these the AIAL hub learns the habits of the user(s) of the environment associated with the AIAL hub, what the inventors refer to as the "normal" habits of the user(s) of the environment. Subsequently, the AIAL hub can determine whether a deviation outside of typical variations in respect of these habits has occurred. A determination of a deviation outside of typical variations can trigger the AIAL hub to issue a notification in this respect. Such a notification may be to an individual, a workstation, etc. For example, an AIAL hub monitoring patients within a hospital or residents within a residential home or elderly care facility may issue the notification to a workstation associated with the hospital, residential home or elderly care facility. If the AIAL hub is monitoring a house then the notification may be sent to a predetermined individual such as the owner, occupant etc. The AIAL hub is monitoring an elderly patient at home then the notification may be sent to a next of kin, relative, friend, etc. or to a doctor, emergency service etc.

Optionally, within embodiments of the invention the AIAL hub may determine an extent of the deviation and different resultant outcomes may be associated with different thresholds of deviations. For example, a low deviation above a first threshold may trigger a notification to a first user or system, a moderate deviation above a second threshold may trigger a notification to a second user or system, and a high deviation above a third threshold may trigger a notification to a third user or system.

Optionally, these thresholds may be established by the AI with respect to a normal deviation or distribution of the habit established over a period of time.

Optionally, different monitored aspects of the environment may have different thresholds.

Optionally, a deviation may be associated with a single monitored aspect of the environment in isolation or relative to other monitored aspects.

Optionally, a deviation may be associated with multiple monitored aspects of the environment in isolation or relative to other monitored aspects.

Optionally, overall environment management may be established in relation to multiple monitored aspects of the environment, but an alarm or trigger may be generated in dependence upon a single monitored aspect.

For example, if the monitored environment is associated with a user and the monitored environment ambient noise is being monitored then detection of a sound associated with glass breaking, a heavy object being dropped, a sound similar to a person falling, a shout for help etc. may be detected and according trigger an alarm. Here, the alarm triggered may be associated with the type of detected event.

Optionally, the notification or notifications associated with the type of detected event may determine to whom and how the notification or notifications are sent. In the example above, a shout for help may trigger an alarm to one or more emergency response teams such as police, ambulance and paramedics whilst the sound associated with breaking glass triggers an alarm to an emergency contact, e.g. a relative, neighbour etc.

Optionally, the notification or notifications associated with the type of detected event may determine to whom and how the notification or notifications are sent where the type of detected event is modified by one or more other monitored environmental parameters. In the example above, the sound associated with breaking glass then if the sound is detected when other monitored parameters indicate no one within the environment or they are asleep, for example, then a burglar alarm and a notification to the police may be indicated. Alternatively, if the sound occurs in conjunction with the sound of running water and movement in a kitchen then no alarm may be immediately triggered unless no subsequent motion is detected for example indicating a potential injury. However, if this scenario was within a bathroom then an alarm to a relative, other member of the household etc. might be automatically triggered. Accordingly, an alarm may be triggered or not triggered from a common set of monitored conditions based upon a context of the monitored event established by the AIAL hub.

9: Artificial Intelligence Assisted Living—Energy Management/Consumption

Within the preceding description additional intelligence has been described in respect of FIGS. 22 and 23 for providing an AIAL Hub within the receptacle and/or an insert of the receptacle. However, within other embodiments of the invention an AIAL Nano-Hub may be associated with a receptacle and/or an insert. In contrast to the description above in respect of AIAL Hubs which acquire and process data received from functions and/or inserts of other receptacles or other PEDs, FEDs, wearable devices, sensors etc. linked to the AIAL Hub an AIAL Nano-Hub acquires and processes data received from functions and/or inserts of a single receptacle or other PEDs, FEDs, wearable devices, sensors etc. linked to the receptacle associated with the AIAL Nano-Hub. Each AIAL Nano-Hub may locally process and make decisions with respect to the receptacle, inserts etc. and communicate these decisions to an AIAL Hub. Accordingly, each receptacle may provide localized decision making/control within a framework of an overall decision making/control provided by an AIAL Hub.

Figure 24:
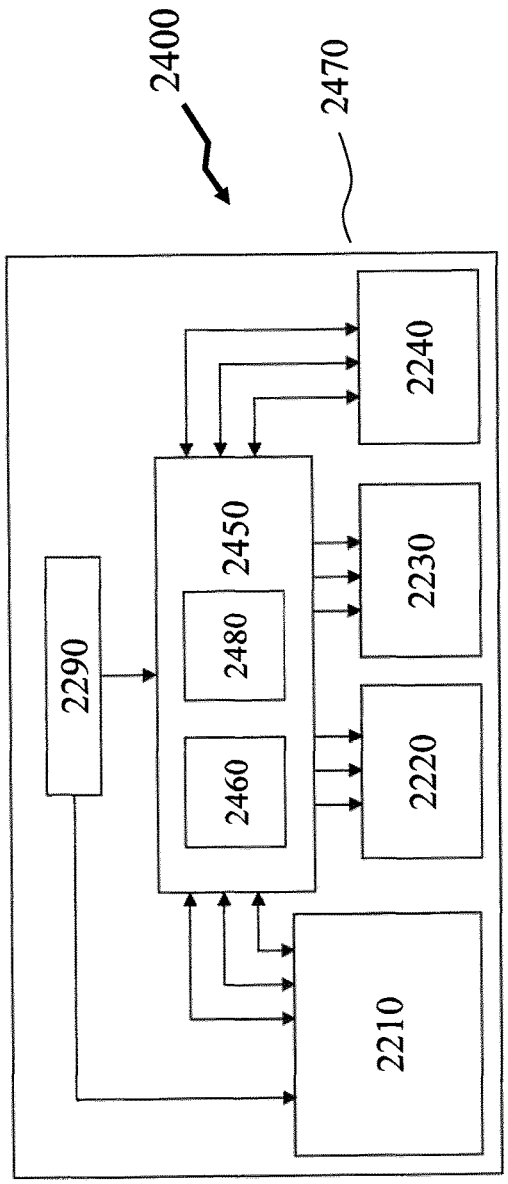
FIG. 24 depicts a schematic of a receptacle incorporating an artificial intelligence assisted living Nano-Hub supporting artificial intelligence based decision making according to an embodiment of the invention.
Figure 25:
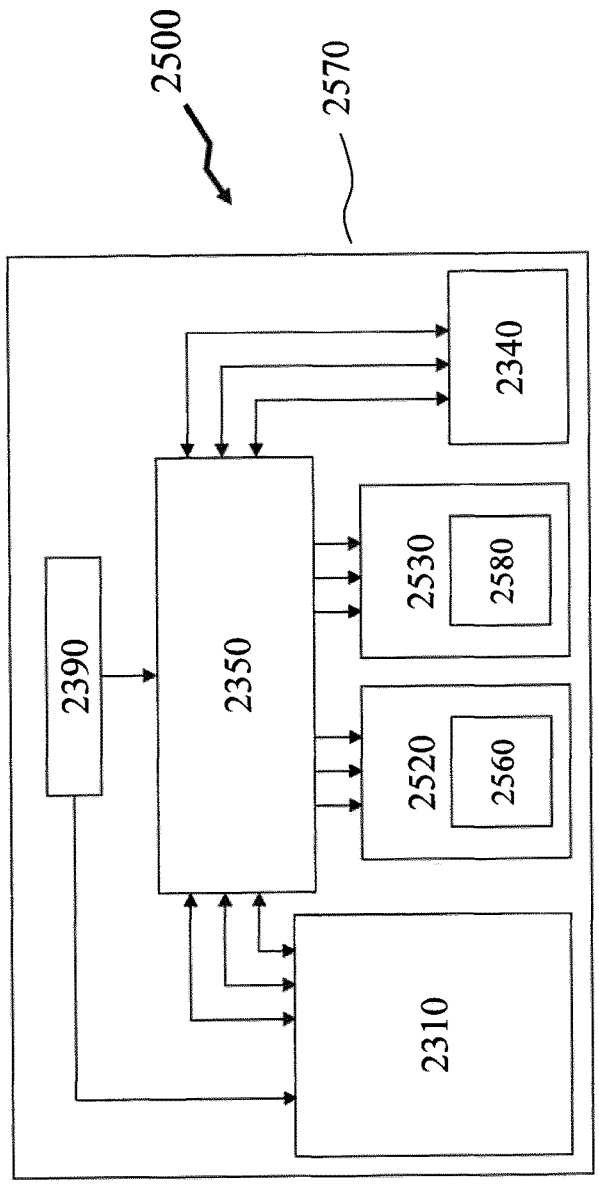
FIG. 25 depicts a schematic of a receptacle for incorporating an insert comprising an artificial intelligence assisted living Nano-Hub supporting artificial intelligence based decision making according to an embodiment of the invention.

For example, Receptacles 2470 and 2570 as described and depicted with respect to FIGS. 24 and 25 may each, within an embodiment of the invention be installed within a baseboard heater such that the Functions 2210 and 2310 control the baseboard heater. Accordingly, an AIAL Hub may have established that heating for the physical structure to which the baseboard heaters are associated with should be turned on at 5 pm and turned off at 10 pm based upon the date and its AI/ML processing of data relating to the physical structure over time. However, the AIAL Nano-Hub 2460 or 2560 associated with the Receptacle 2470 or 2570 determines that at 5 pm rather than the area being occupied it is unoccupied and accordingly does not turn the heaters on but rather waits until an occupancy of the area is determined from an infrared sensor within one of the inserts within the Receptacle 2470 or 2570 determining the presence of an individual or individuals. Equally, the AIAL Nano-Hub 2460 or 2560 associated with the Receptacle 2470 or 2570 determines that at 10 pm rather than the area being unoccupied it is occupied and accordingly does not turn the heaters off but rather waits until no occupancy of the area is determined from an infrared sensor within one of the inserts within the Receptacle 2470 or 2570. Accordingly, it would be evident that the AIAL Nano-Hubs may provide localized override of decisions made by the AIAL Hub or adjusts them based upon local information.

An AIAL Hub may push in advance of specific time related actions/decisions with respect to receptacles such that a temporary failure of wireless communications from the AIAL Hub to the AIAL Nano Hubs does not prevent the action/decision being made at that specific time or trigger. As such each AIAL Nano-Hub may include a clock allowing a time/date function to be implemented within the receptacle. Accordingly, the AIAL Hub(s) and AIAL Nano-Hubs may communicate with a protocol defining an action/trigger, time etc. To avoid continuous data communications between AIAL Hub(s) and AIAL Nano-Hub(s) these communications may be periodically provided with or without the use of data compression techniques to limit the data transmitted.

Referring to FIG. 24 there is depicted a schematic 2400 of a Receptacle 2470 according to an embodiment of the invention supporting an AIAL Nano-Hub 2460 within Electronics 2450 associated with the Receptacle 2470. Disposed within the Receptacle 2470 are a Function 2210 and first to third Inserts 2220, 2230, and 2240 respectively together with an Electrical Interface 2290 such as described above in respect of FIG. 22. Accordingly, each of the Function 2210 and first to third Inserts 2220, 2230, and 2240 respectively communicate to the AIAL Nano-Hub 2460 via the Electronics 2450, although they may communicate directly within other embodiments of the invention. Accordingly, the AIAL Nano-Hub 2460 may determine an action or actions with respect to one or more of the Function 2210 and first to third Inserts 2220, 2230, and 2240 respectively from data received by the AIAL Nano-Hub 2460 from all or a subset of the Function 2210 and first to third Inserts 2220, 2230, and 2240 either in isolation or in conjunction with data received from functions and/or inserts of one or more other receptacles or other PEDs, FEDs, wearable devices, sensors etc. linked to the AIAL Nano-Hub 2460. The AIAL Nano-Hub 2460 may communicate via an Interface 2280 forming part of the Electronics 2250 to an AIAL Hub such as described above. Such a communications interface may, for example, be a wired interface and/or a wireless interface such as described above in respect of FIG. 2.

Referring to FIG. 25 there is depicted a schematic 2500 of a Receptacle 2570 according to an embodiment of the invention supporting an AIAL Nano-Hub 2560. Disposed within the Receptacle 2570 are a Function 2310, third Insert 2340, Electronics 2350 and Electrical Interface 2390 such as described in respect of FIG. 23. Also depicted are first and second Inserts 2520 and 2530 respectively. Disposed within the first Insert 2520 is an AIAL Nano-Hub 2560 and within the second Insert 2530 an Interface 2580. Accordingly, each of the Function 2310, third Insert 2340 and first and second Inserts 2520 and 2530 communicate to the AIAL Nano-Hub 2560 via the Electronics 2350, although they may communicate directly within other embodiments of the invention. Accordingly, the AIAL Nano-Hub 2560 may determine an action or actions with respect to one or more of the Function 2310, third Insert 2340 and first and second Inserts 2520 and 2530 from data received by the AIAL Nano-Hub 2560 from all or a subset of the Function 2310, third Insert 2340 and first and second Inserts 2520 and 2530 or in conjunction with data received from functions and/or inserts of one or more other Receptacles 2370 or other PEDs, FEDs, wearable devices, sensors etc. linked to the AIAL Hub 2360. Optionally, the AIAL Hub 2560 may communicate via the Interface 2580 forming part of the second Insert 2530. Such a communications interface may, for example, be a wired interface and/or a wireless interface such as described above in respect of FIG. 2.

Accordingly, a receptacle such as Receptacle 2470 in FIG. 24 with AIAL Nano-Hub 2460 or Receptacle 2570 in FIG. 25 with first Insert 2520 and AIAL Nano-Hub 2560 may perform machine based learning of one or more aspects of each of its functions. Such functions may include, but not be limited to, those provided by Functions 2210 and 2310 in FIGS. 24 and 25 respectively; provided by first to third inserts 2220 to 2240 respectively in FIG. 24; or third insert 2340 and first to second inserts 2520 to 2530 respectively for example.

Based upon the machine based learning the AIAL Nano-Hub such as AIAL Nano-Hub 2460 in FIG. 24 or AIAL Nano-Hub 2560 in FIG. 25 may determine to perform a modification, enablement or cancellation of an aspect of the function(s) and/or insert(s). For example, an AIAL Nano-Hub enabled receptacle such as Receptacles 2400 and 2500 in FIGS. 24 and 25 respectively may also comprise power monitoring such as described in respect of Receptacle 2100 in FIG. 21. Accordingly, the AIAL Nano-Hub may within an embodiment of the invention decide to turn off, turn on or adjust the intensity of a light connected to a light switch, this being the function of the receptacle or a function of an insert of the receptacle. Accordingly, an AIAL Nano-Hub may within an embodiment of the invention decide to turn off or turn on electrical power to a power outlet, communications interface, etc. where this is the function of the receptacle or a function of an insert of the receptacle.

Accordingly, an AIAL Nano-Hub such as described in respect of FIGS. 24 and 25 may establish through communications to/from an insert the function(s) of the insert(s) installed within the receptacle and accordingly adjust the actions managed by the AIAL Nano-Hub in dependence upon the function(s) of the insert(s). Accordingly, considering the example above where the receptacle is associated with a baseboard heater then of the AIAL Nano-Hub determines an insert includes an infrared sensor it accordingly can employ this information to adjust locally the decision with respect to turning on, turning off, adjusting the baseboard heater against the overall control decision from the AIAL Hub. However, if the AIAL Nano-Hub determines that none of the inserts includes an infrared sensor it accordingly defaults to slaving the turning on, turning off, adjusting the baseboard heater to the overall control decision from the AIAL Hub.

Accordingly, an AIAL Nano-Hub such as described in respect of FIGS. 24 and 25 may establish through communications to/from a function the physical functionality of the function(s) installed within the receptacle where the physical functionality of the receptacle can be established through which modules are inserted into the receptacle such as described above in respect of FIGS. 13A to 16 respectively.

Alternatively, the AIAL Nano-Hub may be initially configured through data stored with a memory associated with the AIAL Nano-Hub with this physical functionality of the function(s) installed within the receptacle.

In this manner an AIAL Nano-Hub according to an embodiment of the invention may perform functions under the direction of an AIAL Hub and/or based upon its own decision making. Accordingly, an AIAL Nano-Hub may turn off an electrical device connected to an outlet where the electrical device is drawing power but the AIAL Nano-Hub determines that the electrical device should not be powered. For example, the AIAL Nano-Hub may determine through monitoring wireless signals that a cable television (TV) set-top box has been turned off by a user but that the associated TV is still powered on wherein the AIAL Nano-Hub then turns off the associated TV. Alternatively, the AIAL Nano-Hub may determine that the cable TV set-top box and associated TV are powered off, an alarm for the premises associated with the cable TV set-top box and associated TV has been set to "Away" or turned on wherein the AIAL Nano-Hub turns off power at the wall receptacle, for example, thereby removing these ongoing low level power drains, commonly referred to as vampire power, leeched electrical power, or leeched energy.

Alternatively, the AIAL Nano-Hub may determine that lights within an area have been turned on but that the motion sensors indicate no one within the area and turn the lights off. In this instance, the motion sensors may be associated with ingress/egress points of an area and independent of the actual lights themselves. Accordingly, an AIAL Nano-Hub may provide additional functionality.

10: Artificial Intelligence Assisted Living—User Definable Appliance Functional Modules As described above in respect of Section 6 additional functionality can be provided to a wide range of PEDs, FEDs, wearable devices, etc. by providing a receptacle to which one or more added modular functional units (inserts) are added. As discussed above in respect of artificial intelligence assisted living in Sections 8 and 9 this functionality can be augmented with decision making undertaken locally, e.g. an AIAL Nano-Hub such as described above in respect of FIGS. 24 and 25 respectively, or an AIAL Hub such as described above.

Accordingly, within embodiments of the invention an insert may provide modular functional unit addition to a PED, FED, wearable device, etc. to control and/or monitor the PED, FED, wearable device, etc.

Accordingly, within embodiments of the invention an insert may provide modular functional unit addition to a PED, FED, wearable device, etc. wherein the functionality provided by the insert is unrelated to or an independent function of the PED, FED, wearable device etc.

11: Modular Interfaces for Portable and Fixed Electrical and/or Electronic Devices As described above in respect of Section 6 additional functionality can be provided to a wide range of PEDs, FEDs, wearable devices, etc. by providing a receptacle to which one or more added modular functional units (inserts) are added. As discussed above in respect of artificial intelligence assisted living in Sections 8 and 9 this functionality can be augmented with decision making undertaken locally, e.g. an AIAL Nano-Hub such as described above in respect of FIGS. 24 and 25 respectively, or an AIAL Hub such as described above.

For example, within embodiments of the invention an item to which the functionality is added may be what the refer to as "dumb" in that whilst it contains a control circuit, e.g. a baseboard heater with a simple thermostat, the item cannot adjust its operation outside that provided by the internal thermostat. Accordingly, through a simple modification a baseboard heater, for example, can be modified using an insert such as described and depicted in respect of 6. This may be at original manufacturing or post-installation.

Accordingly, considering the original manufacturing scenario the receptacle may contain the control electronics for the baseboard heater such that with a "blank" insert the baseboard heater operates as per prior art baseboard heaters. However, if the "blank" insert is replaced the normal functionality is bypassed and the baseboard heater is now controllable through a network connection, either by the user themselves via wireless connectivity, or through another manner including an AIAL Nano-Hub within the insert, an AIAL Nano-Hub within a receptacle, or an AIAL Hub.

Accordingly, considering the post-installation scenario the receptacle may now replace the control electronics for the baseboard heater. Accordingly, the receptacle may contain electrical connections for electrical power from the mains wiring and electrical connections to the heater element(s). Accordingly, once installed the baseboard heater is now controllable through a network connection, either by the user themselves via wireless connectivity, or through another manner including an AIAL Nano-Hub within the insert, an AIAL Nano-Hub within a receptacle, or an AIAL Hub.

Whilst the embodiments presented above relate to a baseboard heater, e.g. a fixed electrical device, these may also be applied to a fan heater, e.g. a portable electrical device. Optionally, the receptacle may be integrated within an electrical work box to which the baseboard heater is hard wired such as described and depicted in respect of FIGS. 6A, 14, 17 and 18 respectively, for example, and Sections 2, 5 and 6, for example.

12: Infrastructure Embedded Modular Wireless Control

Within the descriptions above in respect to inserts within receptacles, artificial intelligence assisted living etc. an insert providing a wireless interface may be employed. However, within these descriptions the wireless interface has been depicted, for example with respect to Sections 2 and 5 as a separate function to that of the receptacle itself, either as designed (see Section 2 for example) or defined (see Section 5 for example). Within Section 9 with respect to FIG. 25 the wireless functionality within an insert is described as communicating data from the receptacle/inserts to another device, e.g. another wireless insert within an ad-hoc wireless network, AIAL Hub, network etc. However, as depicted in FIG. 26 this data flow may also go from an insert to the receptacle in order to control aspects of the receptacle, function(s) of the receptacle, or functions of another insert(s).

Figures 26, 28:
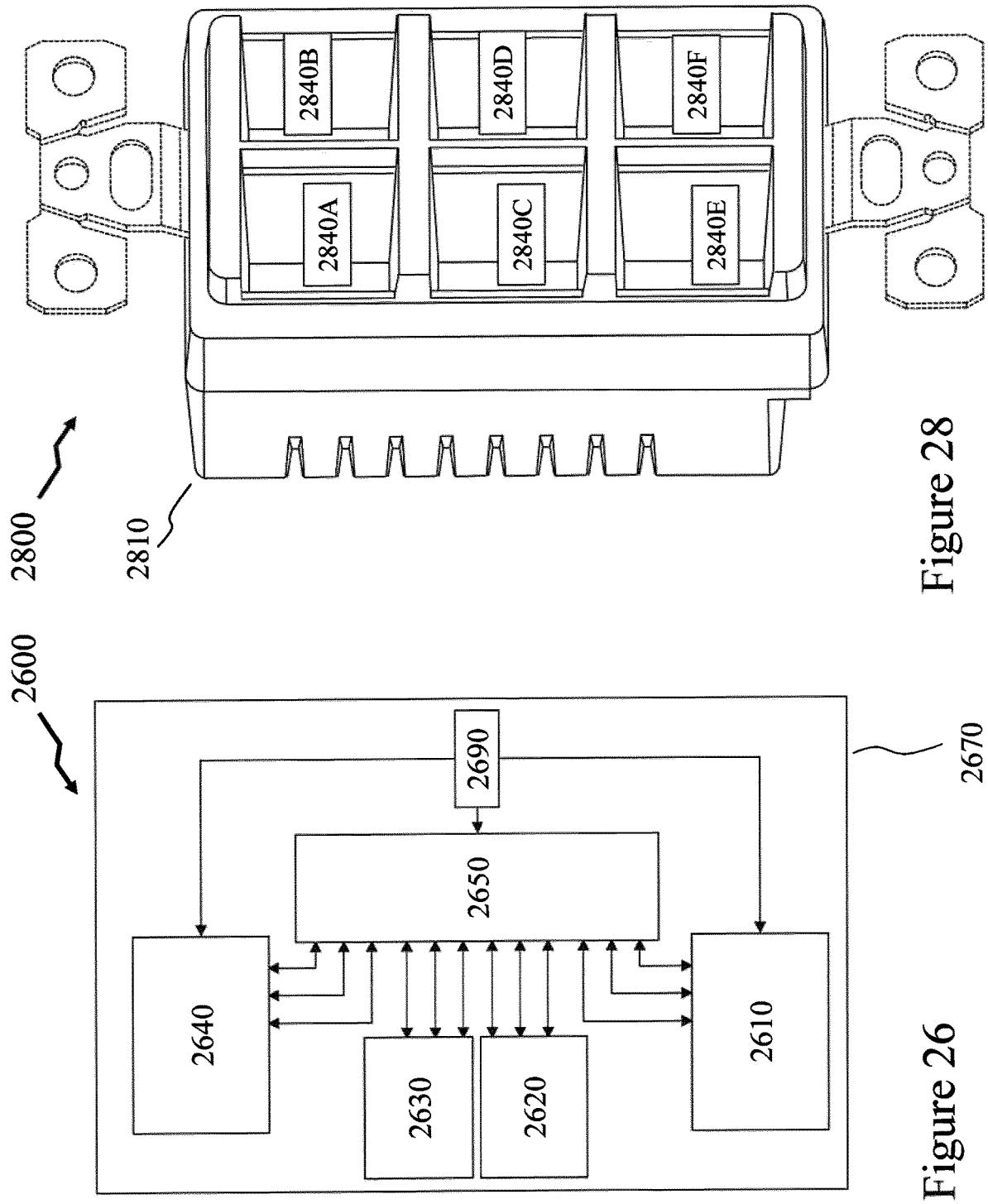
FIG. 26 depicts a schematic of a receptacle according to an embodiment of the invention wherein communications to/from functions within the receptacle are established and communicated to an insert installed within the receptacle.
FIG. 28 depicts a configurable receptacle according to an embodiment of the invention wherein the installed sensor functionality can be either set at installation or post-installation.

Referring to FIG. 26 there is depicted a schematic 2600 of a Receptacle 2670 according to an embodiment of the invention. Disposed within the Receptacle 2670 are a first Function 2610, second Function 2640, first Insert 2620, second Insert 2630, Electrical Circuit 2650 and Electrical Interface 2690. The Electrical Interface 2690 providing functionality such as described in respect of FIG. 23 and Electrical Interface 2390. Accordingly, connections between each of the first Function 2610, second Function 2640, first Insert 2620, second Insert 2630 and the Electrical Circuit 2650 are all depicted as bidirectional. Accordingly, one or more aspects of each of the first Function 2610 and second Function 2640 can be controlled by the Electrical Circuit 2650 as well as the Electrical Circuit 2650 receiving data relating to each of the first Function 2610 and second Function 2640 such as described above. Further, each of the first Insert 2620 and second Insert 2630 receive data from the Electrical Circuit 2650 and provide data to the Electrical Circuit 2650. Accordingly, if one or both of the first Insert 2620 and second Insert 2630 provide a wireless interface functionality then according to the functionality embedded into the Electrical Circuit 2650 aspects of the Receptacle 2670, the first Function 2610, second Function 2640, first Insert 2620, the second Insert 2630 may be controlled.

For example, if first Insert 2620 provides a Bluetooth wireless interface then any electronic device paired with the first Insert 2620 could provide commands which are received by the first Insert 2620 and communicated to the Electrical Circuit 2650 wherein they are executed. Alternatively, second Insert 2630 may support IEEE 802.14 wireless protocol(s) such that commands can be provided to the Electrical Circuit 2650 via the second Insert 2620 from any device coupled to a network to which the second Insert 2650 is also coupled.

Alternatively, a first wireless circuit within the first Insert 2620 may receive commands which are re-broadcast by a second wireless circuit within the second Insert 2630. Alternatively, a first wireless circuit within the first Insert 2620 may receive data which is communicated to an electronic device via a wired interface, e.g. a USB interface within the second Insert 2630.

Optionally, the first wireless circuit and second wireless circuit may be within a common insert, such as first Insert 2620 for example.

Optionally, the first wireless circuit and the wired interface may be within a common insert, such as first Insert 2620 for example.

Accordingly, the Receptacle 2670 with the appropriate inserts can receive commands and employ these either with respect to the function(s) of the receptacle, e.g. to enable output power, disable output power, set an output power level, etc. or with respect to function(s) of the insert(s).

However, the Receptacle 2670 by virtue of being able to receive wireless signals according to a first wireless standard and re-broadcast them upon a second wireless standard is able to provide additional functionality within an AIAL environment. For example, the wireless signals according to the second standard may, for example, be an RF signal for remote control of an electronic devices such as a television, smart television, personal video recorder (PVR) etc. In this manner the Receptacle 2670 may receive wireless signals according to the first standard from a user's smartphone, for example, through Bluetooth and re-broadcast these so that an application upon the user's smartphone provides them with the functionality of an RF remote control normally provided with the electronic device(s) such as the television, smart television, personal video recorder (PVR) etc.

Within another embodiment of the invention a receptacle such as Receptacle 2670 for example may employ a first insert, e.g. first Insert 2620 in FIG. 26, which has a wireless receiver and a second insert, e.g. second Insert 2630 in FIG. 26, which has an optical emitter supporting modulated output, e.g. a visible LED or an infrared LED. In this manner signals received according to a wireless standard supported by the first insert are re-broadcast optically by the optical emitter within the second insert. It would be evident that optionally, within other embodiments of the invention, the first and second inserts may be the same insert.

Within another embodiment of the invention a receptacle such as Receptacle 2670 for example may employ a first insert, e.g. first Insert 2620 in FIG. 26, which has a wireless receiver and has an additional functionality provided within the Electrical Circuit 2650 such that data received via the first Insert 2620 is communicated to the Electrical Circuit 2650 and employed to generate power line communication (PLC) signals which are applied to the electrical mains via the Electrical Interface 2690. Alternatively, PLC signals received via the Electrical Interface 2690 are processed by the Electrical Circuit 2650 and provided to a transmitter within an insert, e.g. first Insert 2620 in FIG. 26. This transmitter may be wireless according to a standard or it may be optical according to another standard or within other embodiments of the invention the insert may support wireless and optical signals and the data provided from the Electrical Circuit 2650 indicates to the insert which interface is to be employed or whether both are to be employed.

Within another embodiment of the invention a receptacle such as Receptacle 2670 for example may employ a first insert, e.g. first Insert 2620 in FIG. 26, which has a gesture recognition interface component operating either standalone or in combination with the receptacle it is inserted within, another insert within the same receptacle, another insert within another receptacle, another receptacle, etc. Accordingly, gestures generated by a user are established via the first insert and may, for example, be re-broadcast optically or wirelessly by an appropriate emitter within a second insert of the receptacle, e.g. second Insert 2630, another insert within another receptacle, the receptacle etc. In this manner gestures by the user can be employed to control electronic and/or electrical devices within the user's local environment and/or remote environments. For example, a gesture recognition interface may exploit a depth aware camera, stereo cameras, a single camera, and radar. It would be evident that gesture recognition may also be performed using other inserts where the insert is receiving data from another electronic device establishing the user's motion for the gesture such as a stylus, handheld controller (e.g. Nintendo Wii controller), a wearable device comprising a MEMS accelerometer based gyroscope, a gyroscope, etc. may also be employed.

Within another embodiment of the invention a receptacle such as Receptacle 2670 may enable or disable an insert or inserts, e.g. first Insert 2620 and/or second Insert 2630, based upon a current function or state of first Function 2610 and/or second Function 2640 rather than the Receptacle 2670 enabling or disabling current function or state of first Function 2610 and/or second Function 2640, based upon data from an insert or inserts, e.g. first Insert 2620 and/or second Insert 2630. Optionally, considering Receptacle 2670 a single function, e.g. first Function 2610 may enable/disable a predetermined insert, e.g. first Insert 2620 or second Insert 2630, or it may enable/disable both inserts. Optionally, considering Receptacle 2670 the first Function 2610 may enable/disable a predetermined insert, e.g. first Insert 2620 or second Insert 2630, whilst the second Function 2640 may enable/disable the other of the first Insert 2620 and second Insert 2630.

Optionally, within another embodiment of the invention an insert, e.g. first Insert 2620 or second Insert 2630 may enable/disable a predetermined function, e.g. first Function 2610 or second Function 2640. Optionally, considering Receptacle 2670 the first Insert 2620 may enable/disable a predetermined function, e.g. first Function 2610 or second Function 2640, whilst the second Insert 2630 may enable/disable the other of the first Function 2610 and second Function 2640.

Optionally, within another embodiment of the invention the first Insert 2620 supports a microphone such that vocal commands provided by a user within the environment around the first Insert 2620 are communicated to the Electrical Circuit 2650 processed and employed to control a function or functions of the Receptacle 2670, control another electronic device via an optical and/or wireless interface within the same insert or another insert of the Receptacle 2670, control another device via PLC communications, provide data to an AIAL Hub, provide data to an AIAL Nano-Hub, or provide data to another receptacle. In this manner a user may employ an insert with a microphone and associated receptacle as a generic voice activated controller for a large number of functions within their environment or other environments. For example, the user can vocalize "Monday Night Football" and the Electrical Circuit 2650 will communicate via the appropriate interfaces within itself and/or other receptacles to turn on a TV, turn on a cable set-top box (STB) and tune the STB to a channel showing "Monday Night Football", start a microwave in another room to cook popcorn, and order a 12" deep dish pepperoni pizza (via a web interface of the smart TV for example).

Accordingly, it would be evident to one of skill in the art that receptacles and inserts according to embodiments of the invention may provide remote control functionality through a variety of interfaces allowing a user to establish a wide range of automation tasks or assisted living tasks discretely or in combination with artificial intelligence assisted living methodologies such as described above. AIAL would allow repeated automation tasks, such as the user requesting "Monday Night Football" every Monday between September and January, to be initially monitored and then associated as an event to automatically trigger for the user. However, as the user only ordered pizza sporadically the learnt AIAL process either does not include ordering the pizza or includes a prompt to the user as to whether they wish to order one or not.

13: Artificial Intelligence based Monitoring of Embedded Modular Environmental Sensors for Property Monitoring As discussed above inserts may employ a wide range of sensors. Further, as the functionality of a receptacle itself may also be configured at installation then it is also possible that included amongst the potential functions of a receptacle is environmental sensing. Accordingly, referring to FIG. 27 there is depicted a configurable receptacle, Receptacle 2710, according to an embodiment of the invention together with its faceplate 2720. The associated electrical work box, retention means for faceplate 2720 etc. have been omitted for clarity. Accordingly, the Receptacle 2710 can accept a first functional insert within the upper first cavity 2710A, a second functional insert within the lower third cavity 2710C, and an insert within the second middle cavity 2710B.

As depicted an insert selected from Insert Group 2750 comprising inserts 2750A to 2750N may be employed within the second middle cavity 2710B of Receptacle 2710.

For the first upper cavity 2710A a functional insert from first Functional Group 2730 may be employed. As depicted first Functional Group 2730 comprises North American (NA) Power Outlet 2730A, Toggle Switch 2730B, Dual USB Interface 2730C, Blank 2730D and first Sensor Module 2730E.

For the third lower cavity 2710C a functional insert from second Functional Group 2740 may be employed. As depicted second Functional Group 2740 comprises North American (NA) Power Outlet 2740A, Toggle Switch 2740B, Dual USB Interface 2740C, Blank 2730D and second Sensor Module 2740E.

Within embodiments of the invention the functionality of second Sensor Module 2740E may be the same as the functionality of first Sensor Module 2730E or within other embodiments of the invention it may be different. Within other embodiments of the invention each of the first and second Sensor Modules 2730E and 2740E may be one of a series of variants of sensor modules providing different functionalities. For example, a first subset of one or more sensor modules may be directed to one application, e.g. security, whilst a second subset of one or more other sensor modules may be directed to another application, e.g. environment monitoring. Further, as depicted in schematic 2800 a Receptacle 2810 may be configured to accept multiple smaller footprint inserts, not depicted for clarity, wherein the Receptacle 2810 accepts up to six inserts within first to sixth cavities 2840A to 2840F respectively. Accordingly, it would be evident that embodiments of the invention may therefore support dedicated sensor only inserts as well as sensor based inserts into receptacles that provide other functions through design of the receptacle or through a functional insert used to configure a receptacle for example.

Figure 27:
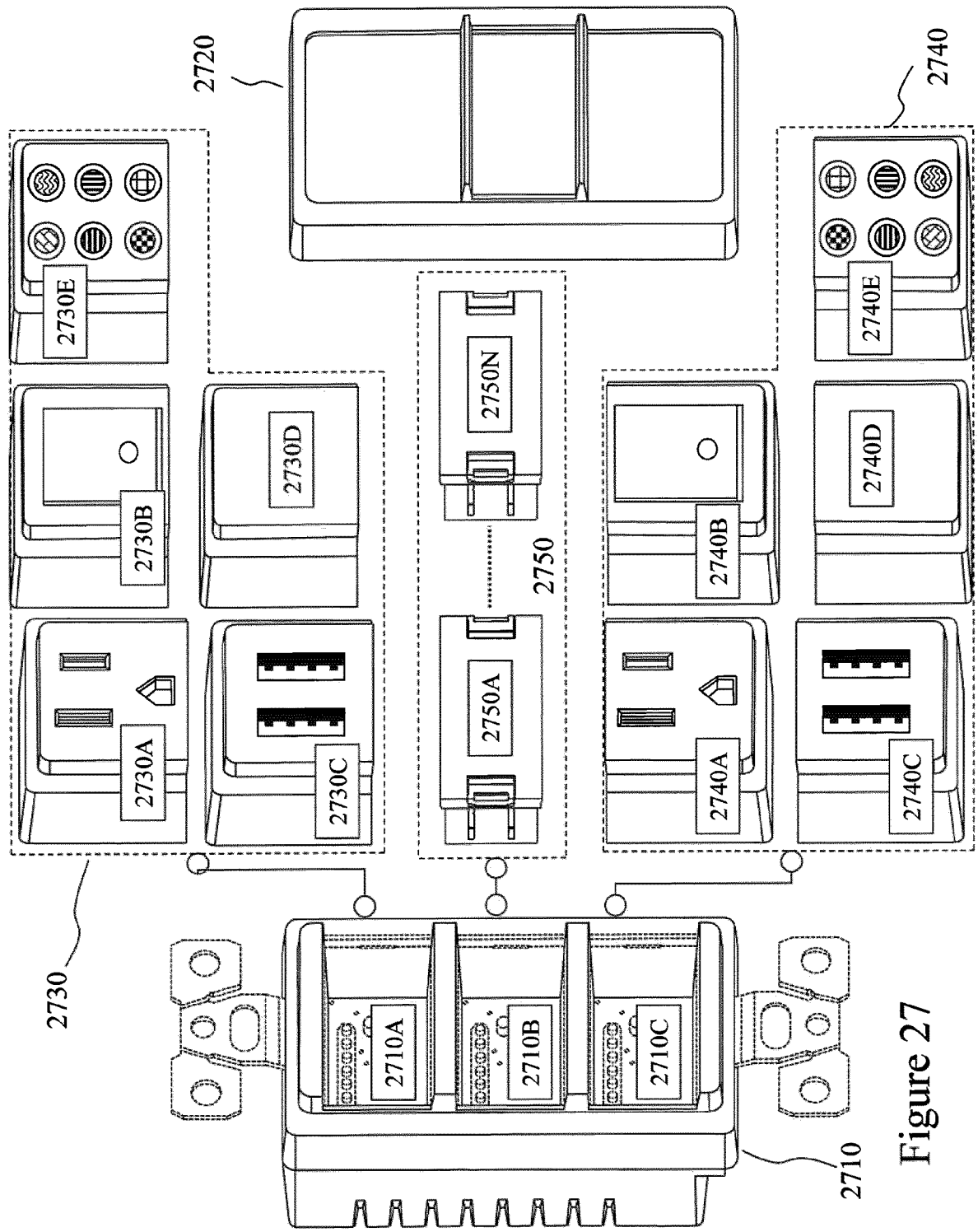
FIG. 27 depicts a configurable electrical receptacle according to an embodiment of the invention wherein the installed functionality can be set at installation leaving the post-installation receptacle configuration.

Whilst the Receptacle 2710 in FIG. 27 is depicted such that a functional insert for the upper first cavity 2710A will not fit into lower third cavity 2710C due to geometric and backplane projections/connections etc. it would be evident that within other embodiments of the invention a design can be implemented such that a common insert may be employed within each of the upper first cavity 2710A and lower third cavity 2710C. Alternatively, common inserts may be applied for some functions within each of the upper first cavity 2710A and lower third cavity 2710C such as USB interfaces, wireless interfaces, etc. whilst some functions may still be designed for use in a single cavity such as electrical power outlets such that a pair of electrical power outlets employed within each of the upper first cavity 2710A and lower third cavity 2710C have the same orientation relative to the Receptacle 2710.

A similar set of constraints or flexibility may be established with Receptacle 2810 in FIG. 28 wherein if all cavities, namely first to sixth cavities 2840A to 2840F, are identical in geometry and rear mechanical/electrical configurations any compatible insert may be inserted into any of the cavities. Alternatively, some cavities, e.g. first and second cavities 2840A and 2840B respectively, may be of a first design, third and fourth cavities 2840C and 2840D respectively of a second design, and fifth and sixth cavities 2840E and 2840F respectively of a third design. In this scenario some inserts may be designed solely for use with the first design or the second design or the third design. Optionally, only certain functions and/or sensors may be provided within a specific design, e.g. environmental sensors may only be designed for compatibility with the first design whilst chemical sensors may only be designed for compatibility with the second design.

Accordingly, sensors may be deployed within receptacles in isolation of other functions or deployed in receptacles in conjunction with other functions. Such networks of sensors may provide a significant volume of data to local or remote processors of this data including, but not limited to, an AIAL Hub, an AIAL Nano-Hub, a regulatory authority, a service provider, a third party provider, and a Government organization. Accordingly, a service provider such as an electrical utility may be provided with data, based upon explicit acceptance of each user/organization providing the data, allowing it to establish and modify consumption projections as well as using its own artificial intelligence (AI) processes etc. Within another variant a Government organization, e.g. the U.S. National Weather Service, can establish real time environmental at a much finer granularity than national sensor networks and/or weather satellites allowing it to pin-point and project (potentially) where an event such as a hurricane, tornado, flood etc. may occur.

14: Device Tracking Using Modular Embedded Units Based on External Device Beacons Within embodiments of the invention a network of inserts may be employed to monitor and/or detect a beacon or beacons such that if a beacon is associated with an item of equipment the location of the beacon accordingly its associated equipment may be monitored/established. For example, see U.S. Pat. No. 9,408,036 entitled "Managing Wireless Beacon Devices" and U.S. Pat. No. 8,965,411 entitled "Positioning System with Wireless Beacons that vary Transmission Power Levels" and U.S. Pat. No. 10,129,697 entitled "Techniques for Wireless Position Determination utilizing a Collaborative Database."

Optionally, a network of inserts may be employed to monitor and/or detect a wireless emitter associated with an item of electrical equipment or an item of electronic equipment allowing the wireless emitter location to be established. See for example U.S. Pat. No. 7,312,752 entitled "Wireless Position Location and Tracking System."

Optionally, a network of inserts may be employed comprising wireless emitters and wireless receivers allowing detection/monitoring of user(s) within an environment within which the wireless emitters radiate to be established without a wireless device and/or wireless transmitter associated with the user(s) being monitored. For example, see Aerial Technology's patent applications for wireless PCT/CA2017/000,136 entitled "System and Methods for Smart Intrusion Detection using Wireless Signals and Artificial Intelligence" and PCT/CA2017/000,247 entitled "Device-Free Localization Methods within Smart Indoor Environments."

15: Artificial Intelligence Based Monitoring for Optimal Machine Maintenance

As described and depicted in respect of Section 8 and FIG. 21 then embedded power monitoring can form part of a receptacle according to an embodiment of the invention. Accordingly, this consumption data can be communicated to an AIAL Hub external to the receptacle or AIAL Nano-Hub forming part of the receptacle or an insert of the receptacle. Accordingly, one or more AI algorithms can be applied in order to establish "normal" power profile(s) for the electrical equipment attached to a power outlet of a receptacle with embedded power monitoring. Subsequently, power monitoring can determine non-nominal conditions that might suggest a condition associated with the equipment has occurred. For example, such a condition may be a requirement for preventative maintenance or that a fault has occurred. Optionally, the condition may be associated with a threshold such that when the condition is above the threshold the receptacle isolates the electrical equipment preventing further degradation of the electrical equipment, a fault occurring etc. Within embodiments of the invention an original equipment manufacturer (OEM) may obtain data from a large number of installations of an item of their equipment and establish correlations between non-nominal conditions and specific issues with the equipment such that where these non-optimal conditions are identified they may be employed to suggest to an owner of the equipment what preventative maintenance and/or repair etc. may be required.

16: Cord End Based Wireless Tag for Appliance Identification

With respect to Sections 8, 9, 12 and 15 and in respect of FIGS. 21 to 26 respectively embodiments of the invention have been presented with respect to monitoring power load, artificial intelligence assisted living (AIAL), preventive maintenance etc. according to embodiments of the invention. However, it would be beneficial for such embodiments of the invention to further identify the specific electronic device(s) and/or electrical device(s) connected to the receptacle(s) and/or insert(s).

Figure 29:
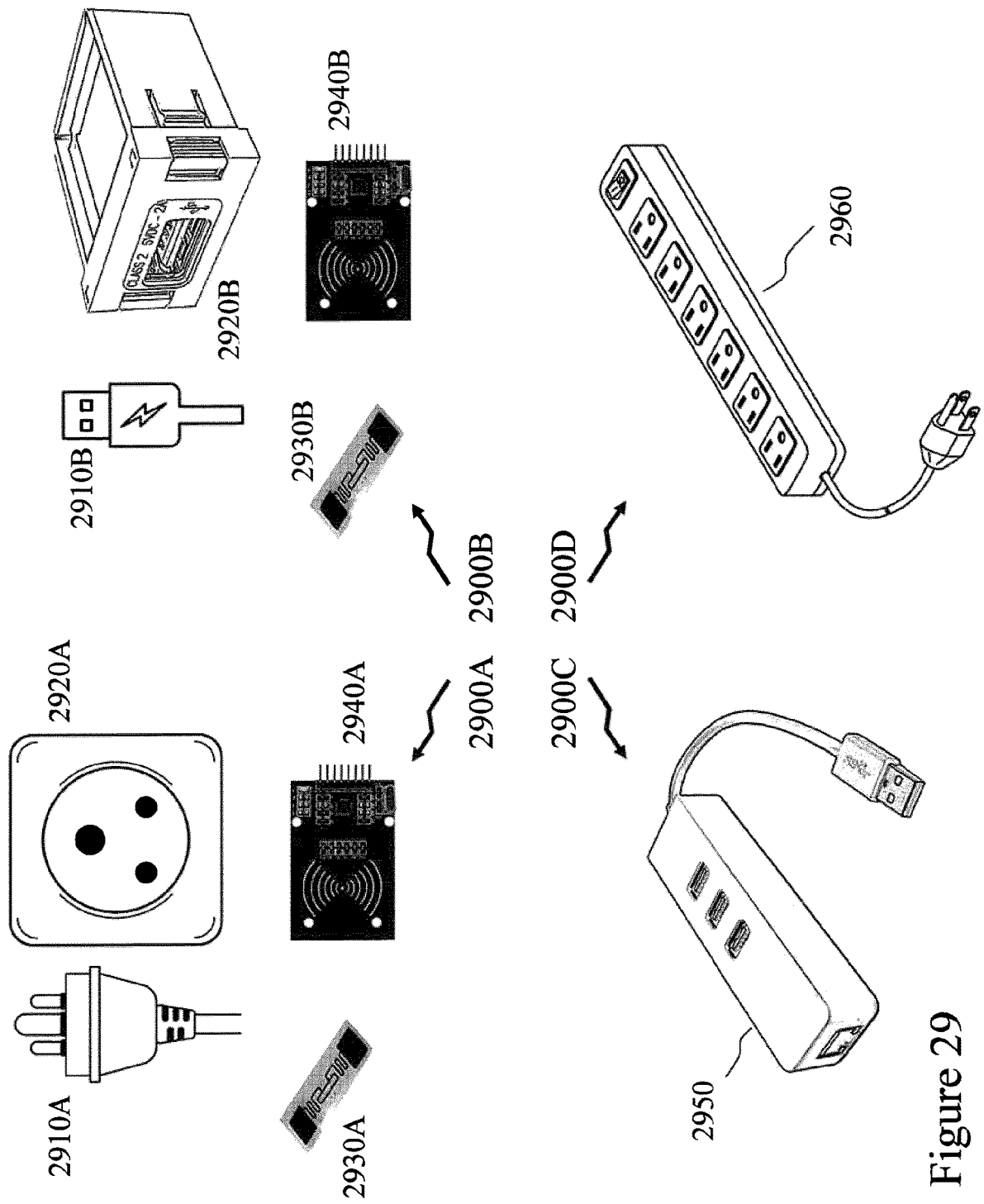
FIG. 29 depicts configurations of tagged cables and tagging interfaces in respect of receptacles and inserts according to embodiments of the invention.

Referring to FIG. 29 there are depicted first to fourth images 2900A to 2900D with respect to embodiments of the invention. First image 2900A depicts an electrical plug 2910A and an electrical socket 2920A where the electrical socket 2920A may comprise part of a receptacle or a functional insert of a receptacle such as described and depicted above in respect to FIGS. 6A to 8, 13A to 13B, 16 to 17 and 27. Forming part of the electrical socket 2920A within the receptacle or functional insert is radio frequency identification (RFID) circuit 2940A which comprises a generating circuit, receiving circuit and antenna. Forming part of the electrical plug 2910A is an RFID tag 2930A. Accordingly, the RFID tag 2930A returns a predetermined code in response to an interrogation pulse launched by the RFID circuit 2940A which is then received and processed by the RFID 2940A. In this manner an identity of the electrical device/electronic device/power cord etc. connected to the electrical socket 2920A may be established through obtaining the code from the RFID tag 2930A either by the receptacle or functional insert of which the electrical socket 2920A forms part or an AIAL Hub, AIAL Nano-Hub etc.

Referring to second image 2900B there is depicted a USB plug 2910B and an electrical socket 2920A where the USB socket 2920B may comprise part of a receptacle or a functional insert of a receptacle such as described and depicted above in respect to FIGS. 6A to 8, 13A to 13B, 16 to 17 and 27. Forming part of the USB socket 2920B within the receptacle or functional insert is radio frequency identification (RFID) circuit 2940B which comprises a generating circuit, receiving circuit and antenna. Forming part of the USB plug 2910B is an RFID tag 2930B. Accordingly, the RFID tag 2930B returns a predetermined code in response to an interrogation pulse launched by the RFID circuit 2940B which is then received and processed by the RFID circuit 2940B. In this manner an identity of the electrical device/electronic device/power cord etc. connected to the USB socket 2920B may be established through obtaining the code from the RFID tag 2930B either by the receptacle or functional insert of which the USB socket 2920B forms part or an AIAL Hub, AIAL Nano-Hub etc.

This methodology may be extended and applied to other plugs/sockets associated with electronic devices/electrical devices attached to a receptacle or functional insert. For example, third image 2900C depicts a USB hub 2950 wherein similar RFID identification of USB plugs connected to it may be undertaken using a methodology such as described above in respect of second image 2900B. Similarly, fourth image 2900D depicts a distribution bar/power bar 2960 wherein similar RFID identification of electrical plugs connected to it may be undertaken using a methodology such as described above in respect of first image 2900A.

Within embodiments of the invention the RFID identification process may be triggered, for example, upon determining connection of an electrical plug or other plug to a socket, such as through triggering a mechanical switch. Alternatively, the RFID identification process may be triggered by power being drawn above a predetermined threshold though the socket-plug combination. Alternatively, the RFID identification process may be triggered by detecting data being read or written through the socket-plug connection. Optionally, the RFID identification process may be triggered by a period of time having elapsed since a previous reading was made or attempted, for example, the RFID identification process could be undertaken every 5 minutes for example.

Within other embodiments of the invention the RFID identification process may be replaced with a near-field communications (NFC) technology without departing from the scope of the invention.

Within embodiments of the invention an RFID tag, such as RFID tags 2930A and 2930B in FIG. 29 could be wrapped around a cord, attached to a plug (or socket if the receptacle/functional insert was a plug rather than a socket as described in respect of first image 2900A in FIG. 29), integrated within the plug (or socket) etc.

Within embodiments of the invention such as described in respect of third image 2900C in FIG. 29 the read RFID tag information obtained by the USB hub could be written back to the receptacle/functional insert using the USB interface.

Within embodiments of the invention such as described in respect of fourth image 2900D in FIG. 29 the read RFID tag information obtained by the USB hub could be written back to the receptacle/functional insert using power line communications, for example.

Within embodiments of the invention the RFID tag information extracted with respect to an insert or a socket/plug etc. within a receptacle according to an embodiment of the invention may be communicated to a remote server wherein the remote server returns data relating to the product to which the RFID tag information relates. Accordingly, a USB socket insert may establish that the user has connected a 64 Gb memory device to the socket or a USB hub for example and configure its functionality accordingly. Alternatively, the user might connect a USB cable to the USB socket which is employed for charging a device connected to the USB socket and accordingly the USB socket insert configures.

Within other embodiments of the invention the insert may discretely through an integral wireless interface or in combination with a wireless interface within another insert in the same receptacle, within the receptacle, within the receptacle as part of an AIAL Hub, within the receptacle as part of an AIAL Nano-Hub etc. perform a process comprising the following steps:
- read data from a RFID tag of cable and/or plug inserted into a socket;
- extract the RFID information from received data from the RFID tag;
- transmit the RFID information to a remote server;
- receive from the remote server product information relating to the device having the RFID information associated with it; and
- configure the insert according to the product information received.

For example, the cable/plug inserted into the socket of the insert may be associated with a USB Hub and accordingly the insert configures the power and data accordingly or it may be associated with a pair of headphones that have wireless interface and accordingly the insert adjusts to provide fast charging of the pair of headphones. The charging profile for the pair of headphones may be part of the product information retrieved from the remote server. This information may also comprise, but not be limited to, typical power consumption, maximum power consumption, maximum data rate, manufacturer, part number, and recall information such that the insert disables the socket.

Within other embodiments of the invention an electrical function forming part of a receptacle may read an RFID tag using an RFID circuit of an element interfaced to the electrical function, whether the electrical function is integrated as part of the receptacle or established through configuration of the receptacle such as described with respect to FIGS. 13B, 16 and 27 respectively. The electrical function may through an integral wireless interface of the receptacle or in combination with a wireless interface within an insert in the same receptacle, within the receptacle as part of an AIAL Flub, within the receptacle as part of an AIAL Nano-Hub etc. perform a process comprising the following steps:
- read data from a RFID tag of cable and/or plug inserted into a socket;
- extract the RFID information from received data from the RFID tag;
- transmit the RFID information to a remote server;
- receive from the remote server product information relating to the device having the RFID information associated with it; and
- configure the receptacle according to the product information received.

For example, the cable/plug inserted into the socket of the receptacle may be associated with a kettle and accordingly the receptacle configures the power settings and/or monitoring profile accordingly or it may be associated with a table lamp and the receptacle configures the power settings and/or monitoring profile accordingly. The information retrieved from the remote server may comprise, but not be limited to, typical power consumption, maximum power consumption, maximum data rate, manufacturer, part number, and recall information such that the insert disables the socket.

Within other embodiments of the invention the receptacle and/or insert may transmit data to the remote server from which the RFID tag information is obtained or to another remote server. This data may comprise, but not be limited, start time of use (i.e. data and/or power provided to or received from external device), end time of use, power consumption, data volume transferred, and deviations from nominal behaviour.

17: Artificial Intelligence Based Load Characterization for Determining Load Type With respect to Sections 8, 9, 12 and 15 and in respect of FIGS. 21 to 26 respectively embodiments of the invention have been presented with respect to monitoring power load, artificial intelligence assisted living (AIAL), preventive maintenance etc. according to embodiments of the invention. However, it would be beneficial for such embodiments of the invention to further be able to determine the type of load applied. Accordingly, within embodiments of the invention such as described and depicted with respect to receptacle(s) and/or functional insert(s) a modular unit may be incorporated which can establish a load profile of a device connected to the receptacle and/or insert and through AI learning determine the type of load connected. Accordingly, the load profile and, if an identity of the device is known such as described above in respect of Section 16, the identity of the device are communicated to an AIAL Hub, AIAL Nano-Hub or other remote server in order to add the load profile data to a database of other profiles. This database may store in association with the load profile additional information including the identity of the device and, if known, the specific type of device, manufacturer, and model number. Where this information is not known the load profile may be compared with stored load profiles with this associated information such that the AI processes can associate a device type etc. to the load profile.

Optionally, within embodiments of the invention the load may be determined using a defined current modulation sequence in the applied electrical signal(s) from the receptacle/insert in order to determine the load.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
a housing having at least a front face comprising;
- a mounting means to affix the housing to another electrical device which is at least one of a portable electronic device, a fixed electronic device, a wearable electronic device, a portable electrical device, a fixed electrical device, and a wearable electrical device;
- a plurality of first electrical interfaces, each first electrical interface allowing connection to a predetermined electrical signal forming part of an electrical power distribution network;
- an electrical circuit coupled to the plurality of first electrical interfaces for generating at least one of one or more electrical power signals and one or more electrical data signals;
- a plurality of first contacts, each first contact coupled to a predetermined one of the at least one of one or more electrical power signals and one or more electrical data signals;
- a set of cavities, each cavity disposed within the front face of the housing allowing the insertion and removal of a demountable insert into and from the front face when the housing is mounted within the another device and comprising a first part of a retention means to retain the demountable insert within the cavity accessible through a first opening in the faceplate and comprising the plurality of first contacts; and
- a plurality of first features upon a surface of the cavity; wherein each demountable insert is one of a plurality of demountable inserts each sized for insertion into the cavity within the front face of the housing and capable of insertion and removal, the demountable insert comprising a second part of the retention means to retain the demountable insert when inserted into the cavity, a plurality of second contacts to electrically contact a predetermined subset of the plurality of first contacts, and a plurality of second features; wherein
the plurality of first features when aligned with the plurality of second features allow full insertion of the demountable insert into the cavity such that the plurality of second contacts electrically contact the predetermined subset of the plurality of first contacts; wherein
the electrical circuit comprises a microprocessor supporting a first plurality of algorithms providing at least one of an aspect of artificial intelligence and machine learning to the device;
the electrical circuit receives data relating to the demountable insert which is processed by the first plurality of algorithms; and
the microprocessor either provides a user of the device with an artificial intelligence assisted living Nano-Hub which executes first decisions established in dependence upon processing the received data by the first plurality of algorithms, or communicates with a remote artificial intelligence assisted living hub which establishes second decisions in dependence upon processing data transmitted from the device with a second plurality of algorithms providing at least one of an aspect of artificial intelligence and machine learning to the remote artificial intelligence assisted living hub where the processed data was generated by processing the received data with the first plurality of algorithms.

2. The device according to claim 1, wherein
a first subset of the plurality of demountable inserts have their plurality of second features positioned such that the plurality of first features will align;
a second subset of the plurality of demountable inserts have their plurality of second features positioned such that the plurality of first features will align; and
a third subset of the plurality of demountable inserts have their plurality of second features positioned such that the plurality of first features will not align; wherein
the third subset of the plurality of demountable inserts can be inserted into another housing having its plurality of first features positioned such that they will align with the plurality of second features of the third subset of the plurality of demountable inserts; and
the second subset of the plurality of demountable inserts can also be inserted into the another housing which has its plurality of first features positioned such that they will align with the plurality of second features of the second subset of the plurality of demountable inserts and the plurality of second features of the third subset of the plurality of demountable inserts.

3. The device according to claim 1, wherein
the device further comprises a predetermined electrical function selected from the group consisting of an electrical power socket, an electrical power plug, a switch, and a dimmer switch;
the electrical circuit comprises a microprocessor supporting a plurality of algorithms providing at least one of an aspect of artificial intelligence and machine learning to the device;
the electrical circuit receives data relating to the demountable insert which is processed by a first subset of the plurality of algorithms;
the electrical circuit receives other data relating to the predetermined electrical function which is processed by a second subset of the plurality of algorithms; and
the electrical circuit adjusts an aspect of the predetermined electrical function in dependence upon a result of processing the data with the first subset of the plurality of algorithms and another result of processing the other data with the second subset of the plurality of algorithms.

4. The device according to claim 3, wherein
when the predetermined electrical function is the electrical power socket or electrical power plug the one of the electrical power socket or electrical power plug comprises a comprises a radio frequency identification (RFID) circuit;
when the predetermined electrical function is the electrical power socket the RFID circuit establishes an identity of an electrical cable connected to the electrical power socket via a plug in dependence upon the RFID circuit interrogating an RFID tag forming part of the electrical cable or the plug; and
when the predetermined electrical function is the electrical power plug the RFID circuit establishes an identity of an electrical cable connected to the electrical power plug via a socket in dependence upon the RFID circuit interrogating an RFID tag forming part of the electrical cable or the socket.

5. The device according to claim 1, wherein
the demountable insert comprises a second electrical circuit comprising a microprocessor; and the demountable insert provides for at least one off control of and monitoring of at least one of the another device and a further device via an interface of the demountable insert; wherein the interface of the demountable insert is at least one of a wireless interface according to a first predetermined standard, an electrical interface and an optical interface according to a second predetermined standard.

6. The device according to claim 1, wherein a first demountable insert of the plurality of demountable inserts is a blank insert such that when the first demountable insert of the plurality of demountable inserts is inserted a function of the electrical circuit with respect to the another electrical device is not modified; and a second demountable insert of the plurality of demountable inserts comprises at least one of a sensor and a wireless interface such that when inserted the function of the electrical circuit with respect to the another electrical device is modified in dependence upon data processed by the electrical circuit provided by the second demountable insert of the plurality of inserts.

7. The device according to claim 1, wherein the electrical circuit establishes a load profile of a load connected to either the another electrical device in dependence upon data acquired by the electrical circuit or a demountable insert inserted into a cavity of the set of cavities in dependence upon other data acquired by the electrical circuit from the demountable insert; and the established load profile is communicated to a remote device by the electrical circuit via one of the another electrical device, the demountable insert, or another demountable insert inserted into another cavity of the set of cavities.

8. The device according to claim 1, wherein the electrical circuit establishes a load profile of a load connected to either the another electrical device in dependence upon data acquired by the electrical circuit or a demountable insert inserted into a cavity of the set of cavities in dependence upon other data acquired by the electrical circuit from the demountable insert;

the established load profile is communicated to a remote device by the electrical circuit via one of the another electrical device, the demountable insert, or another demountable insert inserted into another cavity of the set of cavities; and the remote device compares the established load profile with stored local profiles to associate a device type to the load connected to the another electrical device or the demountable insert.

9. The device according to claim 1, wherein the electrical circuit establishes a load profile of a load connected to either the another electrical device in dependence upon data acquired by the electrical circuit or a demountable insert inserted into a cavity of the set of cavities in dependence upon other data acquired by the electrical circuit from the demountable insert;

the established load profile is communicated to a remote device by the electrical circuit via one of the another electrical device, the demountable insert, or another demountable insert inserted into another cavity of the set of cavities; and the load profile is established by the electrical circuit using a defined current modulation sequence to applied electrical signals provided to the load.

10. The device according to claim 1, wherein the electrical circuit establishes a load profile of a load connected to either the another electrical device in dependence upon data acquired by the electrical circuit or a demountable insert inserted into a cavity of the set of cavities in dependence upon other data acquired by the electrical circuit from the demountable insert;

one of a wireless interface according to a predetermined standard forming part of the device or another wireless interface according to the predetermined standard format forming part of a demountable insert establishes; and the established load profile is communicated to a remote device by the electrical circuit via one of the another electrical device, the demountable insert, the device or another demountable insert inserted into another cavity of the set of cavities.

11. The device according to claim 1, wherein a configuration of the demountable insert is established in dependence upon information relating to a product electrically connected to the another device or the demountable insert;

the information relating to the product established in dependence upon data retrieved from a cable or plug associated with the product providing the electrical connection between the product and the another device or the demountable insert; and the retrieved data is established via a wireless interface forming part of the demountable insert, another demountable insert, the device or the another device.

12. The device according to claim 1, wherein a configuration of a demountable insert is established in dependence upon information relating to a product electrically connected to the another device or the demountable insert retrieved from a remote server;

the information relating to the product was established in dependence upon data retrieved from a cable or plug associated with the product providing the electrical connection between the product and the another device or the demountable insert communicated to the remote server;

the retrieved data is established via a wireless interface forming part of the demountable insert, another demountable insert, the device or the another device; and the established configuration is disabling the electrical connection between the product and the another device or the demountable insert.

13. The device according to claim 1, wherein use data relating to usage of a further device electrically connected to-a the demountable insert is acquired by one of the electrical circuit and the demountable insert and transmitted to a remote server by one of the electrical circuit, the another device, the demountable insert and another demountable insert;

the use data relating to the usage of the further device is selected from the group comprising start time of power provisioning to or from the further device, end time of power provisioning, start time of data provisioning to or from the further device, end time of data provisioning, power consumption, data volume transferred and a deviation from nominal behaviour; and dependence upon the RFID circuit interrogating an RFID tag forming part of the electrical cable or the socket.

14. The device according to claim 1, wherein
the another device provides one or more functional elements each providing a function; and
at least one of:
the electrical circuit selectively disables or enables a demountable insert within a cavity of the set of cavities in dependence upon a current function of a predetermined functional element of the one or more functional elements or a state of the predetermined functional element of the one or more functional elements; and
the electrical circuit selectively disables or enables a current function of a predetermined functional element of the one or more functional elements or a state of the predetermined functional element of the one or more functional elements in dependence upon data from one or more demountable inserts within a subset of the set of cavities.

15. A device comprising:
a housing having at least a front face comprising;
  a mounting means to affix the housing to another electrical device which is at least one of a portable electronic device, a fixed electronic device, a wearable electronic device, a portable electrical device, a fixed electrical device, and a wearable electrical device;
  a plurality of first electrical interfaces, each first electrical interface allowing connection to a predetermined electrical signal forming part of an electrical power distribution network;
  an electrical circuit coupled to the plurality of first electrical interfaces for generating at least one of one or more electrical power signals and one or more electrical data signals;
  a plurality of first contacts, each first contact coupled to a predetermined one of the at least one of one or more electrical power signals and one or more electrical data signals;
  a set of cavities, each cavity disposed within the front face of the housing allowing the insertion and removal of a demountable insert into and from the front face when the housing is mounted within the another device and comprising a first part of a retention means to retain the demountable insert within the cavity accessible through a first opening in the faceplate and comprising the plurality of first contacts; and
  a plurality of first features upon a surface of the cavity; wherein
each demountable insert is one of a plurality of demountable inserts each sized for insertion into the cavity within the front face of the housing and capable of insertion and removal, the demountable insert comprising a second part of the retention means to retain the demountable insert when inserted into the cavity, a plurality of second contacts to electrically contact a predetermined subset of the plurality of first contacts, and a plurality of second features; wherein
the plurality of first features when aligned with the plurality of second features allow full insertion of the demountable insert into the cavity such that the plurality of second contacts electrically contact the predetermined subset of the plurality of first contacts; wherein
the device further comprises a predetermined electrical function selected from the group consisting of an electrical power socket, an electrical power plug, a switch, and a dimmer switch;
the electrical circuit comprises a microprocessor supporting a plurality of algorithms providing at least one of an aspect of artificial intelligence and machine learning to the device;
the electrical circuit receives data relating to the demountable insert which is processed by a first subset of the plurality of algorithms;
the electrical circuit receives other data relating to the predetermined electrical function which is processed by a second subset of the plurality of algorithms; and
the electrical circuit adjusts an aspect of the predetermined electrical function in dependence upon a result of processing the data with the first subset of the plurality of algorithms and another result of processing the other data with the second subset of the plurality of algorithms.

16. The device according to claim 15, wherein
when the predetermined electrical function is the electrical power socket or electrical power plug the one of the electrical power socket or electrical power plug comprises a comprises a radio frequency identification (RFID) circuit;
when the predetermined electrical function is the electrical power socket the RFID circuit establishes an identity of an electrical cable connected to the electrical power socket via a plug in dependence upon the RFID circuit interrogating an RFID tag forming part of the electrical cable or the plug; and
when the predetermined electrical function is the electrical power plug the RFID circuit establishes an identity of an electrical cable connected to the electrical power plug via a socket in dependence upon the RFID circuit interrogating an RFID tag forming part of the electrical cable or the socket.

17. A device comprising:
a housing having at least a front face comprising;
  a mounting means to affix the housing to another electrical device which is at least one of a portable electronic device, a fixed electronic device, a wearable electronic device, a portable electrical device, a fixed electrical device, and a wearable electrical device;
  a plurality of first electrical interfaces, each first electrical interface allowing connection to a predetermined electrical signal forming part of an electrical power distribution network;
  an electrical circuit coupled to the plurality of first electrical interfaces for generating at least one of one or more electrical power signals and one or more electrical data signals;
  a plurality of first contacts, each first contact coupled to a predetermined one of the at least one of one or more electrical power signals and one or more electrical data signals;
  a set of cavities, each cavity disposed within the front face of the housing allowing the insertion and removal of a demountable insert into and from the front face when the housing is mounted within the another device and comprising a first part of a retention means to retain the demountable insert within the cavity accessible through a first opening in the faceplate and comprising the plurality of first contacts; and
  a plurality of first features upon a surface of the cavity; wherein
each demountable insert is one of a plurality of demountable inserts each sized for insertion into the cavity within the front face of the housing and capable of insertion and removal, the demountable insert comprising a second part of the retention means to retain the demountable insert when inserted into the cavity, a plurality of second contacts to electrically contact a predetermined subset of the plurality of first contacts, and a plurality of second features; wherein the plurality of first features when aligned with the plurality of second features allow full insertion of the demountable insert into the cavity such that the plurality of second contacts electrically contact the predetermined subset of the plurality of first contacts; wherein the electrical circuit establishes a load profile of a load connected to either the another electrical device in dependence upon data acquired by the electrical circuit or a demountable insert inserted into a cavity of the set of cavities in dependence upon other data acquired by the electrical circuit from the demountable insert;

the established load profile is communicated to a remote device by the electrical circuit via one of the another electrical device, the demountable insert, or another demountable insert inserted into another cavity of the set of cavities; and the load profile is established by the electrical circuit using a defined current modulation sequence to applied electrical signals provided to the load.

18. A device comprising:
a housing having at least a front face comprising;
　a mounting means to affix the housing to another electrical device which is at least one of a portable electronic device, a fixed electronic device, a wearable electronic device, a portable electrical device, a fixed electrical device, and a wearable electrical device;
　a plurality of first electrical interfaces, each first electrical interface allowing connection to a predetermined electrical signal forming part of an electrical power distribution network;
　an electrical circuit coupled to the plurality of first electrical interfaces for generating at least one of one or more electrical power signals and one or more electrical data signals; and
　a plurality of first contacts, each first contact coupled to a predetermined one of the at least one of one or more electrical power signals and one or more electrical data signals;
　a set of cavities, each cavity disposed within the front face of the housing allowing the insertion and removal of a demountable insert into and from the front face when the housing is mounted within the another device and comprising a first part of a retention means to retain the demountable insert within the cavity accessible through a first opening in the faceplate and comprising the plurality of first contacts;
　a plurality of first features upon a surface of the cavity; wherein
each demountable insert is one of a plurality of demountable inserts each sized for insertion into the cavity within the front face of the housing and capable of insertion and removal, the demountable insert comprising a second part of the retention means to retain the demountable insert when inserted into the cavity, a plurality of second contacts to electrically contact a predetermined subset of the plurality of first contacts, and a plurality of second features; wherein the plurality of first features when aligned with the plurality of second features allow full insertion of the demountable insert into the cavity such that the plurality of second contacts electrically contact the predetermined subset of the plurality of first contacts; wherein a configuration of the demountable insert is established in dependence upon information relating to a product electrically connected to the another device or the demountable insert;

the information relating to the product established in dependence upon data retrieved from a cable or plug associated with the product providing the electrical connection between the product and the another device or the demountable insert; and the retrieved data is established via a wireless interface forming part of the demountable insert, another demountable insert, the device or the another device.

19. A device comprising:
a housing having at least a front face comprising;
　a mounting means to affix the housing to another electrical device which is at least one of a portable electronic device, a fixed electronic device, a wearable electronic device, a portable electrical device, a fixed electrical device, and a wearable electrical device;
　a plurality of first electrical interfaces, each first electrical interface allowing connection to a predetermined electrical signal forming part of an electrical power distribution network;
　an electrical circuit coupled to the plurality of first electrical interfaces for generating at least one of one or more electrical power signals and one or more electrical data signals; and
　a plurality of first contacts, each first contact coupled to a predetermined one of the at least one of one or more electrical power signals and one or more electrical data signals;
　a set of cavities, each cavity disposed within the front face of the housing allowing the insertion and removal of a demountable insert into and from the front face when the housing is mounted within the another device and comprising a first part of a retention means to retain the demountable insert within the cavity accessible through a first opening in the faceplate and comprising the plurality of first contacts; and
　a plurality of first features upon a surface of the cavity; wherein
each demountable insert is one of a plurality of demountable inserts each sized for insertion into the cavity within the front face of the housing and capable of insertion and removal, the demountable insert comprising a second part of the retention means to retain the demountable insert when inserted into the cavity, a plurality of second contacts to electrically contact a predetermined subset of the plurality of first contacts, and a plurality of second features; wherein the plurality of first features when aligned with the plurality of second features allow full insertion of the demountable insert into the cavity such that the plurality of second contacts electrically contact the predetermined subset of the plurality of first contacts; wherein use data relating to usage of a further device electrically connected to the demountable insert is acquired by one of the electrical circuit and the demountable insert and transmitted to a remote server by one of the electrical circuit, the another device, the demountable insert and another demountable insert;

the use data relating to the usage of the further device is selected from the group comprising start time of power provisioning to or from the further device, end time of power provisioning, start time of data provisioning to or from the further device, end time of data provisioning, power consumption, data volume transferred and a deviation from nominal behaviour; and dependence upon the RFID circuit interrogating an RFID tag forming part of the electrical cable or the socket.

* * * * *